United States Patent [19]
Jones et al.

[11] Patent Number: 5,966,456
[45] Date of Patent: *Oct. 12, 1999

[54] METHOD AND APPARATUS FOR DISCRIMINATING AND COUNTING DOCUMENTS

[75] Inventors: William J. Jones, Kenilworth; Douglas U. Mennie, Barrington, both of Ill.

[73] Assignee: Cummins-Allison Corp., Mt. Prospect, Ill.

[*] Notice: This patent is subject to a terminal disclaimer.

[21] Appl. No.: 08/833,095

[22] Filed: Apr. 4, 1997

Related U.S. Application Data

[63] Continuation-in-part of application No. 08/573,392, Dec. 15, 1995, Pat. No. 5,790,697, which is a continuation-in-part of application No. 08/399,854, Mar. 7, 1995, Pat. No. 5,875,259, application No. 08/394,752, Feb. 27, 1995, Pat. No. 5,724,438, application No. 08/362,848, Dec. 22, 1994, Pat. No. 5,870,487, application No. 08/340,031, Nov. 14, 1994, Pat. No. 5,815,592, application No. 08/317,349, Oct. 4, 1994, Pat. No. 5,640,463, application No. 08/287,882, Aug. 9, 1994, Pat. No. 5,652,802, application No. 08/243,807, May 16, 1994, Pat. No. 5,633,949, and application No. 08/226,660, Apr. 12, 1994, said application No. 08/399,854, is a continuation-in-part of application No. 08/394,752, application No. 08/340,031, and application No. 08/287,882, said application No. 08/394,752, is a continuation-in-part of application No. 08/340,031, and application No. 08/127,334, Sep. 27, 1993, Pat. No. 5,467,405, said application No. 08/362,848, is a continuation-in-part of application No. 08/340,031, which is a continuation-in-part of application No. 08/243,807, and application No. 08/207,592, Mar. 8, 1994, Pat. No. 5,467,406, said application No. 08/287,882, is a continuation-in-part of application No. 08/207,592, application No. 08/127,334, and application No. 08/219,093, Mar. 29, 1994, abandoned, said application No. 08/243,807, is a continuation-in-part of application No. 08/219,093, and application No. 08/127,334, said application No. 08/226,660, is a continuation-in-part of application No. 08/127,334, said application No. 08/219,093, is a continuation-in-part of application No. 08/127,334, said application No. 08/207,592, is a continuation-in-part of application No. 08/127,334, which is a continuation of application No. 07/885,648, May 19, 1992, Pat. No. 5,295,196, which is a continuation-in-part of application No. 07/475,111, Feb. 5, 1990, abandoned

[60] Provisional application No. 60/018,563, May 29, 1996, provisional application No. 60/034,954, Jan. 16, 1997, and provisional application No. 60/038,340, Feb. 27, 1997.

[51] Int. Cl.⁶ .................................................. G06K 9/00
[52] U.S. Cl. ....................... 382/135; 382/318; 382/320; 382/321
[58] Field of Search .................................. 382/135, 218, 382/318, 319, 320, 321, 322, 323; 194/206; 250/556; 356/71; 209/534

[56] References Cited

U.S. PATENT DOCUMENTS

D. 369,984  5/1996  Larsen ...................................... D10/97

(List continued on next page.)

FOREIGN PATENT DOCUMENTS 077464  4/1983  European Pat. Off. .

(List continued on next page.)

OTHER PUBLICATIONS

AFB Currency Recognition System (1982).

(List continued on next page.)

Primary Examiner—Phuoc Tran

[57] ABSTRACT

A currency evaluating device for receiving a stack of currency bills, rapidly discriminating the bills in the stack and then re-stacking the bills which comprises an input receptacle, a transport mechanism for transporting in the direction of the narrow dimension of the bills from the input receptacle to one of a plurality of output receptacles, at a rate in excess of about 800 bills per minute, and a discriminating unit for determining the denomination of each bill. The device may also include an authenticating unit for determining the genuineness of the bills. The authenticating unit may detect by use of a plurality of magnetoresistive sensors or may detect by ultraviolet light. Alternatively, a currency counting and evaluation device comprises an input receptacle, a transport mechanism for transporting the bills in the direction of the narrow dimension to one of a plurality of output receptacles at a rate in excess of about 800 bills per minute, a stationary optical scanning head, means for sampling, a memory for storing characteristic signal samples and a signal processor.

52 Claims, 22 Drawing Sheets

U.S. PATENT DOCUMENTS

| | | | |
|---|---|---|---|
| 3,246,295 | 4/1966 | Claris et al. | 382/56 |
| 3,280,974 | 10/1966 | Riddle et al. | 209/111.8 |
| 3,480,785 | 11/1969 | Aufderheide | 250/219 |
| 3,496,370 | 2/1970 | Haville et al. | 250/219 |
| 3,509,535 | 4/1970 | Berube | 340/149 |
| 3,612,835 | 10/1971 | Andrews et al. | 235/61.11 D |
| 3,618,765 | 11/1971 | Cooper et al. | 209/534 |
| 3,679,314 | 7/1972 | Mustert | 356/71 |
| 3,778,628 | 12/1973 | Novak et al. | 250/556 |
| 3,842,281 | 10/1974 | Goodrich | 250/461 |
| 3,870,629 | 3/1975 | Carter et al. | 209/111.8 |
| 3,906,449 | 9/1975 | Marchak | 340/149 R |
| 3,976,198 | 8/1976 | Carnes et al. | 209/111.7 T |
| 4,041,456 | 8/1977 | Ott et al. | 340/146.3 R |
| 4,096,991 | 6/1978 | Iguchi | 235/419 |
| 4,114,804 | 9/1978 | Jones et al. | 235/476 |
| 4,147,430 | 4/1979 | Gorgone et al. | 356/51 |
| 4,179,685 | 12/1979 | O'Maley | 340/146.3 H |
| 4,250,806 | 2/1981 | Boyson et al. | 101/2 |
| 4,255,651 | 3/1981 | Phillips | 235/92 |
| 4,277,774 | 7/1981 | Fujii et al. | 340/146.3 |
| 4,283,708 | 8/1981 | Lee | 340/146.3 Z |
| 4,288,781 | 9/1981 | Sellner et al. | 340/146.3 Q |
| 4,302,781 | 11/1981 | Ikeda et al. | 358/486 |
| 4,311,914 | 1/1982 | Huber | 250/556 |
| 4,313,598 | 2/1982 | DiBlasio | 271/124 |
| 4,334,619 | 6/1982 | Horino et al. | 209/551 |
| 4,348,656 | 9/1982 | Gorgone et al. | 340/146.3 R |
| 4,349,111 | 9/1982 | Shah et al. | 209/534 |
| 4,352,988 | 10/1982 | Ishida | 250/559 |
| 4,355,300 | 10/1982 | Weber | 340/146.3 C |
| 4,356,473 | 10/1982 | Freudenthal | 340/146.3 H |
| 4,365,700 | 12/1982 | Arimato et al. | 194/2 |
| 4,381,447 | 4/1983 | Horvath et al. | 250/223 |
| 4,386,432 | 5/1983 | Nakamura et al. . | |
| 4,442,541 | 4/1984 | Finkel et al. | 382/7 |
| 4,461,028 | 7/1984 | Okubo | 382/15 |
| 4,464,786 | 8/1984 | Nishito et al. | 382/7 |
| 4,464,787 | 8/1984 | Fish et al. | 382/7 |
| 4,480,177 | 10/1984 | Allen | 235/379 |
| 4,487,306 | 12/1984 | Nao et al. | 382/135 |
| 4,490,846 | 12/1984 | Ishida et al. | 382/7 |
| 4,513,439 | 4/1985 | Gorgone et al. | 382/7 |
| 4,539,702 | 9/1985 | Oka | 382/7 |
| 4,542,829 | 9/1985 | Emery et al. . | |
| 4,547,896 | 10/1985 | Ohtombe et al. | 382/318 |
| 4,553,846 | 11/1985 | Hilton et al. | 356/429 |
| 4,556,140 | 12/1985 | Okada | 194/4 |
| 4,557,597 | 12/1985 | Iwama | 356/71 |
| 4,558,224 | 12/1985 | Gober | 250/460.1 |
| 4,559,451 | 12/1985 | Curl | 250/560 |
| 4,563,771 | 1/1986 | Gorgone et al. | 382/7 |
| 4,567,370 | 1/1986 | Falls | 250/461.1 |
| 4,587,412 | 5/1986 | Apisdorf | 235/449 |
| 4,587,434 | 5/1986 | Roes et al. | 250/556 |
| 4,592,090 | 5/1986 | Curl et al. | 382/7 |
| 4,611,345 | 9/1986 | Ohniski et al. | 382/7 |
| 4,625,870 | 12/1986 | Nao et al. | 209/534 |
| 4,628,194 | 12/1986 | Dobbins et al. | 235/379 |
| 4,645,936 | 2/1987 | Gorgone | 250/556 |
| 4,653,647 | 3/1987 | Hashimoto | 209/534 |
| 4,677,682 | 6/1987 | Miyagawa et al. | 382/7 |
| 4,681,229 | 7/1987 | Uesaka et al. | 209/534 |
| 4,690,268 | 9/1987 | Ueshin | 198/399 |
| 4,694,963 | 9/1987 | Takesako | 209/534 |
| 4,697,071 | 9/1987 | Hiraoka et al. | 235/379 |
| 4,700,368 | 10/1987 | Munn et al. | 377/8 |
| 4,733,308 | 3/1988 | Nakamura et al. | 358/496 |
| 4,747,492 | 5/1988 | Saito et al. | 209/534 |
| 4,764,976 | 8/1988 | Kallin et al. | 382/65 |
| 4,820,909 | 4/1989 | Kawauchi et al. | 235/379 |
| 4,823,393 | 4/1989 | Kawakami | 382/7 |
| 4,827,531 | 5/1989 | Milford | 382/7 |
| 4,881,268 | 11/1989 | Uchida et al. | 382/7 |
| 4,908,516 | 3/1990 | West | 250/556 |
| 4,973,851 | 11/1990 | Lee | 250/556 |
| 4,984,280 | 1/1991 | Abe | 382/7 |
| 4,992,860 | 2/1991 | Hamaguchi et al. | 358/75 |
| 4,996,604 | 2/1991 | Ogawa et al. | 358/486 |
| 5,020,787 | 6/1991 | Arikawa | 271/3 |
| 5,027,415 | 6/1991 | Hara et al. | 382/135 |
| 5,047,871 | 9/1991 | Meyer et al. | 358/486 |
| 5,054,621 | 10/1991 | Murphy et al. | 209/534 |
| 5,055,834 | 10/1991 | Chiba | 382/135 |
| 5,068,519 | 11/1991 | Bryce . | |
| 5,122,754 | 6/1992 | Gotaas | 327/676 |
| 5,163,672 | 11/1992 | Mennie | 271/187 |
| 5,167,313 | 12/1992 | Dobbins et al. | 194/317 |
| 5,172,907 | 12/1992 | Kalisiak | 271/227 |
| 5,199,543 | 4/1993 | Kamagami et al. | 194/207 |
| 5,201,395 | 4/1993 | Takizawa et al. | 194/206 |
| 5,207,788 | 5/1993 | Geib et al. | 271/122 |
| 5,220,395 | 6/1993 | Yamashita et al. | 355/313 |
| 5,236,072 | 8/1993 | Cargill | 194/207 |
| 5,240,116 | 8/1993 | Stevens et al. | 209/534 |
| 5,261,518 | 11/1993 | Bryce | 194/206 |
| 5,295,196 | 3/1994 | Raterman et al. | 382/7 |
| 5,304,813 | 4/1994 | DeMan . | |
| 5,308,992 | 5/1994 | Crane et al. | 250/556 |
| 5,309,515 | 5/1994 | Troung et al. | 382/7 |
| 5,341,408 | 8/1994 | Melcher et al. | 377/8 |
| 5,363,949 | 11/1994 | Matsubayashi | 194/206 |
| 5,367,577 | 11/1994 | Gotaas | 382/135 |
| 5,397,003 | 3/1995 | Stevens et al. | 209/534 |
| 5,430,664 | 7/1995 | Cargill et al. | 364/550 |
| 5,437,357 | 8/1995 | Ota et al. | 382/135 |
| 5,465,821 | 11/1995 | Akioka | 194/207 |
| 5,467,405 | 11/1995 | Raterman et al. | 382/135 |
| 5,467,406 | 11/1995 | Graves et al. | 382/135 |
| 5,478,992 | 12/1995 | Hamada et al. | 235/379 |
| 5,633,949 | 5/1997 | Graves et al. | 382/135 |
| 5,640,463 | 6/1997 | Csulits | 382/135 |

FOREIGN PATENT DOCUMENTS

| | | |
|---|---|---|
| 338123 | 10/1989 | European Pat. Off. . |
| 342647 | 11/1989 | European Pat. Off. . |
| 2190996 | 12/1987 | United Kingdom . |
| 2217086 | 10/1989 | United Kingdom . |
| 2270904 | 3/1994 | United Kingdom . |
| WO 90 07165 | 6/1990 | WIPO . |
| WO 91/11778 | 8/1991 | WIPO . |
| WO 92/17394 | 10/1992 | WIPO . |
| WO 93/23824 | 11/1993 | WIPO . |
| WO 94/19773 | 9/1994 | WIPO . |
| WO 95/24691 | 9/1995 | WIPO . |
| WO 96/10800 | 4/1996 | WIPO . |

OTHER PUBLICATIONS

Brochure by Toyocom, "New Currency Counter with Denomination Recognition, Toyocom NS" (Sep. 26, 1994)(1 page).

Brochure of Mosler Model CS 6600 Optical Currency Counter/Sorter, 4 pages, copyr. 1992.

Chp. 7 of Mosler CF–420 Cash Management System, Operator's Manual, © 1989.

Currency System Intl'l,Mr. W. Kranister in Converstion With Richard Haycock; pp. 1–5; dated: uncertain.

Currency Systems International,Medium Speed Currency Sorting Family, CPS 600 and CPS 900; 4 pages; date:copyr. 1994.

Currency Systems International/CurrencyProcessing Systems, CPS 300; 4 pages; date:uncertain.

Description of Currency Systems International'sCPS 600 and CPS 900 devices; date: uncertain.

Description of Toshiba–MoslerCF–420 Device; believed to be about 1989.

Drawings of portions of Mosler CF–420 Cash Management System (FIGs. A–C) and description of the same (1989).

Glory GFB–200/210/220/230,Desk–Top Bank Note Counter;2 pages; date:uncertain.

Glory GSA–500 Sortmaster brochure;2 pages; date:believed to be prior to Aug. 9, 1994.

Glory Instruction Manual for GFR–100 Currency Reader Couner (Aug. 15, 1995).

Glory UF–1D brochure;2 pages; date: unknown.

JetScan Currency Scanner/Counter, Model 4060, Operator's Manual by Cummins–Allison (Aug. 1991).

JetScan Currency Scanner/Counter, Model 4061, Operating Instructions by Cummins–Allison (Apr. 20, 1993).

JetScan Currency Scanner/Counter, Model 4062, Operating Instructions by Cummins–Allison (Nov. 28, 1994).

Mosler Inc. brochure "The Mosler/Toshiba CF–420", 1989.

News Product News by Toyocom, "Toyocom Currency Counter Now Reads Denominations" (Sep. 26, 1994)(1 page).

Revised Drawings of portions of Mosler CF–420 Cash Management System (FIGs. A–C) and description of the same (1989).

Sale of JetScan Currency Scanner/Counter, Model 4060 (Aug. 1991).

Sale of JetScan Currency Scanner/Counter, Model 4061 (Apr. 20, 1993).

Sale of JetScan Currency Scanner/Counter, Model 4062 (Nov. 28, 1994).

Toshiba–MoslerOperator's Manual for CF–420 Cash Settlement System; pp. 1 to C–3; copyr. 1989 (See eg. pp. 3–10; 4–10; and 5–7).

Toyocom Currency Counter, Model NS–100, "Operation Guide (Preliminary)" (Jun. 13, 1995).

Description summarizing demonstration of Glory Model No. GFRT 1. 1 page (believed to be Dec. 13, 1994).

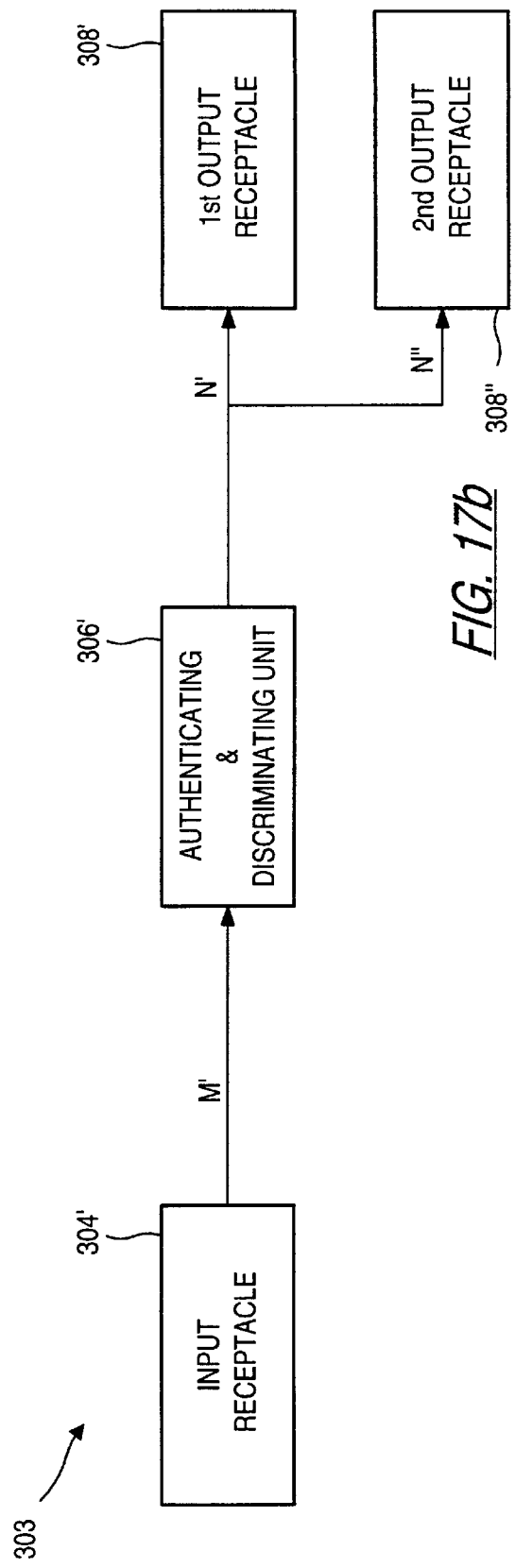

METHOD AND APPARATUS FOR DISCRIMINATING AND COUNTING DOCUMENTS

CROSS-REFERENCE TO RELATED APPLICATIONS

This application claims the benefit of copending U.S. Provisional Patent Applications Ser. Nos. 60/018,563 filed May 29, 1996 for a "Method and Apparatus for Document Identification and Authentication", 60/034,954 filed Jan. 16, 1997 for a "Method and Apparatus for Document Processing"; and Ser. No. 60/038,340 filed Feb. 27, 1997 for a "Two Pocket Currency Discriminator".

This application is a continuation-in-part of pending U.S. patent application Ser. No. 08/573,392 filed Dec. 15, 1995 for a "Method and Apparatus for Discriminating and Counting Documents", now U.S. Pat. No. 5,790,697. U.S. patent application Ser. No. 08/573,392 is a continuation-in-part of the following United States patent applications:

pending application Ser. No. 08/399,854 filed Mar. 7, 1995 for a "Method and Apparatus For Discriminating and Counting Documents", now U.S. Pat. No. 5,875,259;

pending application Ser. No. 08/394,752 filed Feb. 27, 1995 for a "Method of Generating Modified Patterns and Method and Apparatus for Using the Same in a Currency Identification System", now U.S. Pat. No. 5,724,438;

pending application Ser. No. 08/362,848 filed Dec. 22, 1994, for a "Method And Apparatus For Discriminating and Counting Documents", now U.S. Pat. No. 5,870,487;

pending application Ser. No. 08/340,031 filed Nov. 14, 1994, for a "Method And Apparatus For Discriminating and Counting Documents", now U.S. Pat. No. 5,815,592;

pending application Ser. No. 08/317,349 filed Oct. 4, 1994, for a "Method And Apparatus For Authenticating Documents Including Currency", now U.S. Pat. No. 5,640,463;

pending application Ser. No. 08/287,882 filed Aug. 9, 1994 for a "Method and Apparatus for Document Identification", now U.S. Pat. No. 5,652,802;

pending application Ser. No. 08/243,807 filed May 16, 1994, for "Method And Apparatus For Currency Discrimination", now U.S. Pat. No. 5,633,949; and pending application Ser. No. 08/226,660 filed Apr. 12, 1994, for "Method And Apparatus For Currency Discrimination".

U.S. patent application Ser. No. 08/399,854 is a continuation-in-part of U.S. patent applications Ser. No. 08/394,752, Ser. No. 08/340,031, and Ser. No. 08/287,882.

U.S. patent application Ser. No. 08/394,752 is a continuation-in-part of U.S. patent application Ser. No. 08/340,03 1and U.S. patent application Ser. No. 08/127,334 filed Sep. 27, 1993, for a "Method and Apparatus for Currency Discrimination and Counting", now issued as U.S. Pat. No. 5,467,405.

U.S. patent application Ser. No. 08/362,848 is a continuation-in-part of pending U.S. patent application Ser. No. 08/340,031.

U.S. patent application Ser. No. 08/340,031 is a continuation-in-part of U.S. patent application Ser. No. 08/243,807 and U.S. patent application Ser. No. 08/207,592 filed Mar. 8, 1994 for a "Method and Apparatus for Currency Discrimination", now issued as U.S. Pat. No. 5,467,406.

U.S. patent application Ser. No. 08/287,882 is a continuation-in-part of U.S. patent application Ser. No. 08/207,592, U.S. patent application Ser. No. 08/127,334 and abandoned U.S. patent application Ser. No. 08/219,093 filed on Mar. 29, 1994, for a "Currency Discriminator and Authenticator".

U.S. patent application Ser. No. 08/243,807 is a continuation-in-part of U.S. patent applications Ser. No. 08/219,093 and Ser. No. 08/127,334.

U.S. patent application Ser. No. 08/226,660 is a continuation-in-part of U.S. patent application Ser. No. 08/127,334.

Abandoned U.S. patent application Ser. No. 08/219,093 is a continuation-in-part of U.S. patent application Ser. No. 08/127,334.

U.S. patent application Ser. No. 08/207,592, issued as U.S. Pat. No. 5,467,406, is a continuation-in-part of U.S. patent application Ser. No. 08/127,334.

U.S. patent application Ser. No. 08/127,334, issued as U.S. Pat. No. 5,467,405, is a continuation of U.S. patent application Ser. No. 07/885,648, filed on May 19, 1992, and issued as U.S. Pat. No. 5,295,196, for a "Method and Apparatus for Currency Discrimination and Counting," which is a continuation-in-part of abandoned U.S. patent application Ser. No. 07/475,111, filed Feb. 5, 1990, for a "Method and Apparatus for Currency Discrimination and Counting."

FIELD OF THE INVENTION

The present invention relates, in general, to currency identification. More specifically, the present invention relates to an apparatus and method for receiving a stack of currency bills, rapidly discriminating the denomination and/or authenticating the genuineness the bills in the stack and re-stacking the bills.

BACKGROUND OF THE INVENTION

Machines that are currently available for simultaneous scanning and counting of documents such as paper currency are relatively complex and costly, and relatively large in size. The complexity of such machines can also lead to excessive service and maintenance requirements. These drawbacks have inhibited more widespread use of such machines, particularly in banks and other financial institutions where space is limited in areas where the machines are most needed, such as teller areas. The above drawbacks are particularly difficult to overcome in machines which offer much-needed features such as the ability to scan bills regardless of their orientation relative to the machine or to each other, and the ability to authenticate genuineness and/or denomination of the bills.

Currency discrimination systems typically employ either magnetic sensing or optical sensing for discriminating among different currency denominations. Magnetic sensing is based on detecting the presence or absence of magnetic ink in portions of the printed indicia on the currency by using magnetic sensors, usually ferrite core-based sensors, and using the detected magnetic signals, after undergoing analog or digital processing, as the basis for currency discrimination. A variety of currency characteristics can be measured using magnetic sensing. These include detection of patterns of changes in magnetic flux, patterns of vertical grid lines in the portrait area of bills, the presence of a security thread, total amount of magnetizable material of a bill, patterns from sensing the strength of magnetic fields along a bill, and other patterns and counts from scanning different portions of the bill such as the area in which the denomination is written out.

The more commonly used optical sensing techniques, on the other hand, are based on detecting and analyzing variations in light reflectance or transmissivity characteristics occurring when a currency bill is illuminated and scanned by a strip of focused light. The subsequent currency discrimination is based on the comparison of sensed optical characteristics with prestored parameters for different currency denominations, while accounting for adequate tolerances reflecting differences among individual bills of a given denomination. A variety of currency characteristics can be measured using optical sensing. These include detection of a bill's density, color, length and thickness, the presence of a security thread and holes, and other patterns of reflectance and transmission. Color detection techniques may employ color filters, colored lamps, and/or dichroic beamsplitters.

In addition to magnetic and optical sensing, other techniques of detecting characteristic information of currency include electrical conductivity sensing, capacitive sensing (such as for watermarks, security threads, thickness, and various dielectric properties) and mechanical sensing (such as for size, limpness, and thickness).

A major obstacle in implementing automated currency discrimination systems is obtaining an optimum compromise between the criteria used to adequately define the characteristic pattern for a particular currency denomination, the time required to analyze test data and compare it to predefined parameters in order to identify the currency bill under scrutiny, and the rate at which successive currency bills may be mechanically fed through and scanned. Even with the use of microprocessors for processing the test data resulting from the scanning of a bill, a finite amount of time is required for acquiring samples and for the process of comparing the test data to stored parameters to identify the denomination of the bill.

It has been found that scanning U.S. bills of different denominations along a central portion thereof provides scanning patterns sufficiently divergent to enable accurate discrimination between different denominations. Such a discrimination device is disclosed in U.S. Pat. No. 5,295,196.

In some currency discriminators bills are transported, one at a time, past a discriminating unit. As the bills pass the discriminating unit, the denomination of each bill is determined and a running total of each particular currency denomination and/or of the total value of the bills that are processed is maintained.

Therefore, there is a need for an apparatus which is capable of discriminating among, authenticating, and counting bills of several currency denominations at a high speed with a high degree of accuracy into a plurality of output receptacles that overcomes the problems associated with transporting and evaluating bills in their long dimension.

SUMMARY OF THE INVENTION

It is an object of the present invention to provide an improved method and apparatus for identifying, authenticating, and counting currency bills comprising a plurality of currency denominations. It is an object of the present invention to provide an improved method and apparatus for discriminating among currency bills comprising a plurality of currency denominations.

It is another object of this invention to provide an improved method and apparatus of the above kind which is capable of efficiently discriminating among, authenticating, and counting bills of several currency denominations at a high speed and with a high degree of accuracy.

It is another object of this invention to provide an improved method and apparatus of the above kind which is capable of efficiently discriminating among, authenticating, and counting bills of several currency denominations at a high speed while the bills are being transported in the direction of its narrow dimension into a plurality of output receptacles.

A related object of the present invention is to provide such an improved currency discrimination and counting apparatus which is compact, economical, and has uncomplicated construction and operation.

Another object of this invention is to provide such an improved currency scanning and counting machine that is relatively inexpensive to manufacture and maintain, and which also facilitates service and maintenance. In this connection, a related object of the invention is to provide such a machine having a relatively small number of parts, and in which most of the parts are arranged in a manner to have a long operating life with little or no maintenance.

Other objects and advantages of the invention will become apparent upon reading the following detailed description in conjunction with the accompanying drawings.

In accordance with one embodiment of the present invention, the foregoing objectives are realized by providing a currency evaluating device for receiving a stack of currency bills, rapidly counting, authenticating and discriminating the bills in the stack, and then re-stacking the bills. This device includes an input receptacle for receiving a stack of currency bills to be discriminated, a discriminating unit for determining the currency bills by denomination, an authenticating unit for determining the genuineness of the bills, a plurality of output receptacles for receiving the currency bills at a rate in excess of about 800 bills per minute after they have been discriminated, and a transport mechanism for transporting the currency bills, one at a time, from the input receptacle past the discriminating unit and to one of a number of output receptacles. For example, the evaluating device may include six output receptacles. The evaluating device may comprise one or more counters keeping track of the value of bills discriminated.

In accordance with one embodiment of the present invention, the objectives enumerated above are achieved by scanning a document along one or more segments, generating one or more scanned patterns therefrom, and comparing the one or more scanned patterns to one or more master patterns associated with scans along corresponding segments of genuine documents. In an other embodiment, a first and a second characteristic information from a scanned bill are compared to respective scanned patterns to indicate the genuineness of the bill. According to the present invention, bills are fed in and scanned across their narrow dimension.

In one embodiment, the invention is particularly adapted to be implemented with a system programmed to track each identified currency identity so as to conveniently present aggregate totals for bills that have been identified at the end of a scan run. One embodiment counts bills and transporting the bills about their narrow dimension across a scanhead and into one of a plurality of output receptacles where the sensed and counted bills are collected. In one embodiment, a scanhead of the present invention operates in conjunction with an optical encoder which is adapted to initiate the capture of a predefined number of reflectance data samples when a bill (and, thus, the indicia or pattern printed thereupon) moves across a coherent strip of light focused by the scanhead.

BRIEF DESCRIPTION OF THE DRAWINGS

FIG. 17a is a functional block diagram illustrating one embodiment of a document authenticator and discriminator;

FIG. 17b is a functional block diagram illustrating another embodiment of a document authenticator and discriminator;

DETAILED DESCRIPTION OF THE EMBODIMENTS

According to one embodiment of the present invention, a currency discrimination system adapted to U.S. currency is described. Furthermore, while the embodiments below entail the scanning of currency bills, the system of the present invention is applicable to other documents as well. For example, the system of the present invention may be employed in conjunction with stock certificates, bonds, and postage and food stamps.

Figure 1A:
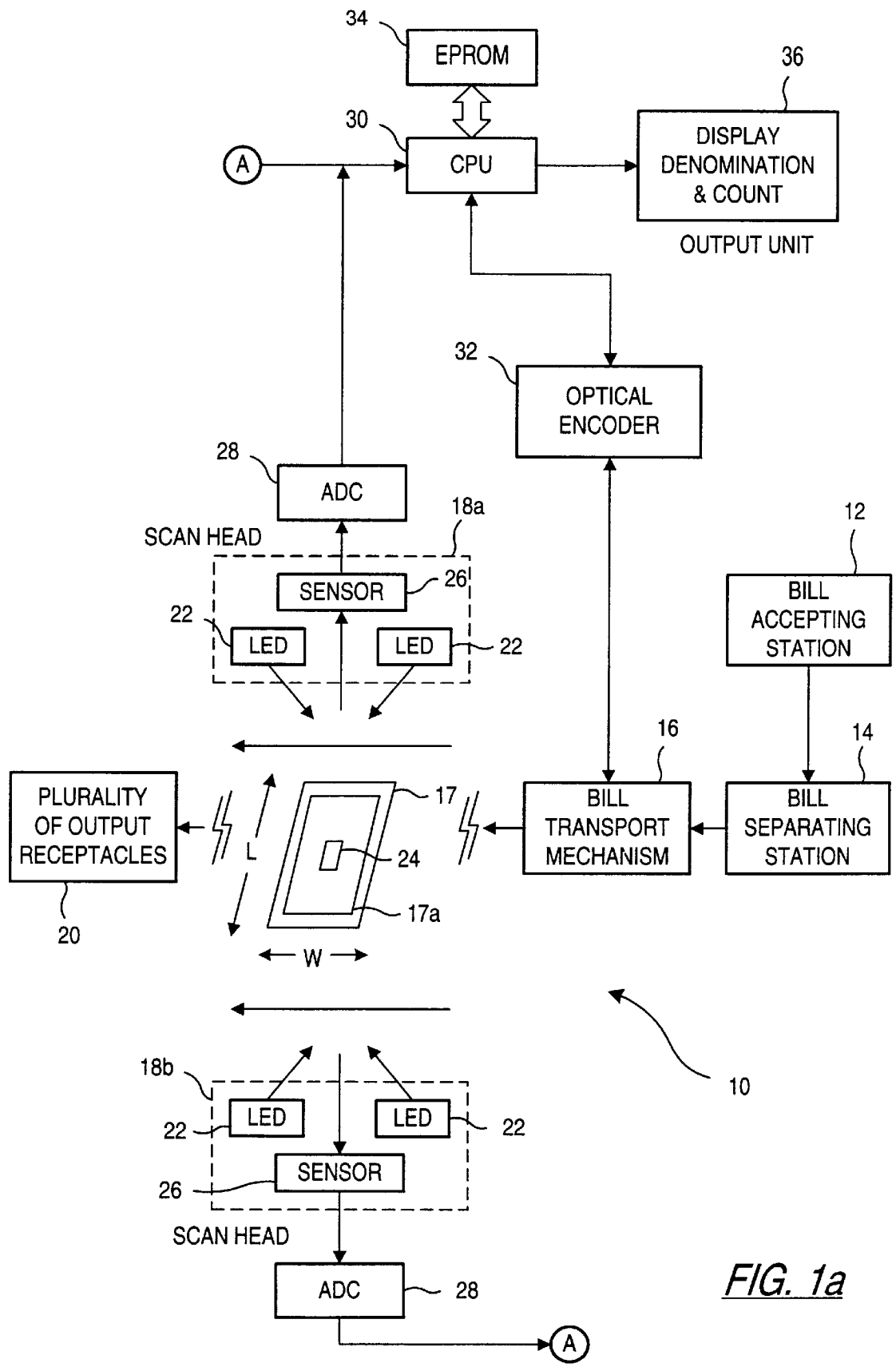
FIG. 1a is a functional block diagram of the currency evaluating machine of FIG. 1 illustrating a scanhead arranged on each side of a transport path.
Figure 9:
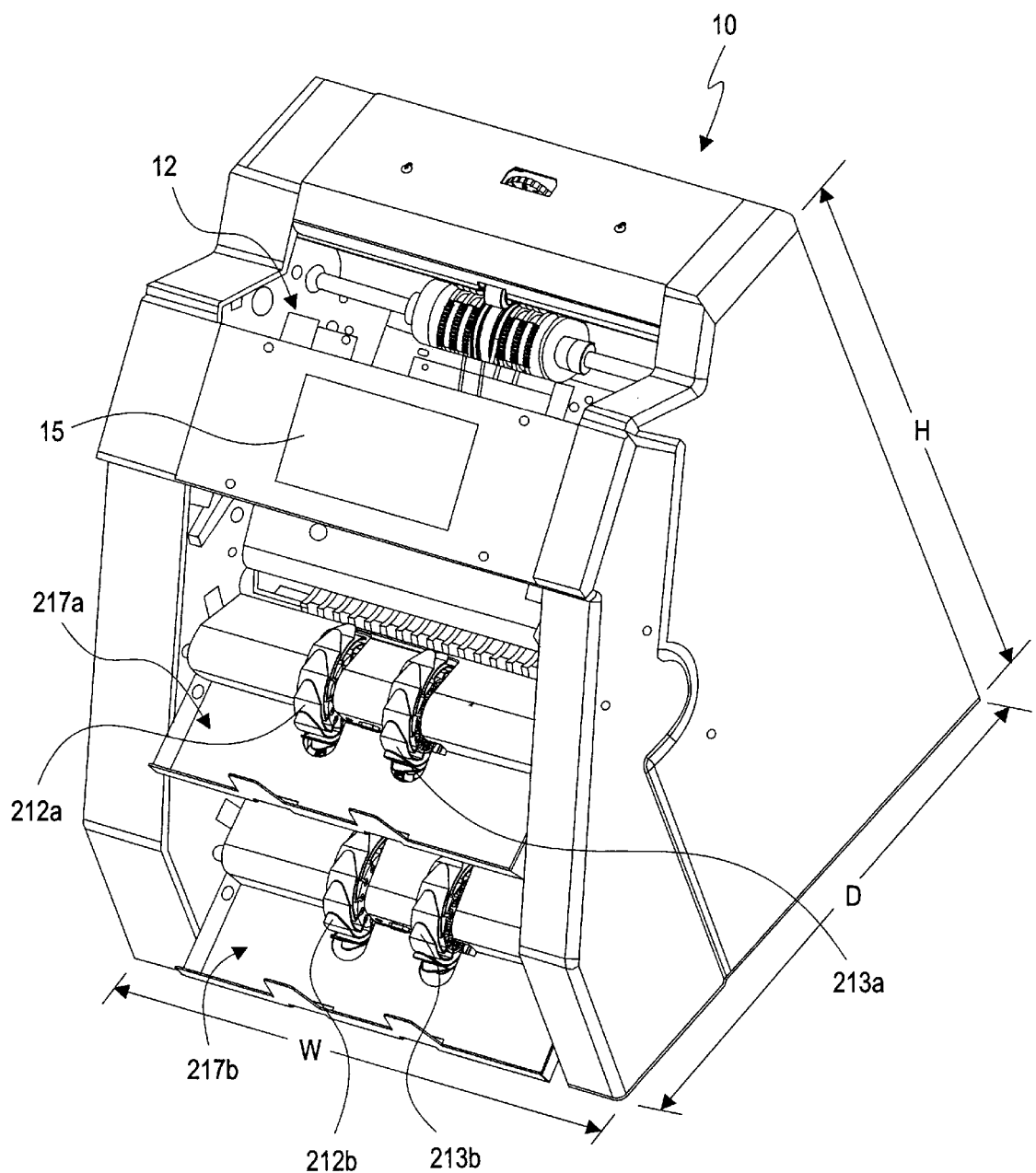
FIG. 9 is a perspective view of a currency evaluating machine according to one embodiment of the present invention.

Referring now to FIGS. 1a and 9, there is shown one embodiment of a currency evaluating machine 10 according to the present invention. The machine 10 includes an input receptacle or bill accepting station 12 where stacks of currency bills that need to be identified and counted are positioned. Bills in the input receptacle are acted upon by a bill separating station 14 which functions to pick out or separate one bill at a time for being sequentially relayed by a bill transport mechanism 16 (FIG. 1a), according to a precisely predetermined transport path, between a pair of scanheads 18a, 18b where the currency denomination of the bill is scanned and identified. In one embodiment, bills are scanned and identified at a rate in excess of 800 bills per minute. According to another embodiment, bills are scanned at a rate in excess of 1000 bills per minute.

In the embodiment depicted in FIG. 1a, each scanhead 18a, 18b is an optical scanhead that scans for characteristic information from a scanned bill 17 which is used to identify the denomination of the bill. The scanned bill 17 is then transported to one of a plurality of output receptacles or bill stacking stations 20 where bills so processed are stacked for subsequent removal.

Each optical scanhead 18a, 18b preferably comprises a pair of light sources 22 directing light onto the bill transport path so as to illuminate a substantially rectangular light strip 24 upon a currency bill 17 positioned on the transport path adjacent the scanhead 18. Light reflected off the illuminated strip 24 is sensed by a photodetector 26 positioned between the two light sources. The analog output of the photodetector 26 is converted into a digital signal by means of an analog-to-digital (ADC) converter unit 28 whose output is fed as a digital input to a central processing unit (CPU) 30.

Referring still to FIG. 1a, the bill transport path is defined in such a way that the transport mechanism 16 moves currency bills with the narrow dimension of the bills being parallel to the transport path and the scan direction. As a bill 17 traverses the scanheads 18a, 18b, the light strip 24 effectively scans the bill across the narrow dimension of the bill. In the embodiment depicted, the transport path is so arranged that a currency bill 17 is scanned across a central section of the bill along its narrow dimension, as shown in FIG. 1a. Each scanhead functions to detect light reflected from the bill as it moves across the illuminated light strip 24 and to provide an analog representation of the variation in reflected light, which, in turn, represents the variation in the dark and light content of the printed pattern or indicia on the surface of the bill. This variation in light reflected from the narrow dimension scanning of the bills serves as a measure for distinguishing, with a high degree of confidence, among a plurality of currency denominations which the system is programmed to handle.

A series of such detected reflectance signals are obtained across the narrow dimension of the bill, or across a selected segment thereof, and the resulting analog signals are digitized under control of the CPU 30 to yield a fixed number of digital reflectance data samples. The data samples are then subjected to a normalizing routine for processing the sampled data for improved correlation and for smoothing out variations due to "contrast" fluctuations in the printed pattern existing on the bill surface. The normalized reflectance data represents a characteristic pattern that is unique for a given bill denomination and provides sufficient distinguishing features among characteristic patterns for different currency denominations.

In order to ensure strict correspondence between reflectance samples obtained by narrow dimension scanning of successive bills, the reflectance sampling process is preferably controlled through the CPU 30 by means of an optical encoder 32 which is linked to the bill transport mechanism 16 and precisely tracks the physical movement of the bill 17 between the scanheads 18a, 18b. More specifically, the optical encoder 32 is linked to the rotary motion of the drive motor which generates the movement imparted to the bill along the transport path. In addition, the mechanics of the feed mechanism ensure that positive contact is maintained between the bill and the transport path, particularly when the bill is being scanned by the scanheads. Under these conditions, the optical encoder 32 is capable of precisely tracking the movement of the bill 17 relative to the light strips 24 generated by the scanheads 18a, 18b by monitoring the rotary motion of the drive motor.

The outputs of the photodetectors 26 are monitored by the CPU 30 to initially detect the presence of the bill adjacent the scanheads and, subsequently, to detect the starting point of the printed pattern on the bill, as represented by the thin borderline 17a which typically encloses the printed indicia on currency bills. Once the borderline 17a has been detected, the optical encoder 32 is used to control the timing and number of reflectance samples that are obtained from the outputs of the photodetectors 26 as the bill 17 moves across the scanheads 18a, 18b.

Figure 1B:
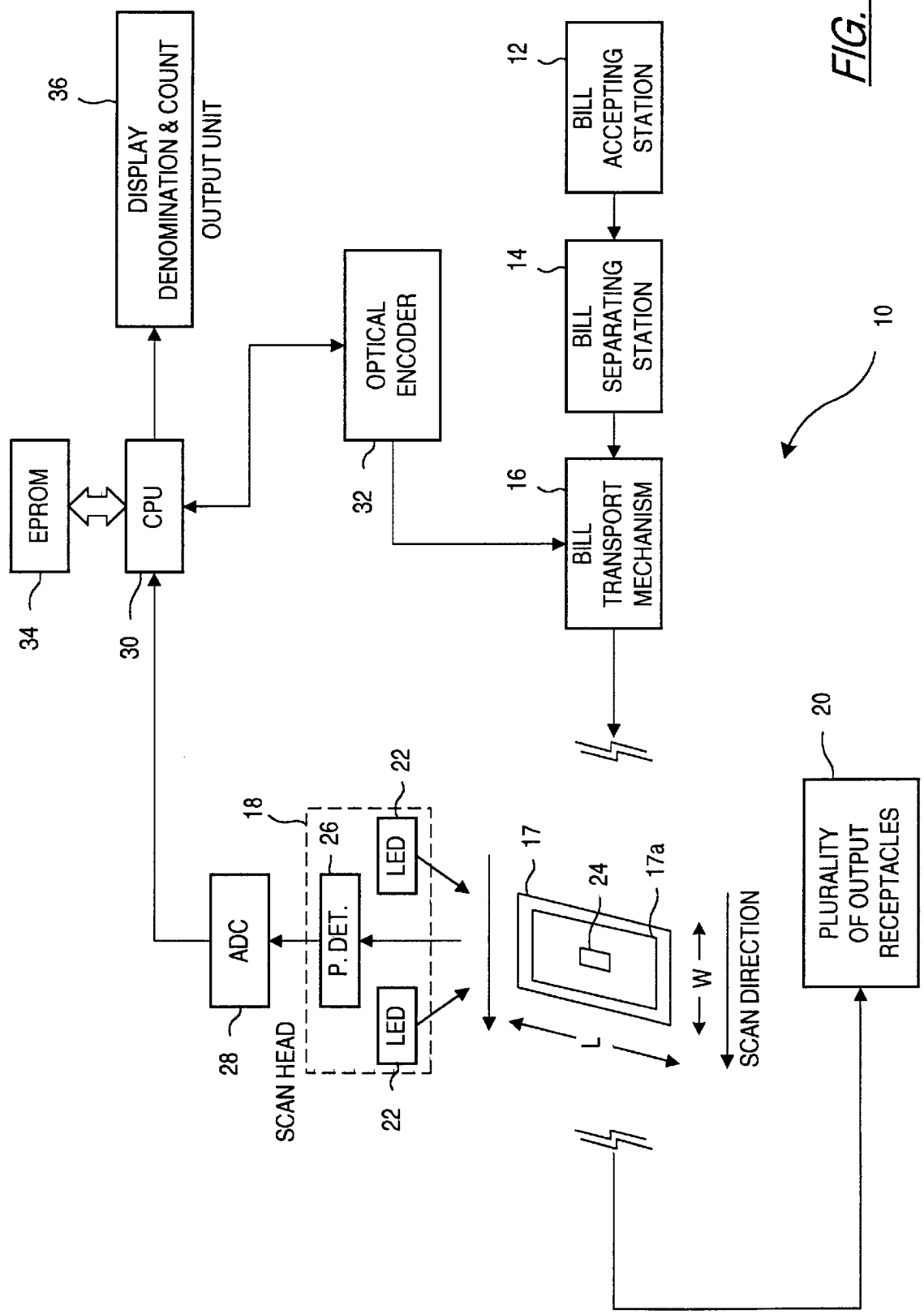
FIG. 1b is a functional block diagram of the currency evaluating machine illustrating a scanhead arranged on a single side of a transport path.
Figure 4:
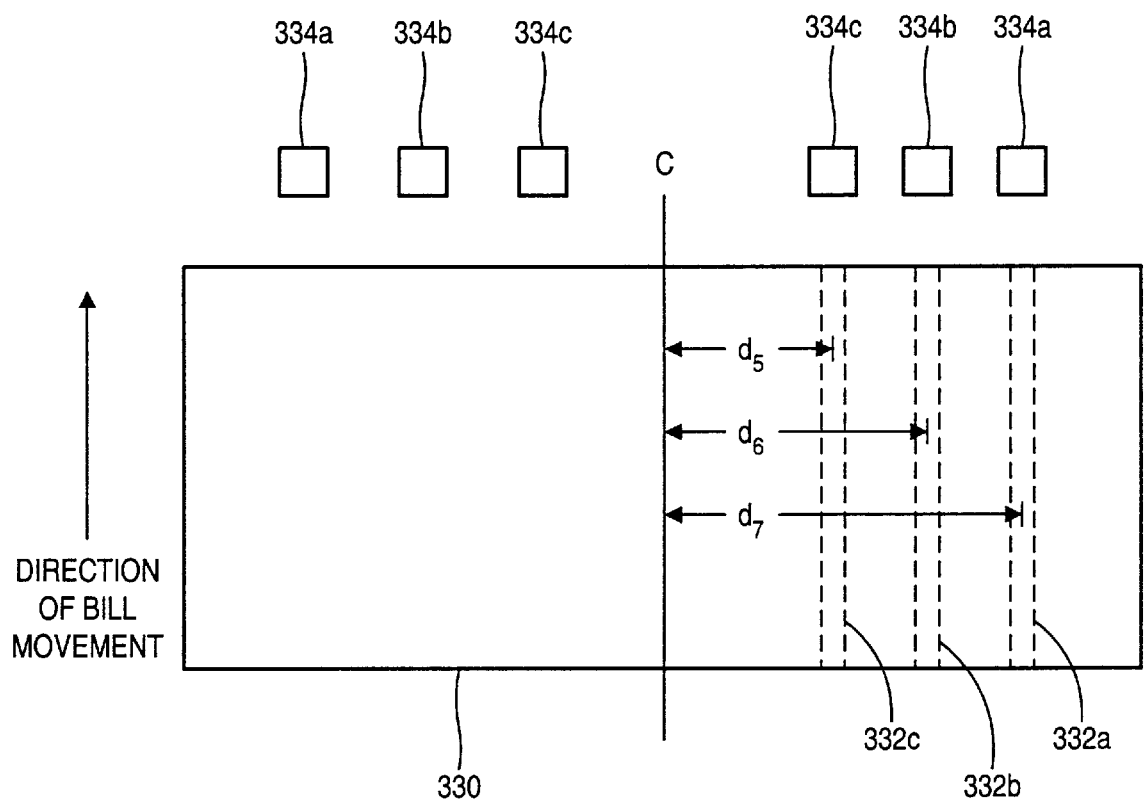
FIG. 4 is a top view of thread sensors of a document discriminating/authenticating system.

FIG. 1b illustrates one embodiment of a currency evaluating machine 10 similar to that of FIG. 1a but has a scanhead on only a single side of the transport path. As illustrated in FIG. 1b, the transport mechanism 16 moves currency bills with a narrow dimensions being parallel to the transport path and the scan direction. FIGS. 1b and 4 illustrate bills oriented with their narrow dimension "W" parallel to the direction of movement and scanning.

Figure 1C:
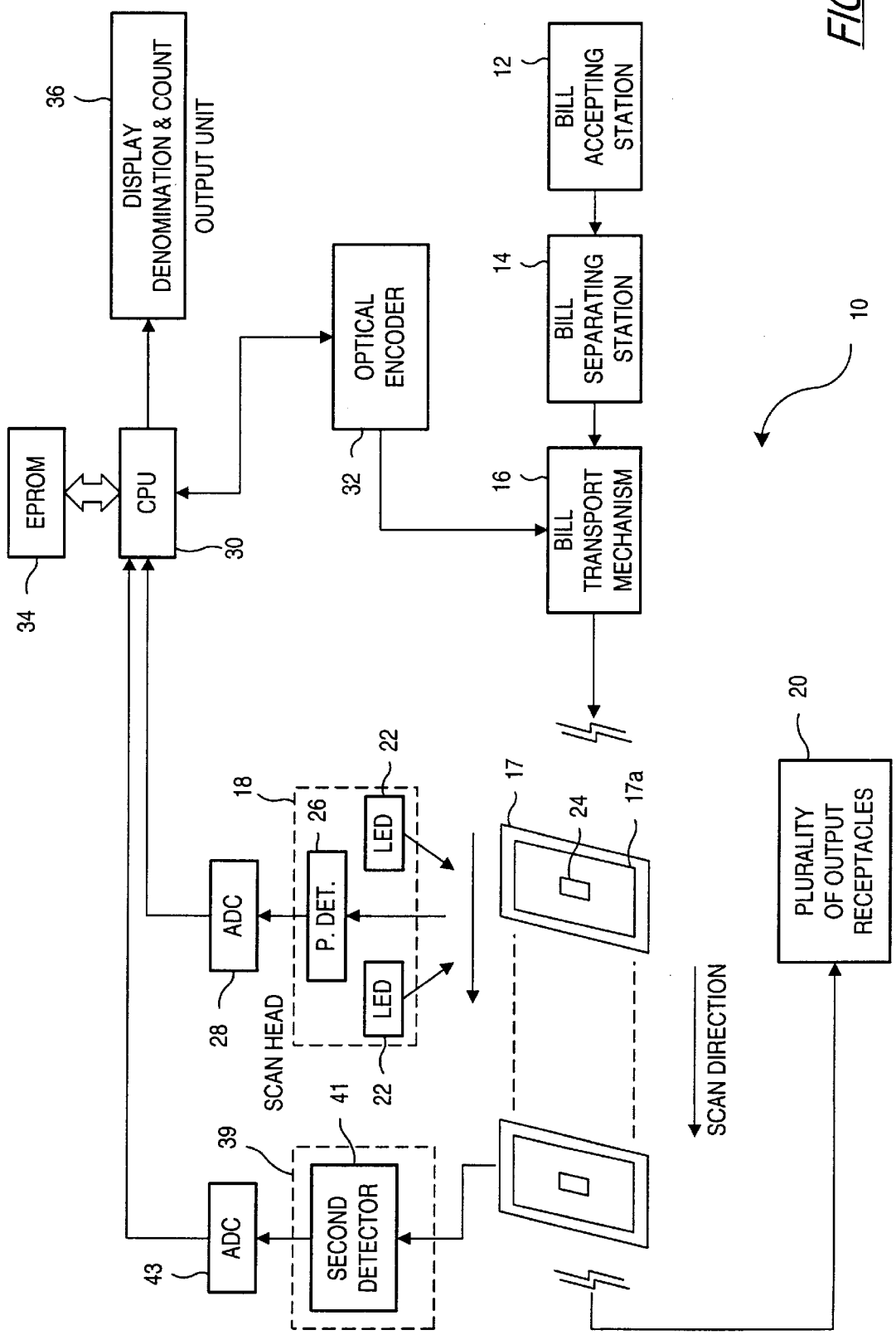
FIG. 1c is a functional block diagram of the currency evaluating machine similar to that of FIGS. 1a–1b illustrating the employment of a second characteristic detector.

Referring now to FIG. 1c, there is shown a functional block diagram illustrating one embodiment of a currency discriminating and authenticating system according to the present invention. The operation of the system of FIG. 1c is the same as that of FIG. 1a except as modified below. The machine 10 includes a bill accepting station 12 where stacks of currency bills that need to be identified, authenticated, and counted are positioned. Accepted bills are acted upon by a bill separating station 14 which functions to pick out or separate one bill at a time for being sequentially relayed by a bill transport mechanism 16, according to a precisely predetermined transport path, across two scanheads 18 and 39 where the currency denomination of the bill is identified and the genuineness of the bill is authenticated.

In the embodiment depicted, scanhead 18 is an optical scanhead that scans for a first type of characteristic information from a scanned bill 17 which is used to identify the denomination of the bill. A second scanhead 39 scans for a second type of characteristic information from the scanned bill 17. While in the illustrated embodiment scanheads 18 and 39 are separate and distinct, it is understood that these may be incorporated into a single scanhead. For example, where the first characteristic sensed is intensity of reflected light and the second characteristic sensed is color, a single optical scanhead having a plurality of detectors, one or more without filters and one or more with colored filters, may be employed (U.S. Pat. No. 4,992, 860 incorporated herein by reference). The scanned bill is then transported to one of a plurality of output receptacles 20 where bills so processed are stacked for subsequent removal.

The optical scanhead 18 of the embodiment depicted in FIG. 1c comprises at least one light source 22 directing a beam of coherent light downwardly onto the bill transport path so as to illuminate a substantially rectangular light strip 24 upon a currency bill 17 positioned on the transport path below the scanhead 18. Light reflected off the illuminated strip 24 is sensed by a photodetector 26 positioned directly above the strip. The analog output of photodetector 26 is converted into a digital signal by means of an analog-to-digital (ADC) converter unit 28 whose output is fed as a digital input to a central processing unit (CPU) 30.

The second scanhead 39 comprises at least one detector 41 for sensing a second type of characteristic information from a bill. The analog output of the detector 41 is converted into a digital signal by means of a second analog to digital converter 43 whose output is also fed as a digital input to the central processing unit (CPU) 30.

While scanhead 18 in the embodiment of FIG. 1c is an optical scanhead, it should be understood that the first and second scanheads 18 and 39 may be designed to detect a variety of characteristic information from currency bills. Additionally these scanheads may employ a variety of detection means such as magnetic or optical sensors. For example, the scanhead may employ a magnetoresistive sensor or a plurality of such sensors including an array of such sensors. Such a sensor or sensors may, for example, be used to detect magnetic flux. A magnetic sensor or sensors may be employed such as the Gradiometer available from NVE Nonvolatile Electronics, Inc., Eden Praire, Minn. For example, a magnetoresistive sensor may be employed to detect, for example, magnetic flux. Examples of magnetoresistive sensors are described in, for example, U.S. Pat. Nos. 5,119,025, 4,683,508, 4,413,296, 4,388,662, and 4,164,770. Additionally, other types of magnetic sensors may be employed of detecting magnetic flux such as Hall effect sensors and flux gates.

A variety of currency characteristics can be measured using magnetic sensing. These include detection of patterns of changes in magnetic flux (U.S. Pat. No. 3,280,974), patterns of vertical grid lines in the portrait area of bills (U.S. Pat. No. 3,870,629), the presence of a security thread (U.S. Pat. No. 5,151,607), total amount of magnetizable material of a bill (U.S. Pat. No. 4,617,458), patterns from sensing the strength of magnetic fields along a bill (U.S. Pat. No. 4,593,184), and other patterns and counts from scanning different portions of the bill such as the area in which the denomination is written out (U.S. Pat. No. 4,356,473). An additional type of magnetic detection system is described in U.S. Pat. No. 5,418,458.

With regards to optical sensing, a variety of currency characteristics can be measured such as detection of density (U.S. Pat. No. 4,381,447), color (U.S. Pat. Nos. 4,490,846; 3,496,370; 3,480,785), length and thickness (U.S. Pat. No. 4,255,651), the presence of a security thread (U.S. Pat. No. 5,151,607) and holes (U.S. Pat. No. 4,381,447), and other patterns of reflectance and transmission (U.S. Pat. No. 3,496,370; 3,679,314; 3,870,629; 4,179,685). Color detection techniques may employ color filters, colored lamps, and/or dichroic beamsplitters (U.S. Pat. Nos. 4,841,358; 4,658,289; 4,716,456; 4,825,246, 4,992,860 and EP 325, 364).

Figure 2A:
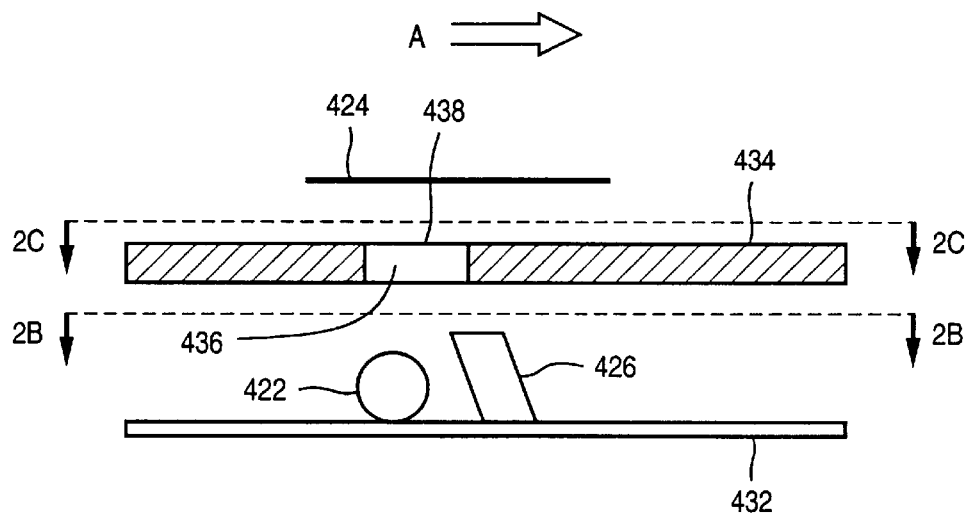
FIG. 2a is a side view of one embodiment of a document authenticating system according to the present invention.
Figure 2B:
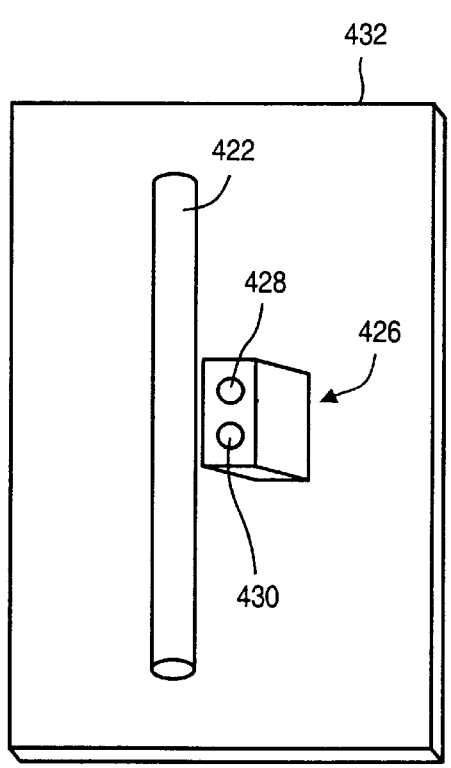
FIG. 2b is a top view of the embodiment of FIG. 2a along the direction 2B.
Figure 2C:
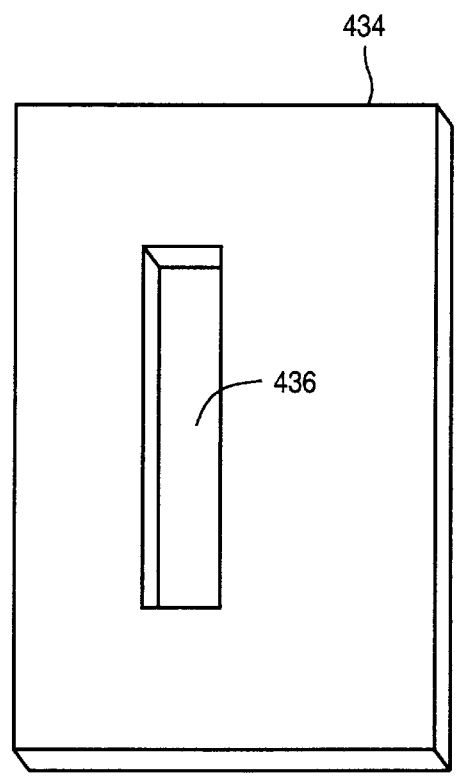
FIG. 2c is a top view of the embodiment of FIG. 2a along the direction 2C.

Referring now to FIGS. 2a–2c, there is shown a side view of one embodiment of a document authenticating system according to an embodiment using ultraviolet light, a top view of the embodiment of FIG. 2a along the direction 2B, and a top view of the embodiment of FIG. 2a along the direction 2C, respectively. The evaluating system of FIGS. 2a–2c may be employed, for example, as a second scanhead, such as scanhead 39 of FIG. 1c, to detect characteristic information to authenticate bills. An ultraviolet ("UV") light source 422 illuminates a document 424. Depending upon the characteristics of the document, ultraviolet light may be reflected off the document and/or fluorescent light may be emitted from the document. A detection system 426 is positioned so as to receive any light reflected or emitted toward it but not to receive any UV light directly from the light source 422. The detection system 426 comprises a UV sensor 428, a fluorescence sensor 430, filters, and a plastic housing. The light source 422 and the detection system 426 are both mounted to a printed circuit board 432. The document 424 is transported in the direction indicated by arrow A by a transport system (not shown). The document is transported over a transport plate 434 which has a rectangular opening 436 in it to permit passage of light to and from the document. In one embodiment of the present invention, the rectangular opening 436 is 1.375 inches (3.493 cm) by 0.375 inches (0.953 cm). To minimize dust accumulation onto the light source 422 and the detection system 426 and to prevent document jams, the opening 436 is covered with a transparent UV transmitting acrylic window 438. To further reduce dust accumulation, the UV light source 422 and the detection system 426 are completely enclosed within a housing (not shown) comprising the transport plate 434.

Figure 3:
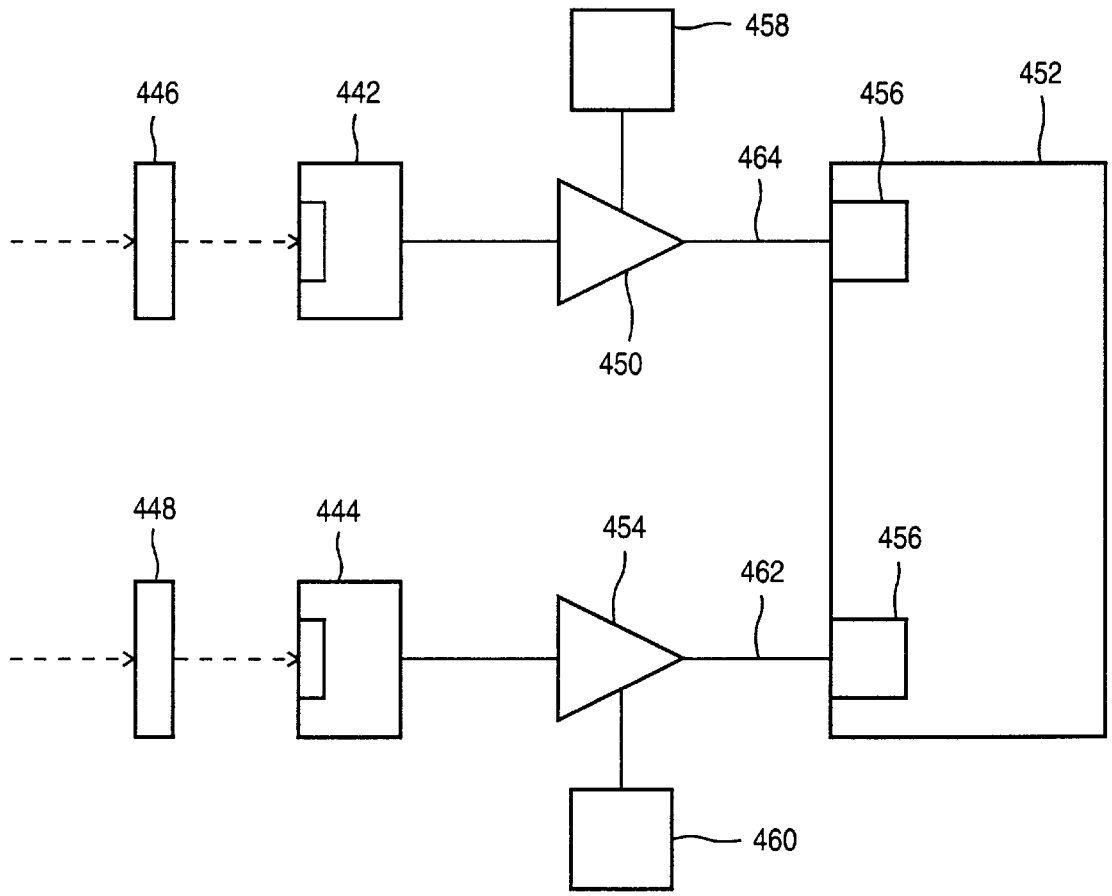
FIG. 3 is a functional block diagram illustrating one embodiment of a document authenticating system according to the present invention.

Referring now to FIG. 3, there is shown a functional block diagram illustrating one embodiment of a document evaluating system according to the present invention. FIG. 3 shows an UV sensor 442, a fluorescence sensor 444, and filters 446, 448 of a detection system such as the detection system 426 of FIG. 2. Light from the document passes through the filters 446, 448 before striking the sensors 442, 444, respectively. An ultraviolet filter 446 filters out visible light and permits UV light to be transmitted and hence to strike UV sensor 442. Similarly, a visible light filter 448 filters out UV light and permits visible light to be transmitted and hence to strike fluorescence sensor 444. Accordingly, UV light, which has a wavelength below 400 nm, is prevented from striking the fluorescence sensor 444 and visible light, which has a wavelength greater than 400 nm, is prevented from striking the UV sensor 442. In one embodiment the UV filter 446 transmits light having a wavelength between about 260 nm and about 380 nm and has a peak transmittance at 360 nm. In one embodiment, the visible light filter 448 is a blue filter and preferably transmits light having a wavelength between about 415 nm and about 620 nm and has a peak transmittance at 450 nm. The above preferred blue filter comprises a combination of a blue component filter and a yellow component filter. The blue component filter transmits light having a wavelength between about 320 nm and about 620 nm and has a peak transmittance at 450 nm. The yellow component filter transmits light having a wavelength between about 415 nm and about 2800 nm. Examples of suitable filters are UG1 (UV filter), BG23 (blue bandpass filter), and GG420 (yellow longpass filter), all manufactured by Schott. In one embodiment the filters are about 8 mm in diameter and about 1.5 mm thick.

The UV sensor 442 outputs an analog signal proportional to the amount of light incident thereon and this signal is amplified by amplifier 450 and fed to a microcontroller 452. Similarly, the fluorescence sensor 444 outputs an analog signal proportional to the amount of light incident thereon and this signal is amplified by amplifier 454 and fed to a microcontroller 452. Analog-to-digital converters 456 within the microcontroller 452 convert the signals from the amplifiers 450, 454 to digital and these digital signals are processed by the software of the microcontroller 452. The UV sensor 442 may be, for example, an ultraviolet enhanced photodiode sensitive to light having a wavelength of about 360 nm and the fluorescence sensor 444 may be a blue enhanced photodiode sensitive to light having a wavelength of about 450 nm. Such photodiodes are available from, for example, Advanced Photonix, Inc., Mass. The microcontroller 452 may be, for example, a Motorola 68HC 16.

The exact characteristics of the sensors 442, 444 and the filters 446, 448 including the wavelength transmittance ranges of the above filters are not as critical to the present invention as the prevention of the fluorescence sensor from generating an output signal in response to ultraviolet light and the ultraviolet sensor from generating an output signal in response to visible light. For example, instead of, or in addition to, filters, a authentication system according to the present invention may employ an ultraviolet sensor which is not responsive to light having a wavelength longer than 400 nm and/or a fluorescence sensor which is not responsive to light having a wavelength shorter than 400 nm.

Calibration potentiometers 458, 460 permit the gains of amplifiers 450, 454 to be adjusted to appropriate levels. Calibration may be performed by positioning a piece of white fluorescent paper on the transport plate 434 so that it completely covers the rectangular opening 436 of FIG. 2. The potentiometers 458, 460 may then be adjusted so that the output of the amplifiers 450, 454 is 5 volts. Alternatively, calibration may be performed using genuine currency such as a piece of genuine U.S. currency. Potentiometers 458 and 460 may be replaced with electronic potentiometers located, for example, within the microcontroller 452. Such electronic potentiometers may permit automatic calibration based on the processing of a single genuine document or a plurality of documents as will be described below.

The implementation of one embodiment of a document authenticating system according to the present invention as illustrated in FIG. 3 with respect to the authentication of U.S. currency will now be described. As discussed above, it has been determined that genuine United States currency reflects a high level of ultraviolet light and does not fluoresce under ultraviolet illumination. It has also been determined that under ultraviolet illumination counterfeit United States currency exhibits one of the four sets of characteristics listed below:

1) Reflects a low level of ultraviolet light and fluoresces;
2) Reflects a low level of ultraviolet light and does not fluoresces;
3) Reflects a high level of ultraviolet light and fluoresces;
4) Reflects a high level of ultraviolet light and does not fluoresce.

Counterfeit bills in categories (1) and (2) may be detected by a currency authenticator employing an ultraviolet light reflection test according to one embodiment of the present invention. Counterfeit bills in category (3) may be detected by a currency authenticator employing both an ultraviolet reflection test and a fluorescence test according to another embodiment of the present invention. Only counterfeits in category (4) are not detected by the authenticating methods of the present invention.

According to one embodiment of the present invention, fluorescence is determined by any signal that is above the noise floor. Thus, the amplified fluorescent sensor signal 462 will be approximately 0 volts for genuine U.S. currency and will vary between approximately 0 and 5 volts for counterfeit bills depending upon their fluorescent characteristics. Accordingly, an authenticating system according to one embodiment of the present invention will reject bills when signal 462 exceeds approximately 0 volts.

According to one embodiment of the present invention, a high level of reflected UV light ("high UV") is indicated when the amplified UV sensor signal 464 is above a predetermined threshold. The high/low UV threshold is a function of lamp intensity and reflectance. Lamp intensity can degrade by as much as 50% over the life of the lamp and can be further attenuated by dust accumulation on the lamp and the sensors. The problem of dust accumulation is mitigated by enclosing the lamp and sensors in a housing as discussed above. An authenticating system according to one embodiment of the present invention tracks the intensity of the UV light source and readjusts the high/low threshold accordingly. The degradation of the UV light source may be compensated for by periodically feeding a genuine bill into the system, sampling the output of the UV sensor, and adjusting the threshold accordingly. Alternatively, degradation may be compensated for by periodically sampling the output of the UV sensor when no bill is present in the rectangular opening 436 of the transport plate 434. It is noted that a certain amount of UV light is always reflected off the acrylic window 438. By periodically sampling the output of the UV sensor when no bill is present, the system can compensate for light source degradation. Furthermore, such sampling could also be used to indicate to the operator of the system when the ultraviolet light source has burned out or otherwise requires replacement. This may be accomplished, for example, by means of a display reading or an illuminated light emitting diode ("LED"). The amplified ultraviolet sensor signal 464 will initially vary between 1.0 and 5.0 volts depending upon the UV reflectance characteristics of the document being scanned and will slowly drift downward as the light source degrades. In an alternative embodiment to one embodiment wherein the threshold level is adjusted as the light source degrades, the sampling of the UV sensor output may be used to adjust the gain of the amplifier 450 thereby maintaining the output of the amplifier 450 at its initial levels.

It has been found that the voltage ratio between counterfeit and genuine U.S. bills varies from a discernible 2-to-1ratio to a non-discernible ratio. According to one embodiment of the present invention a 2-to-1ratio is used to discriminate between genuine and counterfeit bills. For example, if a genuine U.S. bill generates an amplified UV output sensor signal 464 of 4.0 volts, documents generating an amplified UV output sensor signal 464 of 2.0 volts or less will be rejected as counterfeit. As described above, this threshold of 2.0 volts may either be lowered as the light source degrades or the gain of the amplifier 450 may be adjusted so that 2.0 volts remains an appropriate threshold value.

According to one embodiment of the present invention, the determination of whether the level of UV reflected off a document is high or low is made by sampling the output of the UV sensor at a number of intervals, averaging the readings, and comparing the average level with the predetermined high/low threshold. Alternatively, a comparison may be made by measuring the amount of UV light reflected at a number of locations on the bill and comparing these measurements with those obtained from genuine bills. Alternatively, the output of one or more UV sensors may be processed to generate one or more patterns of reflected UV light and these patterns may be compared to the patterns generated by genuine bills. Such a pattern generation and comparison technique may be performed by modifying an optical pattern technique such as that disclosed in U.S. Pat. No. 5,295,196 incorporated herein by reference in its entirety or in U.S. patent application Ser. No. 08/287,882 filed Aug. 9, 1994 for a "Method and Apparatus for Document Identification,"incorporated herein by reference in its entirety.

In a similar manner, the presence of fluorescence may be performed by sampling the output of the fluorescence sensor at a number of intervals. However, in one embodiment, a bill is rejected as counterfeit U.S. currency if any of the sampled outputs rise above the noise floor. However, the alternative methods discussed above with respect to processing the signal or signals of a UV sensor or sensors may also be employed, especially with respect to currencies of other countries or other types of documents which may employ as security features certain locations or patterns of fluorescent materials.

A currency authenticating system according to the present invention may be provided with means, such as a display, to indicate to the operator the reasons why a document has been rejected, e.g., messages such as "UV FAILURE" or "FLUORESCENCE FAILURE." A currency authenticating system according to the present invention may also permit the operator to selectively choose to activate or deactivate either the UV reflection test or the fluorescence test or both. A currency authenticating system according to the present invention may also be provided with means for adjusting the sensitivities of the UV reflection and/or fluorescence test, for example, by adjusting the respective thresholds. For example, in the case of U.S. currency, a system according to the present invention may permit the high/low threshold to be adjusted, for example, either in absolute voltage terms or in genuine/suspect ratio terms.

The UV and fluorescence authentication test may be incorporated into various document handlers such as currency counters and/or currency denomination discriminators such as that disclosed in connection with FIG. 1c and U.S. Pat. No. 5,295,196 incorporated herein by reference in its entirety. Likewise, the magnetic authentication tests described above may likewise be incorporated in such counters and/or discriminators. In such systems, calibration may be performed by processing a stack of genuine documents. An example of a method of calibrating such a device will now be discussed.

As mentioned above, the acrylic window 438 reflects a certain amount of UV light even when no bill is present. The amount of UV light reflected in the absence of bills is measured. A stack of genuine bills may then be processed with the potentiometer 458 set to some arbitrary value and the resulting UV readings averaged. The difference between the average reading and the reading made in the absence of bills may then be calculated. The potentiometer 458 may then be adjusted so that the average reading would be at least 0.7 volts greater then the no bill reading. It is also desirable to adjust the potentiometer 458 so that the amplifier 450 operates around the middle of its operating range.

For example, if a reading of 1.0 volt results when no bills are present and an average reading of 3.0 volts results when a stack of genuine bills are processed, the resulting difference is 2.0 volts which is greater than 0.7 volts. However, it is desirable for the amplifier to be operating in the range of about 2.0 to 2.5 volts and preferably at about 2.0 volts. Thus in the above example, the potentiometer 458 may be used to adjust the gain of the amplifier 450 so that an average reading of 2.0 volts would result. Where potentiometer 458 is an electronic potentiometer, the gain of the amplifier 450 may be automatically adjusted by the microcontroller 452. In general, when the average reading is too high the potentiometer is adjusted to lower the resulting values to the center of the operating range of the amplifier and vice versa when the average reading is too low.

According to another embodiment of the present invention, the operator of a document handling device such as a currency counter or a currency denomination discriminator is provided with the ability to adjust the sensitivity of a UV reflection test, a fluorescence test, and a magnetic test. For example, a note counter embodying one embodiment of the present invention may provide the operator the ability to set the authentication tests to a high or a low sensitivity. For example, the note counter may be provided with a set up mode which enables the operator to adjust the sensitivities for each of the above tests for both the high and the low modes. This may be achieved through appropriate messages being displayed on, for example, display 36 of FIG. 1c and the input of selection choices via an input device such as a keyboard or buttons. In one embodiment, the device permits the operator to adjust the UV test, the fluorescent test, and the magnetic test in a range of sensitivities 1–7, with 7 being the most sensitive, or to turn each test off. The device permits setting the sensitivity as described above for the three authentication tests for both a low sensitivity (low denomination) mode and a high sensitivity (high denomination) mode. The above setting options are summarized in Table 1.

TABLE 1

| Mode | UV Test Sensitivity | Fluorescent Test Sensitivity | Magnetic Test Sensitivity |
| --- | --- | --- | --- |
| High | off, 1–7 | off, 1–7 | off, 1–7 |
| Low  | off, 1–7 | off, 1–7 | off, 1–7 |

According to an alternate embodiment, the above high/low modes are replaced with denomination modes, for example, one for each of several denominations of currency (e.g., $1, $2, $5, $10, $20, $50 and $100). For each denomination, the sensitivity of the three tests may be adjusted between 1–7 or off. According to one embodiment for operator manually selects either the high or low mode or the appropriate denomination mode based on the values of the notes to be processed. This manual mode selection system may be employed in, for example, either a note counter or a currency denomination discriminator. According to another embodiment the document handling system automatically selects either the high or low mode or the appropriate denomination mode based on the values of the notes being processed. This automatic mode selection system may be employed in systems capable of identifying the different values or kinds of documents, for example, a currency denomination discriminator.

Accordingly, in the low mode or for low denomination modes (e.g., $1, $2) the three tests may be set to relatively low sensitivities (e.g., UV test set at 2, fluorescent test set at 5, and magnetic test set at 3). Conversely, in the high mode or for high denomination modes (e.g., $50, $100) the three tests may be set to relatively high sensitivities (e.g., UV test set at 5, fluorescent test set at 6, and magnetic test set at 7). In this way, authentication sensitivity may be increased when processing high value notes where the potential harm or risk in not detecting a counterfeit may be greater and may be decreased when processing low value notes where the potential harm or risk in not detecting a counterfeit is lesser and the annoyance of wrongly rejecting genuine notes is greater. Also the UV, fluorescent, and/or magnetic characteristics of genuine notes can vary due to number of factors such wear and tear or whether the note has been washed (e.g., detergents). As a result, the fluorescent detection of genuine U.S. currency, for example, may yield readings of about 0.05 or 0.06 volts. The UV and fluorescent thresholds associated with each of the seven sensitivity levels may be set, for example, as shown in Table 2.

TABLE 2

| Sensitivity Level | UV Test (Volts) | Fluorescent Test (Volts) |
| --- | --- | --- |
| 1 | 0.2  | 0.7  |
| 2 | 0.3  | 0.6  |
| 3 | 0.4  | 0.5  |
| 4 | 0.5  | 0.3  |
| 5 | 0.55 | 0.2  |
| 6 | 0.6  | 0.15 |
| 7 | 0.7  | 0.1  |

In performing the UV test according to one embodiment, the no bill reflectance value is subtracted from resulting UV reflectance voltages associated with the scanning of a particular bill, and this difference is compared against the appropriate threshold value such as those in Table 3 in determining whether to reject a bill.

According to one embodiment, the potentiometer 460 associated with the fluorescence detector 444 is calibrated by processing a genuine note or stack of notes, as described above in connection with the calibration of the UV detector, and adjusted so that a reading of near 0 volts (e.g., about 0.1 volt) results. Magnetic calibration may be performed, for example, manually in conjunction with the processing of a genuine bill of known magnetic characteristics and adjusting the magnetic sensor to near the center of its range.

Upon a bill failing one or more of the above tests, an appropriate error message may be displayed such as "Suspect Document U—" for failure of the UV reflection test, "Suspect Document-F—" for failure of the fluorescent test, "Suspect Documen—M" for failure of the magnetic test, or some combination thereof when more than one test is failed (e.g., "Suspect Document UF—" for failure of both the UV reflection test and the fluorescent test).

In addition to the above described ultraviolet characteristics, thread-based characteristics may be used to authenticate bills.

New security features are being added to U.S. currency beginning with the 1996 series $100 bills. Subsequently, similar features will be added to other U.S. denominations such as the $50 bill, $20 bill, etc. Some of the new security features include the incorporation into the bills of security threads that fluoresce under ultraviolet light. For example, the security threads in the 1996 series $100 bills emit a red glow when illuminated by ultraviolet. The color of light illuminated from security threads under ultraviolet light will vary by denomination, for example, with the $100 notes emitting red light and the $50 notes emitting, for example, blue light or purple light.

Additionally, the location of the thread within the bill can be used as a security feature. For example, the security threads in all $100 bills are located in the same position. Furthermore, the location of the security threads in other denominations will be the same by denomination and will vary among several denominations. For example, the location of security threads in $ 10 s, $20s, $50, and $ 100 may all be distinct. Alternatively, the location may be the same in the $20s and the $100s but different from the location of the security threads in the $50s.

The ultraviolet system described above in connection with FIGS. 2 and 3 may be modified to take advantage of this feature. Referring to FIG. 4, a bill 330 is shown indicating three possible locations 332a–332c for security threads in genuine bills depending on the denomination of the bill. Fluorescent light detectors 334a–334c are positioned over the possible acceptable locations of fluorescing security threads. In systems designed to accept bills fed in either the forward or the reverse direction, identical detectors are positioned over the same locations on each half of the bill. For example, sensors 334c are positioned a distance $d_5$ to the left and right of the center of the bill 330. Likewise, sensors 334b are positioned a distance $d_6$ to the left and right of the center of the bill 330 while sensors 334 a are positioned a distance $d_7$ to the left and right of the center of the bill 330. Additional sensors may be added to cover additional possible thread locations.

These sensors may be designed to detect a particular color of light depending on their location. For example, say location 332b corresponds to the location of security threads in genuine $100 bills and location 332c corresponds to the location of security threads in genuine $50 bills. Furthermore, if the security threads in $100 bills emit red light under ultraviolet light excitation and the security threads in $50 bills emit blue light under ultraviolet light excitation, then sensor 334b may be particularly designed to detect red light and sensor 334c may be designed to detect blue light. Such sensors may employ filters which pass red and blue light, respectfully, while screening out light of other frequencies. Accordingly, for example, sensor 334b will respond to a security thread located at location 332b that emits red light under ultraviolet light excitation but not to a security thread at location 332b that emits blue light.

In another embodiment, one or more sensors located at a given lateral position may detect light of a plurality of wavelengths. For example, suppose the location of security threads for both the $100 and the $20 bills is at location 332b and suppose threads in genuine $100 bills emit red light under ultraviolet excitation while threads in genuine $20 bills emit green light. One or more sensors located over location 332b such as sensor 334b are then used to detect both the presence of threads at location 332b and the emitted color. Accordingly, the denomination and/or genuineness of a bill can be determined and/or authenticated.

Likewise, one or more sensors located at a plurality of lateral position may detect light of the same or different wavelengths. For example, suppose the location of security threads for $100 bills is at location 332b and the location of security threads for $10 bills is at location 332a and suppose threads in both genuine $100 bills and genuine $10 bills emit red light under ultraviolet excitation. One or more sensors located over location 332b such as sensor 334b and one or more sensors located over location 332a such as sensor 334a are then used to detect both the presence of threads at locations 332b and 332a and the emitted color. In one embodiment the sensors may be designed to detect only red light. Alternatively, the sensors may be designed to detect a plurality of colors of light and provide an indication of the color that is detected. Accordingly, the denomination and/or genuineness of a bill can be determined and/or authenticated.

Sensors 334a–334c may include separate sources of ultraviolet light or one or more separate ultraviolet light sources may be provided to illuminate the bill or portions of the bill, either on the same side of the bill as the sensors or on the opposite side of the bill. These sensors may be arranged along the same axis or, alternatively, may be staggered upstream and downstream relative to each other. These sensors may be arranged all on the same side of the bill or some on one side of the bill and some on the other. Alternatively, for one or more locations 332a–332c sensors may be placed on both sides of the bill. This dual sided embodiment would be beneficial in detecting counterfeits made by applying an appropriate fluorescing material on the surface of a bill. Alternatively, a combination of normal lighting and ultraviolet lighting may be employed but at different times to detect for the presence of a colored line applied to the surface of a bill visible in normal lighting. According to such an embodiment, no colored thread should be detected under normal lighting and an appropriate colored thread in an appropriate position must be detected under ultraviolet lighting.

Additionally, the authentication technique described above in connection with FIGS. 2 and 3 may be employed in areas where no fluorescing security threads might be located, for example, near the center of the bill, such that the detection of fluorescent light would indicate a counterfeit bill as would the absence of a high level of reflected ultraviolet light.

Alternatively or additionally, sensors may be employed to detect bills or security threads printed or coated with thermochromatic materials (materials that change color with a change in temperature). Examples of threads incorporating thermochromatic materials are described in U.S. Pat. No.

5,465,301 incorporated herein by reference. For example, a security thread may appear in one color at ambient temperatures under transmitted light and may appear in a second color or appear colorless at or above an activation temperature or vice versa. Alternatively, bills may be printed and/or coated with such thermochromatic materials. Such bills may or may not include security threads and any included security threads may or may not also be printed or coated with thermochromatic materials. To detect for the proper characteristics of bills containing such thermochromatic materials and/or containing threads employing such thermochromatic materials, the above described embodiments may be altered to scan a bill at different temperatures. For example, a bill could first be scanned at ambient temperatures, and then be transported downstream where the temperature of the bill is raised to or above an activation temperature and scanned again at the higher temperature. For example, FIG. 4 could be modified to employ two sets of pairs of sensors 334a–c, one set downstream of the other with the downstream sensors be located in a region where the temperature is evaluated relative to the temperature of the region where the first set of sensors are located. A bill adjacent to the first and second sets of sensors 334a–c may be illuminated either with visible light or ultraviolet light (if the thermochromatic material contains materials whose fluorescent characteristics alter with changes in temperature). Accordingly, the presence of the appropriate color or absence of color may be detected for the different temperatures and the detected information may be used to authenticate and/or denominate the bill.

In addition to magnetic and optical sensing, other techniques of detecting characteristic information of currency include electrical conductivity sensing, capacitive sensing (U.S. Pat. No. 5,122,754 [watermark, security thread]; 3,764,899 [thickness]; 3,815,021 [dielectric properties]; 5,151,607 [security thread]), and mechanical sensing (U.S. Pat. No. 4,381,447 [limpness]; 4,255,651 [thickness]).

Turning to the discrimination of the denomination of bills, in the case of U.S. currency, for instance, it has been determined that the central, approximately two-inch (approximately 5 cm) portion of currency bills, as scanned across the central section of the narrow dimension of the bill, provides sufficient data for distinguishing among the various U.S. currency denominations. According to one embodiment, an optical encoder (see e.g. FIGS. 1a–c) can be used to control the scanning process so that reflectance samples are taken for a set period of time and only after a certain period of time has elapsed after the borderline 17a is detected, thereby restricting the scanning to the desired central portion of the narrow dimension of the bill.

Figure 5:
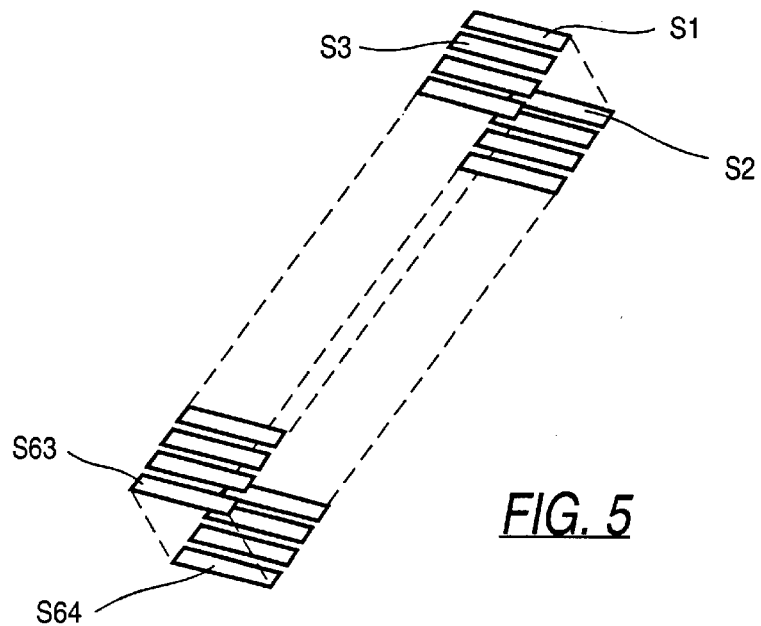
FIG. 5 is a diagrammatic perspective illustration of the successive areas scanned during the traversing movement of a single bill across an optical sensor according to one embodiment of the present invention.
Figure 6:
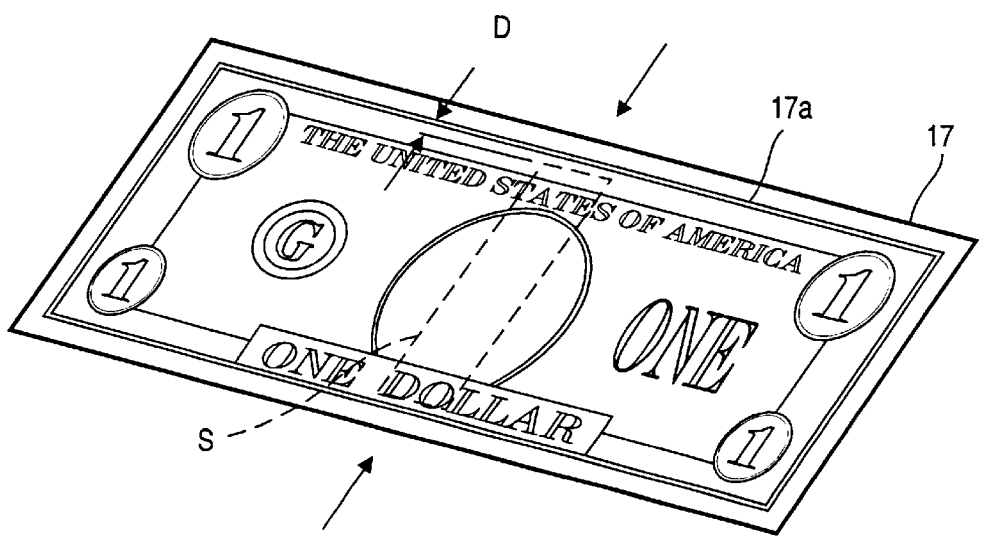
FIG. 6 is a perspective view of a bill and one area to be optically scanned on the bill.
Figure 7:
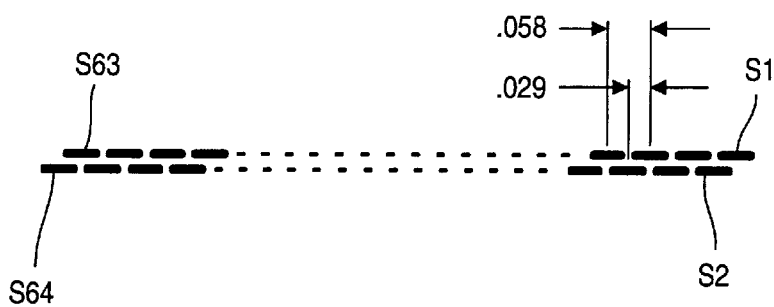
FIG. 7 is a diagrammatic side elevation view of the scan area to be optically scanned on a bill according to embodiments of the present invention.

FIGS. 5–7 illustrate the scanning process in more detail. Referring to FIG. 6, as a bill 17 is advanced in a direction parallel to the narrow edges of the bill, scanning via a slit in the scanhead 18a or 18b is effected along a segment S of the central portion of the bill 17. This segment S begins a fixed distance D inboard of the borderline 17a. As the bill 17 traverses the scanhead, a strip s of the segment S is always illuminated, and the photodetector 26 produces a continuous output signal which is proportional to the intensity of the light reflected from the illuminated strip s at any given instant. This output is sampled at intervals controlled by the encoder, so that the sampling intervals are precisely synchronized with the movement of the bill across the scanhead.

As illustrated in FIGS. 5 and 7, the sampling intervals in one embodiment are selected so that the strips s that are illuminated for successive samples overlap one another. The odd-numbered and even-numbered sample strips have been separated in FIGS. 5 and 7 to more clearly illustrate this overlap. For example, the first and second strips s1 and s2 overlap each other, the second and third strips s2 and s3 overlap each other, and so on. Each adjacent pair of strips overlap each other. In the illustrative example, this is accomplished by sampling strips that are 0.050 inch (0.127 cm) wide at 0.029 inch (0.074 cm) intervals, along a segment S that is 1.83 inch (4.65 cm) long (64 samples).

Figure 8A:
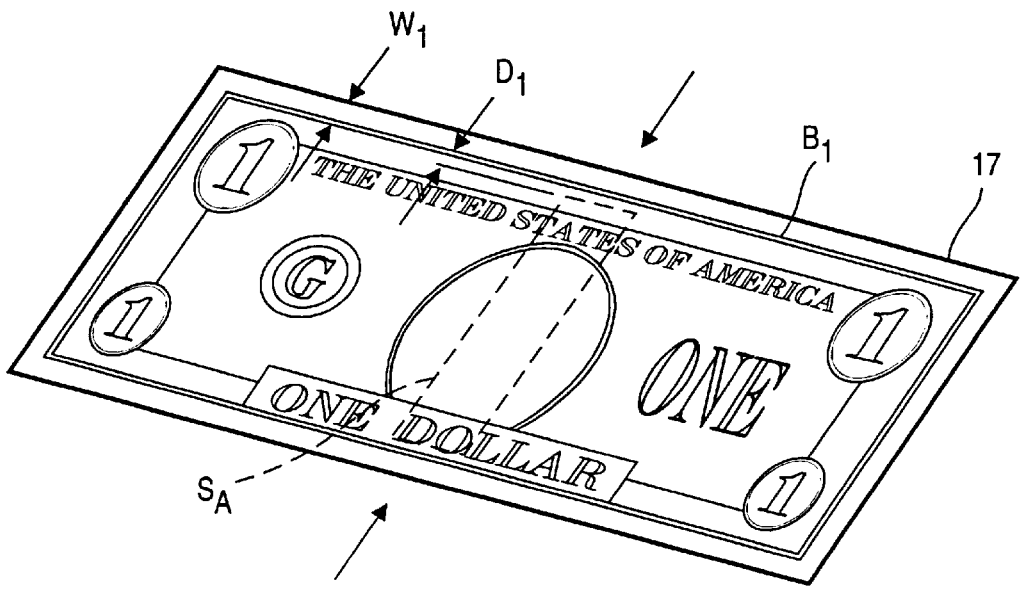
FIG. 8a is a perspective view of a bill showing the preferred area of a first surface to be scanned by one of the two scanheads employed in one embodiment of the present invention.
Figure 8B:
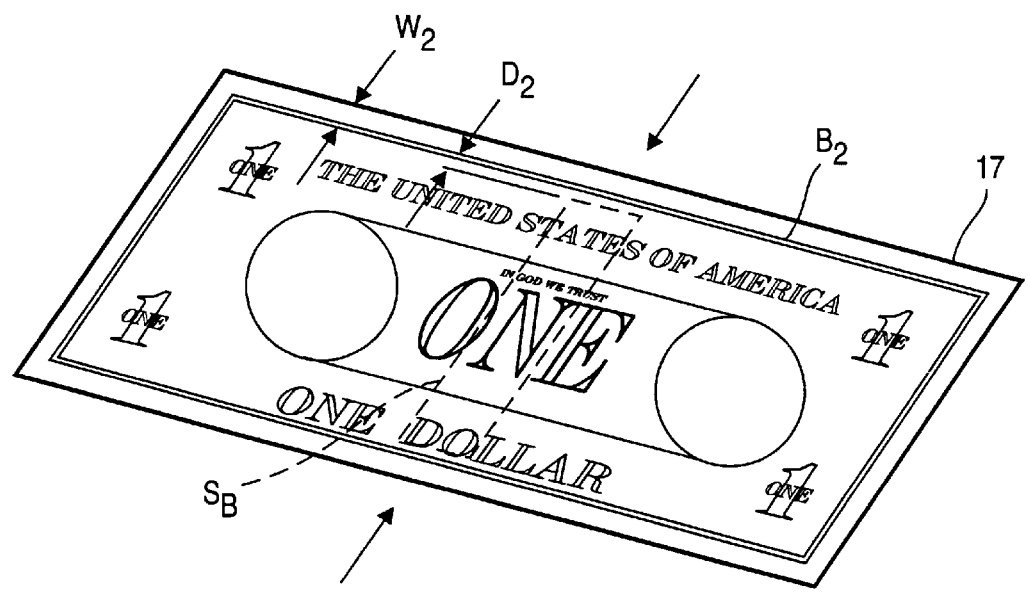
FIG. 8b is another perspective view of the bill in FIG. 8a showing the preferred area of a second surface to be scanned by the other of the scanheads employed in one embodiment of the present invention.

FIGS. 8a and 8b illustrate two opposing surfaces of U.S. bills. The printed pattern on the black and green surfaces of the bill are each enclosed by respective thin borderlines $B_1$ and $B_2$. As a bill is advanced in a direction parallel to the narrow edges of the bill, scanning via the wide slit of one of the scanheads is effected along a segment $S_A$ of the central portion of the black surface of the bill (FIG. 8a). As previously stated, the orientation of the bill along the transport path determines whether the upper or lower scanhead scans the black surface of the bill. This segment $S_A$ begins a fixed distance $D_1$ inboard of the borderline $B_1$, which is located a distance $W_1$ from the edge of the bill. The scanning along segment $S_A$ is as describe in connection with FIGS. 5–7.

Similarly, the other of the two scanheads scans a segment $S_B$ of the central portion of the green surface of the bill (FIG. 8b). The orientation of the bill along the transport path determines whether the upper or lower scanhead scans the green surface of the bill. This segment $S_B$ begins a fixed distance $D_2$ inboard of the border line $B_2$, which is located a distance $W_2$ from the edge of the bill. For U.S. currency, the distance $W_2$ on the green surface is greater than the distance $W_1$ on the black surface. It is this feature of U.S. currency which permits one to determine the orientation of the bill relative to the upper and lower scanheads 18, thereby permitting one to select only the data samples corresponding to the green surface for correlation to the master characteristic patterns. The scanning along segment $S_B$ is as describe in connection with FIGS. 5–7.

The optical sensing and correlation technique is based upon using the above process to generate a series of stored intensity signal patterns using genuine bills for each denomination of currency that is to be detected. According to one embodiment, two or four sets of master intensity signal samples are generated and stored within the system memory, preferably in the form of an EPROM 34 (see FIG. 1a), for each detectable currency denomination. According to one embodiment these are sets of master green-surface intensity signal samples. In the case of U.S. currency, the sets of master intensity signal samples for each bill are generated from optical scans, performed on the green surface of the bill and taken along both the "forward" and "reverse" directions relative to the pattern printed on the bill. Alternatively, the optical scanning may be performed on the black side of U.S. currency bills or on either surface of foreign bills. Additionally, the optical scanning may be performed on both sides of a bill.

In adapting this technique to U.S. currency, for example, sets of stored intensity signal samples are generated and stored for seven different denominations of U.S. currency, i.e., $1, $2, $5, $10, $20, $50 and $100. For bills which produce significant pattern changes when shifted slightly to the left or right, such as the $2, the $10 and/or the $100 bills in U. S. currency, two green-side patterns for each of the "forward" and "reverse" directions may be stored, each pair of patterns for the same direction represent two scan areas that are slightly displaced from each other along the long dimension of the bill. Accordingly, a set of number of different green-side master characteristic patterns are stored within the EPROM for subsequent correlation purposes. The generation of the master patterns is discussed in more detail in U.S. Pat. No. 5,295,196 which is incorporated herein by reference in its entirety. Once the master patterns have been stored, the pattern generated by scanning a bill under test is compared by the CPU 30 with each of the master patterns of stored intensity signal samples to generate, for each comparison, a correlation number representing the extent of correlation, i.e., similarity between corresponding ones of the plurality of data samples, for the sets of data being compared.

The CPU 30 is programmed to identify the denomination of the scanned bill as corresponding to the set of stored intensity signal samples for which the correlation number resulting from pattern comparison is found to be the highest. In order to preclude the possibility of mischaracterizing the denomination of a scanned bill, as well as to reduce the possibility of spurious notes being identified as belonging to a valid denomination, a bi-level threshold of correlation is used as the basis for making a "positive" call. If a "positive" call can not be made for a scanned bill, an error signal is generated. See, e.g., U.S. Pat. No. 5,295,196.

According to one embodiment, master patterns are also stored for selected denominations corresponding to scans along the black side of U.S. bills. More particularly, according to one embodiment, multiple black-side master patterns are stored for $20, $50 and $100 bills. For each of these denominations, three master patterns are stored for patterns for each and reverse directions for a total of six patterns for each denomination. For a given scan direction, black-side master patterns are generated by scanning a corresponding denominated bill along a segment located about the center of the narrow dimension of the bill, a segment slightly displaced (0.2 inches) to the left of center, and a segment slightly displaced (0.2 inches) to the right of center. When the scanned pattern generated from the green side of a test bill fails to sufficiently correlate with one of the green-side master patterns, the scanned pattern generated from the black side of a test bill is then compared to black-side master patterns in some situations.

Using the above sensing and correlation approach, the CPU 30 is programmed to count the number of bills belonging to a particular currency denomination as part of a given set of bills that have been scanned for a given scan batch, and to determine the aggregate total of the currency amount represented by the bills scanned during a scan batch. The CPU 30 is also linked to an output unit 36 (FIGs. 1a–c) which is adapted to provide a display of the number of bills counted, the breakdown of the bills in terms of currency denomination, and the aggregate total of the currency value represented by counted bills. The display 36 can also be adapted to provide a print-out of the displayed information in a desired format.

Referring again to the embodiment depicted in FIG. 1c, as a result of the first comparison described above based on the reflected light intensity information retrieved by scanhead 18, the CPU 30 will have either determined the denomination of the scanned bill 17 or determined that the first scanned signal samples fail to sufficiently correlate with any of the sets of stored intensity signal samples in which case an error is generated. Provided that an error has not been generated as a result of this first comparison based on reflected light intensity characteristics, a second comparison is performed. This second comparison is performed based on a second type of characteristic information, such as alternate reflected light properties, similar reflected light properties at alternate locations of a bill, light transmissivity properties, various magnetic properties of a bill, the presence of a security thread embedded within a bill, the color of a bill, the thickness or other dimension of a bill, etc. The second type of characteristic information is retrieved from a scanned bill by the second scanhead 39. The scanning and processing by scanhead 39 may be controlled in a manner similar to that described above with regard to scanhead 18.

In addition to the sets of stored first characteristic information, in this example stored intensity signal samples, the EPROM 34 stores sets of stored second characteristic information for genuine bills of the different denominations which the device 10 is capable of handling. Based on the denomination indicated by the first comparison, the CPU 30 retrieves the set or sets of stored second characteristic data for a genuine bill of the denomination so indicated and compares the retrieved information with the scanned second characteristic information. If sufficient correlation exists between the retrieved information and the scanned information, the CPU 30 verifies the genuineness of the scanned bill 17. Otherwise, the CPU generates an error. While the embodiment illustrated in FIG. 1c depicts a single CPU 30 for making comparisons of first and second characteristic information and a single EPROM 34 for storing first and second characteristic information, it is understood that two or more CPUs and/or EPROMs could be used, including one CPU for making first characteristic information comparisons and a second CPU for making second characteristic information comparisons. Using the above sensing and correlation approach, the CPU 30 is programmed to count the number of bills belonging to a particular currency denomination whose genuineness has been verified as part of a given set of bills that have been scanned for a given scan batch, and to determine the aggregate total of the currency amount represented by the bills scanned during a scan batch.

Figure 10:
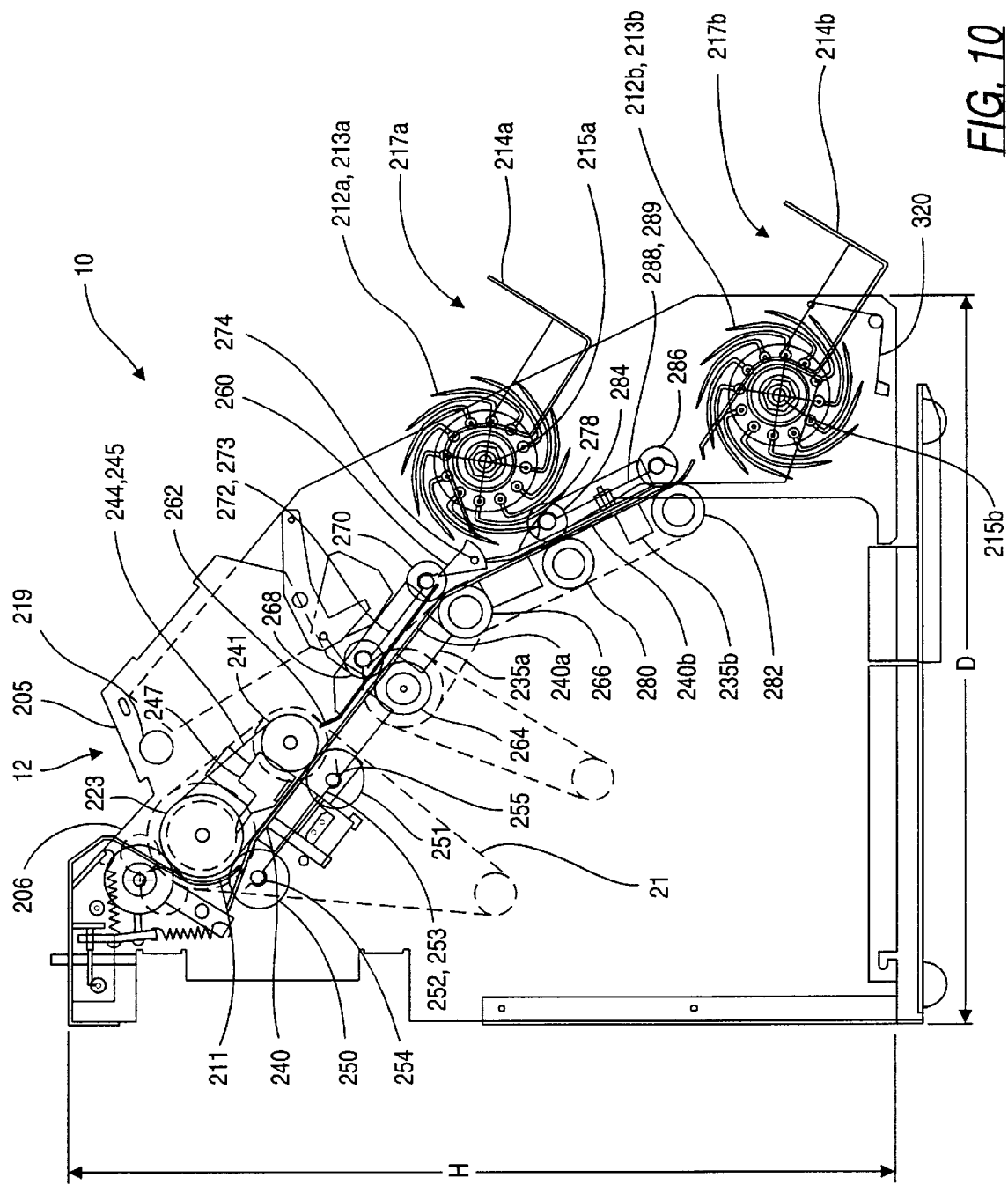
FIG. 10 is a side view of an evaluation device depicting various transport rolls in side elevation according to one embodiment of the present invention.

FIG. 9 depicts an exterior perspective view and FIG. 10 is a side view of a multi-pocket document evaluation device 10 such as a currency evaluator according to one embodiment of the present invention. According to one embodiment the evaluation device 10 is compact having a height (H) of about 17½ inches, width (W) of about 13½ inches, and a depth (D) of about 15 inches. The evaluation device 10 may be rested upon a tabletop.

In FIGS. 9 and 10, currency bills are fed, one by one, from a stack of currency bills placed in an input receptacle 12 into a transport mechanism. The transport mechanism includes a transport plate or guide plate 240 for guiding currency bills to one of a plurality of output receptacles 217a and 217b. Before reaching the output receptacles 217a, 217b a bill can be, for example, evaluated, analyzed, authenticated, discriminated, counted and/or otherwise processed. The results of the above process or processes may be used to determine to which output receptacle 217a, 217b a bill is directed. In one embodiment, documents such as currency bills are transported, scanned, and identified at a rate in excess of 800 bills per minute. In another embodiment, documents such as currency bills are transported, scanned, and identified at a rate in excess of 1000 bills per minute. In of currency bills, the identification includes the determine of the denomination of each bill.

The input receptacle 12 for receiving a stack of bills to be processed is formed by downwardly sloping and converging walls 205 and 206 (see FIG. 10) formed by a pair of removable covers (not shown) which snap onto a frame. The converging wall 206 supports a removable hopper (not shown) that includes vertically disposed side walls (not shown). One embodiment of an input receptacle is described and illustrated in more detail in U.S. patent application Ser. No. 08/450,505 filed May 26, 1995, entitled "Method and Apparatus for Discriminating and Counting Documents" which is incorporated by reference in its entirety. The evaluation device 10 in FIG. 9 has a touch panel display 15 in one embodiment of the present invention which displays appropriate "functional" keys when appropriate. The touch panel display 15 simplifies the operation of the multi-pocket currency discriminator 10. Alternatively or additionally physical keys or buttons may be employed.

From the input receptacle 12, the currency bills are moved in seriatim from a bottom of the stack along a curved guideway 211 (shown in FIG. 9) which receives bills moving downwardly and rearwardly and changes the direction of travel to a forward direction. A stripping wheel mounted on a stripping wheel shaft 219 aids in feeding the bills to the curved guideway 211. The curvature of the guideway 211 corresponds substantially to the curved periphery of a drive roll 223 so as to form a narrow passageway for the bills along the rear side of the drive roll 223. An exit end of the curved guideway 211 directs the bills onto the transport plate 240 which carries the bills through an evaluation section and to one of the output receptacles 217a, 217b.

Stacking of the bills in one embodiment is accomplished by a pair of driven stacking wheels 212a and 213a for the first or upper output receptacle 217a and by a pair of stacking wheels 212b and 213b for the second or bottom output receptacle 217b. The stacker wheels 212a,b and 213a,b are supported for rotational movement about respective shafts 215a,b journalled on a rigid frame and driven by a motor (not shown). Flexible blades of the stacker wheels 212a and 213a deliver the bills onto a forward end of a stacker plate 214a. Similarly, the flexible blades of the stacker wheels 212b and 213b deliver the bills onto a forward end of a stacker plate 214b.

A diverter 260 directs the bills to either the first or second output receptacle 217a, 217b. When the diverter is in a lower position, bills are directed to the first output receptacle 217a. When the diverter 260 is in an upper position, bills proceed in the direction of the second output receptacle 217b.

Figure 11:
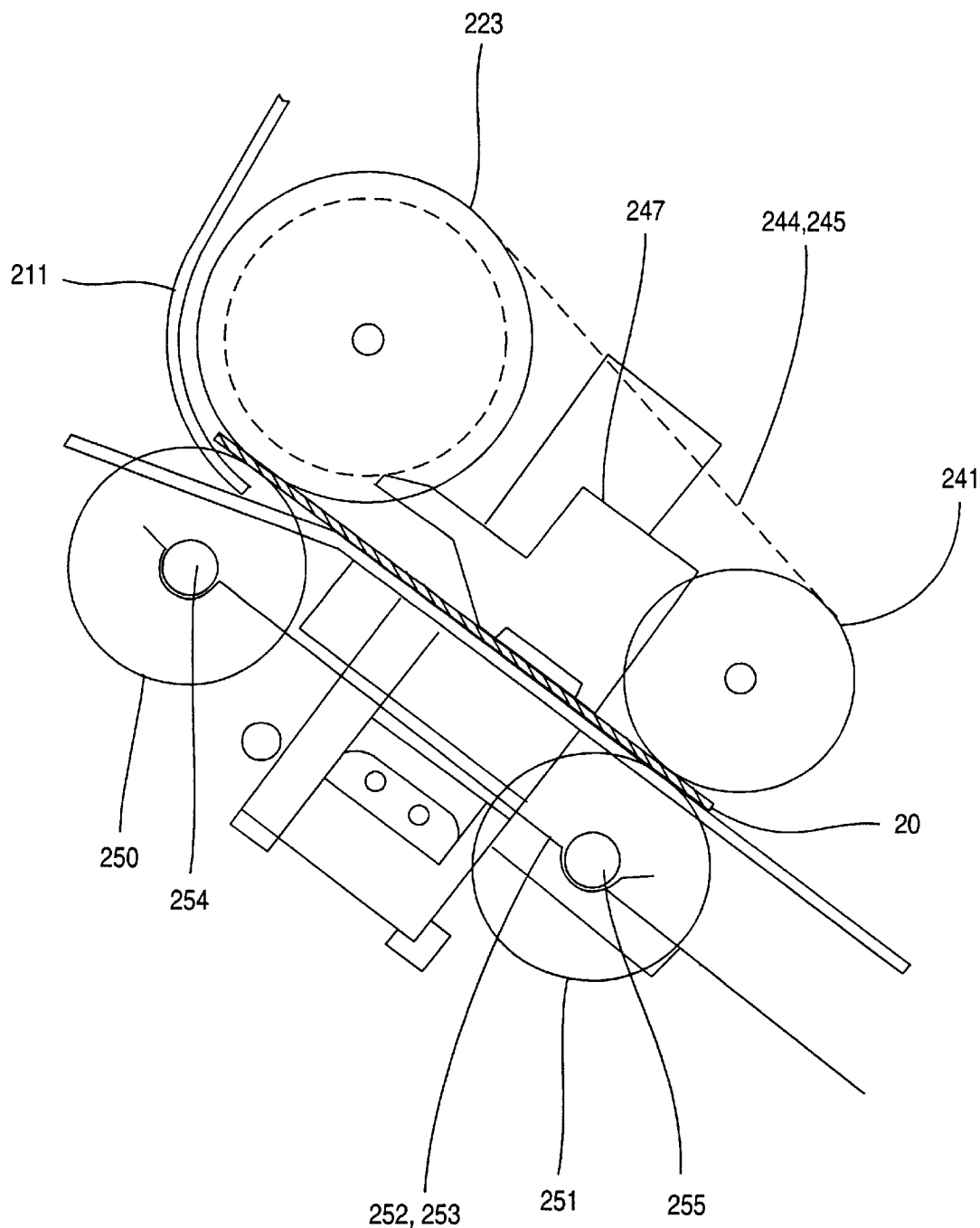
FIG. 11 is a sectional side view taken across a currency pathway depicting a bill in the region of an evaluating mechanism according to one embodiment of the present invention.

Referring to FIG. 11, at a lower end of the curved guideway 211, a bill 20 being transported by the drive roll 223 engages the transport plate 240. Bills are positively driven along the transport plate 240 by means of a transport roll arrangement comprising both driven and passive rolls. A pair of O-rings 244 and 245 fit into grooves formed in a drive roll 241 and in the drive roll 223. The pair of O-rings 244 and 245 engage the bill 20 continuously between the two driven upper rolls 223 and 241 and assist in holding the bill 20 flat against the transport plate 240. Such an embodiment aids to the performance of the sensors of the evaluation region 247. Rolls 223 and 241 are driven by a motor (not shown) via a belt 21. Such an arrangement is illustrated in more detail in U.S. patent application Ser. No. 08/450,505 referred to above.

Passive rolls 250, 251 are mounted on an underside of the transport plate 240 in such a manner as to be freewheeling about their respective axes 254 and 255 and biased into counter-rotating contact with their corresponding driven upper rolls 223 and 241. The passive rolls 250 and 251 preferably have high-friction rubber surfaces and are biased into contact with their respective driven upper rolls 223 and 241 by means of a pair of H-shaped leaf springs 252 and 253 (see FIG. 12). The central portion of each leaf spring is fastened to the transport plate 240, which is fastened rigidly to the machine frame, so that the relatively stiff arms of the H-shaped springs exert a constant biasing pressure against the passive rolls 250 and 251 and push them against the corresponding upper rolls 223 and 241.

Figure 12:
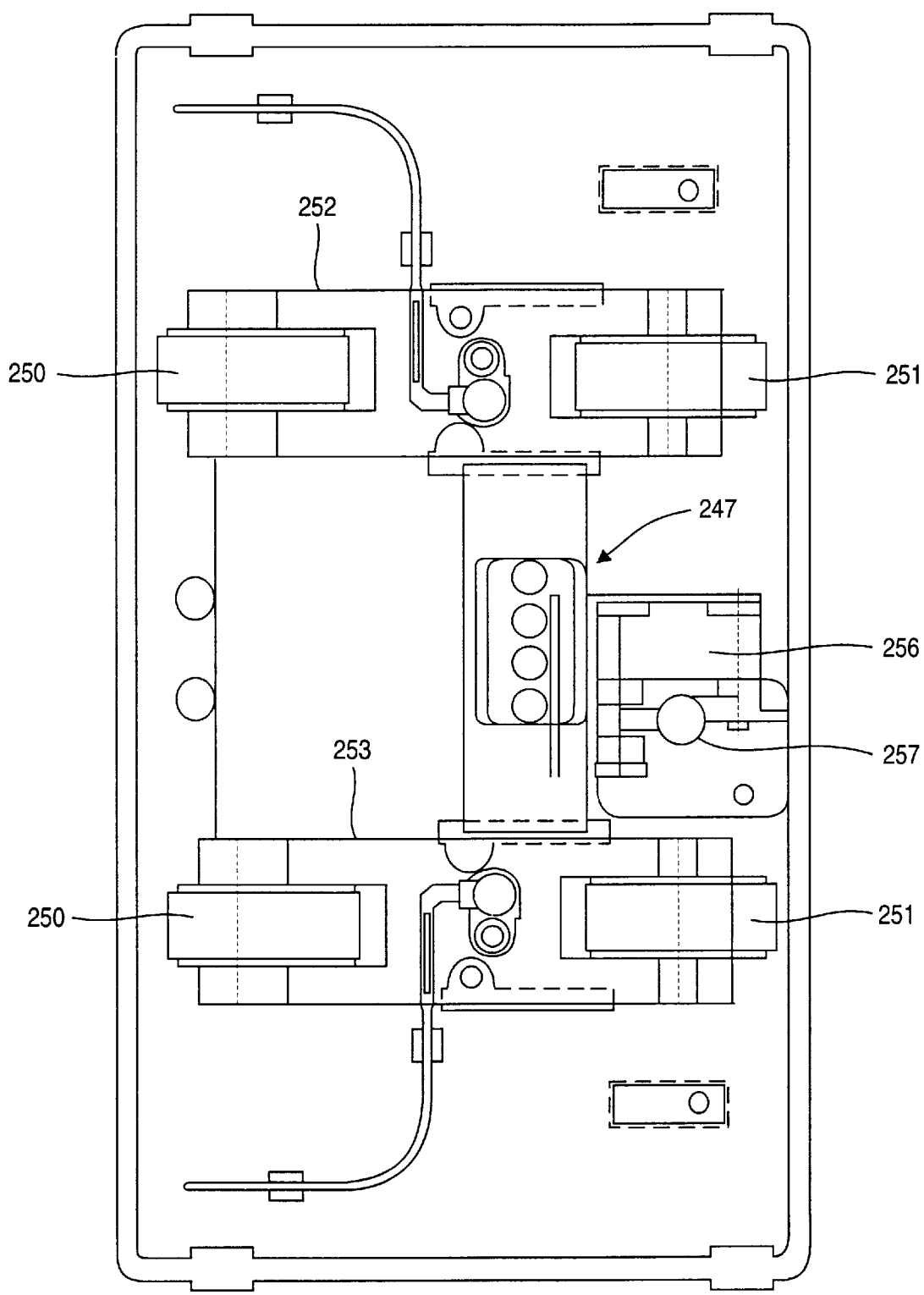
FIG. 12 is a sectional bottom view depicting a portion of a transport plate illustrating H-shaped leaf springs in conjunction with passive rolls according to one embodiment.

The location of a magnetic head 256 and a magnetic head adjustment screw 257 are illustrated in FIG. 12. The adjustment screw 257 adjusts the proximity of the magnetic head 256 relative to a passing bill and thereby adjusts the strength of the magnetic field in the vicinity of the bill.

Referring back to FIG. 11, the driven and passive transport rolls are preferably coplanar with a flat upper surface of the transport plate 240 so that currency bills can be positively driven along the top surface of the plate in a flat manner. To minimize the possibility of bill skew and to enhance the reliability of the overall scanning and recognition process, the bills are firmly gripped under uniform pressure between the driven and passive rolls. The H-shaped leaf springs 252 and 253 aid in reducing bill twisting or skewing. The O-rings 244, 245 are also effective in ensuring that central portions of the bills are held flat. The distance between the axes of the two driven upper rolls 223 and 241 and the corresponding counter-rotating passive rolls 250 and 251 is selected to be just short of a length of a narrow dimension of the currency bills.

Figure 13:
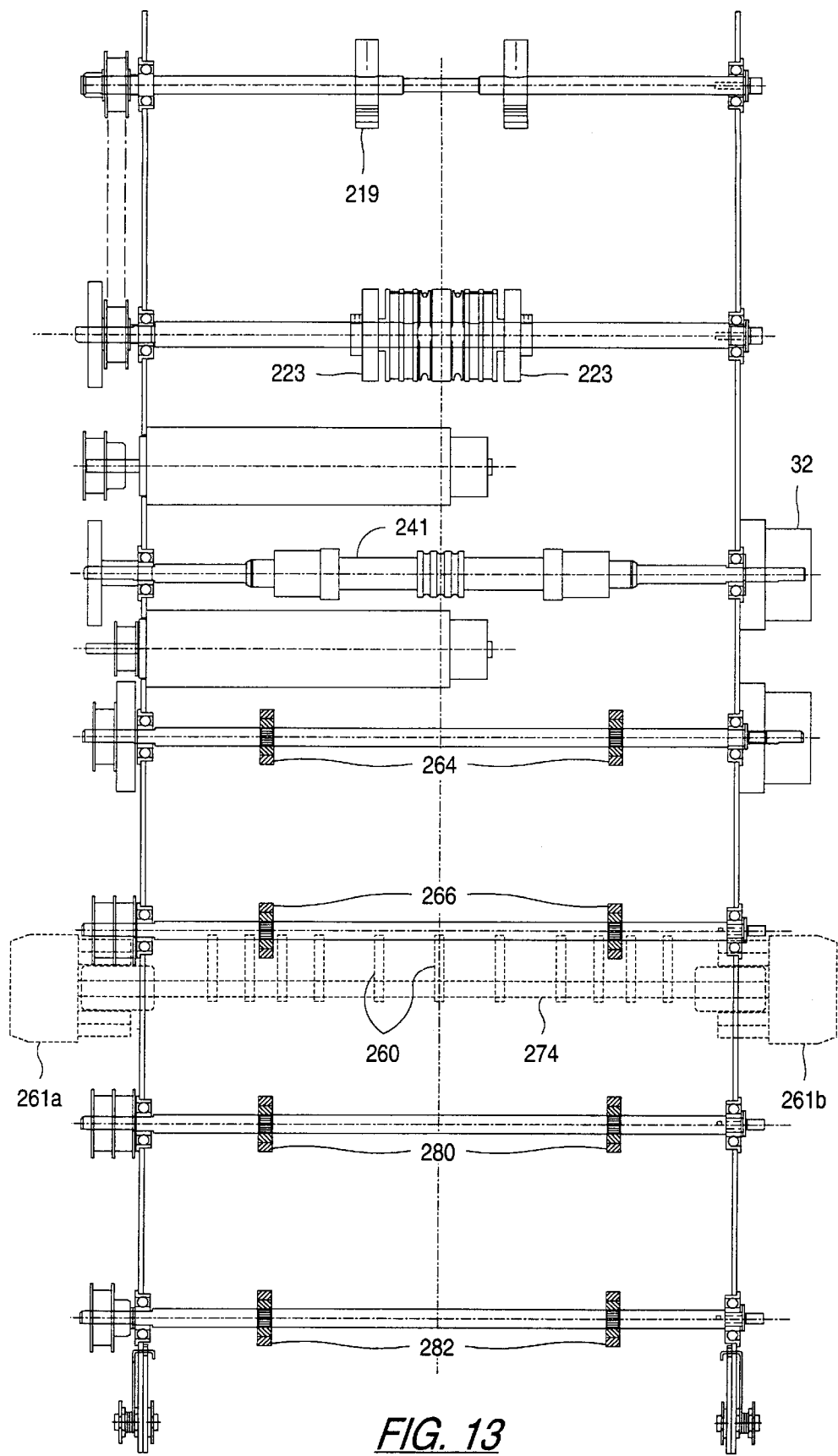
FIG. 13 is a top view of a machine depicting various shafts according to one embodiment of the present invention.

FIG. 13 depicts various shafts of the multi-pocket document evaluation device 10 according to one embodiment of the present invention. The distance between the shafts should preferably be less than the width of the bills that are to be evaluated. As shown in FIG. 13, the optical encoder 32 is mounted on the shaft of the roller 241 for precisely tracking the position of each bill as it is transported through the machine, as discussed in detail above in connection with the optical sensing and correlation technique.

Figure 14:
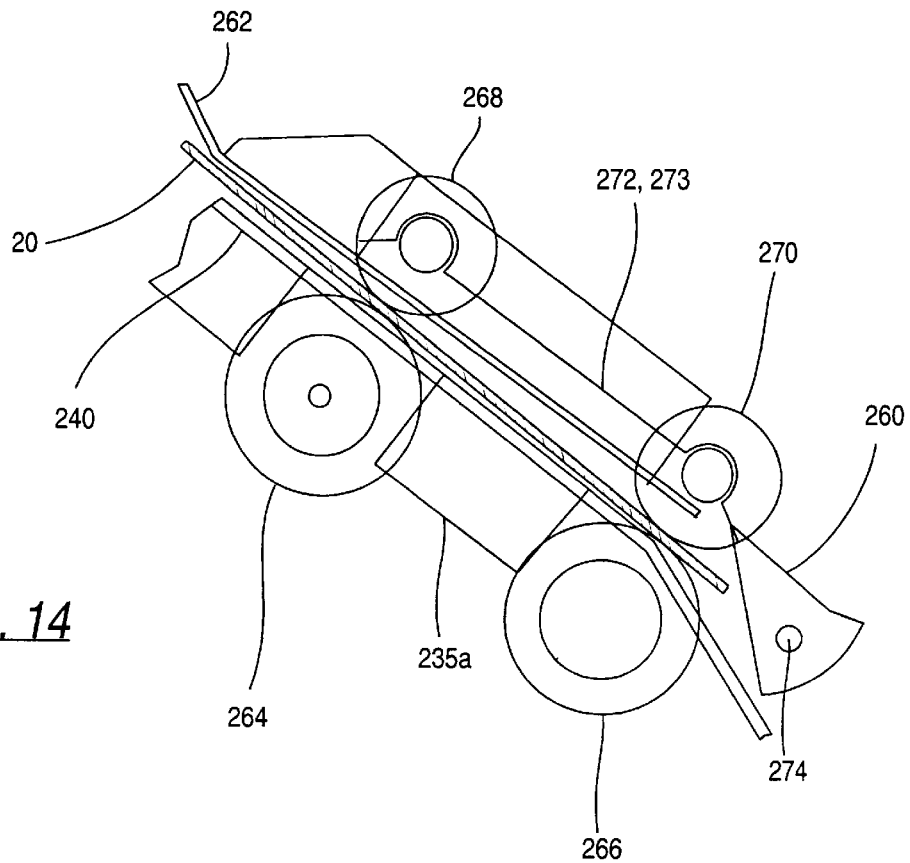
FIG. 14 is a sectional side view taken across a currency pathway depicting a bill passing below a first follower plate according to one embodiment of the present invention.
Figure 15:
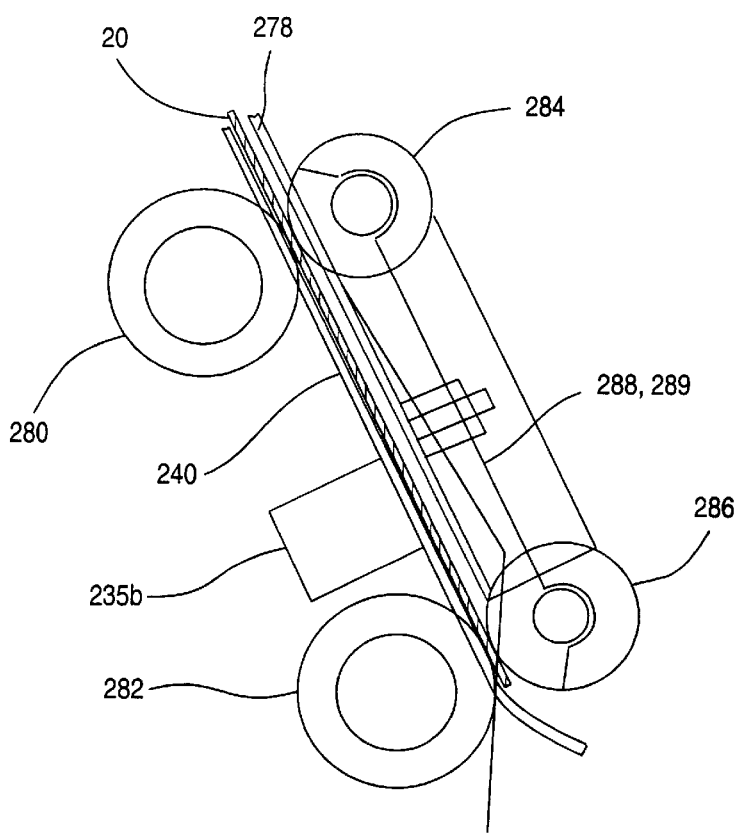
FIG. 15 is a sectional side view taken across a currency pathway depicting a bill passing below a second follower plate according to one embodiment of the present invention.

FIGS. 14 and 15 illustrate respectively, first and second follower plates 262 and 278. As illustrated, these plates are substantially free from surface features and are substantially smooth like the transport plate 240. The follower plates 262 and 278 are positioned in spaced relation to transport plate 240 so as to define a currency pathway therebetween. The follower plates 262 and 278 and the transport plate 240 contribute to defining a pathway that is free and unencumbered pathway between the roll 251 and the output receptacles 217a and 217b for the bill. As illustrated, the follower plates 262 and 278 have apertures only where necessary for accommodation of passive rolls 268, 270, 284, and 286. Thus according to one embodiment a transport mechanism is employed that uses no belts to advance bills from the evaluation region to one of a plurality of output receptacles.

Referring specifically to FIG. 14, the follower plate 262 in conjunction with the upper portion of the transport plate 240 guide a bill 20 from the passive roll 251 to a driven roll 264 and then to a driven roll 266. The passive rolls 268, 270 are biased by H-spring 272 and 273 into counter-rotating contact with the corresponding driven rolls 264 and 266 in a manner similar as described above in connection with passive rolls 250 and 251.

A diverter 260 is employed to direct the bill 20 to the appropriate output receptacle 217a or 217b. The bill 20 will encounter the diverter 260 after emerging from between the driven roll 266 and the passive roll 270. Diverter 260 includes a plurality of flanges mounted across the transport path on a shaft 274. Two solenoids 261a,b, one mounted on each end of the shaft 274 (see FIG. 13), cause the shaft and the attached diverter flanges to rotate into either a lower position or an upper position. The two solenoids drive the shaft 274 in opposite directions and an appropriate one of the two solenoids is energized depending upon whether the diverter 260 is to be moved from its lower position to its upper position or vice versa. The use of a separate solenoid for each rotational direction enhances the performance of the diverter 260 by increasing of the speed in which the position of the diverter 260 may be changed.

When the diverter 260 is in the upper position (as shown in FIG. 14), bills are directed between the transport plate 240 and the follower plate 278 (see FIG. 15). The transport plate 240 and the follower plate 278 guide bills after the diverter 260 to a driven roll 280 and then to a driven roll 282.

FIG. 15 illustrates a bill 20 between the driven rolls 280 and 282 and their respective passive rolls 284 and 286. The passive rolls 284, 286 are biased by H-springs 288, 289 into passive counter-rotating contact with the driven rolls 280, 282, respectively, in a manner similar to that described above in connection with passive rolls 250, 251. Bills are then directed to the lower output receptacle 217b via the stacker wheels 212b and 213b.

Figure 16A:
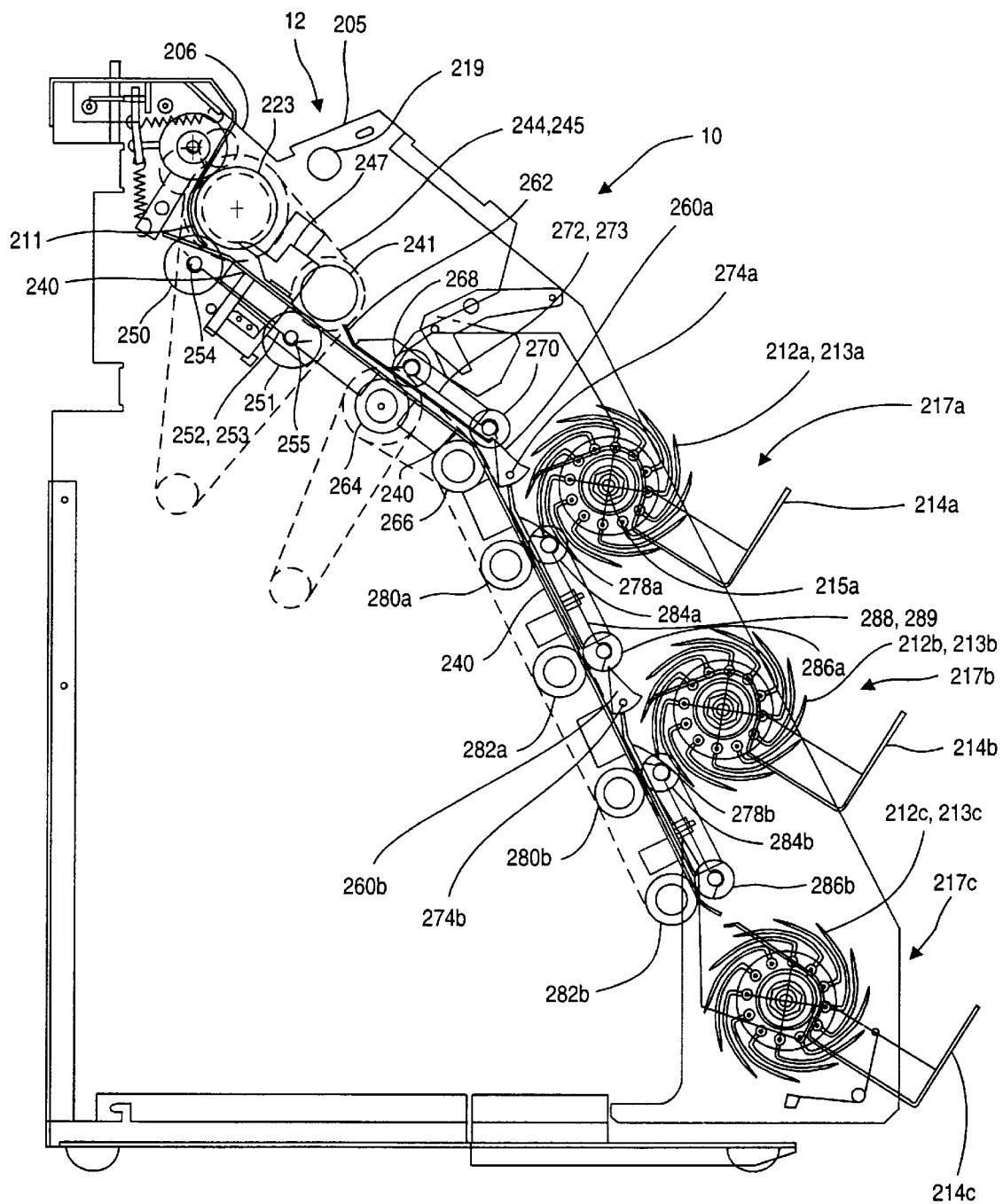
FIG. 16a is a side view of an evaluation device depicting various transport rolls in side elevation having three output receptacles according to one embodiment of the present invention.
Figure 16B:
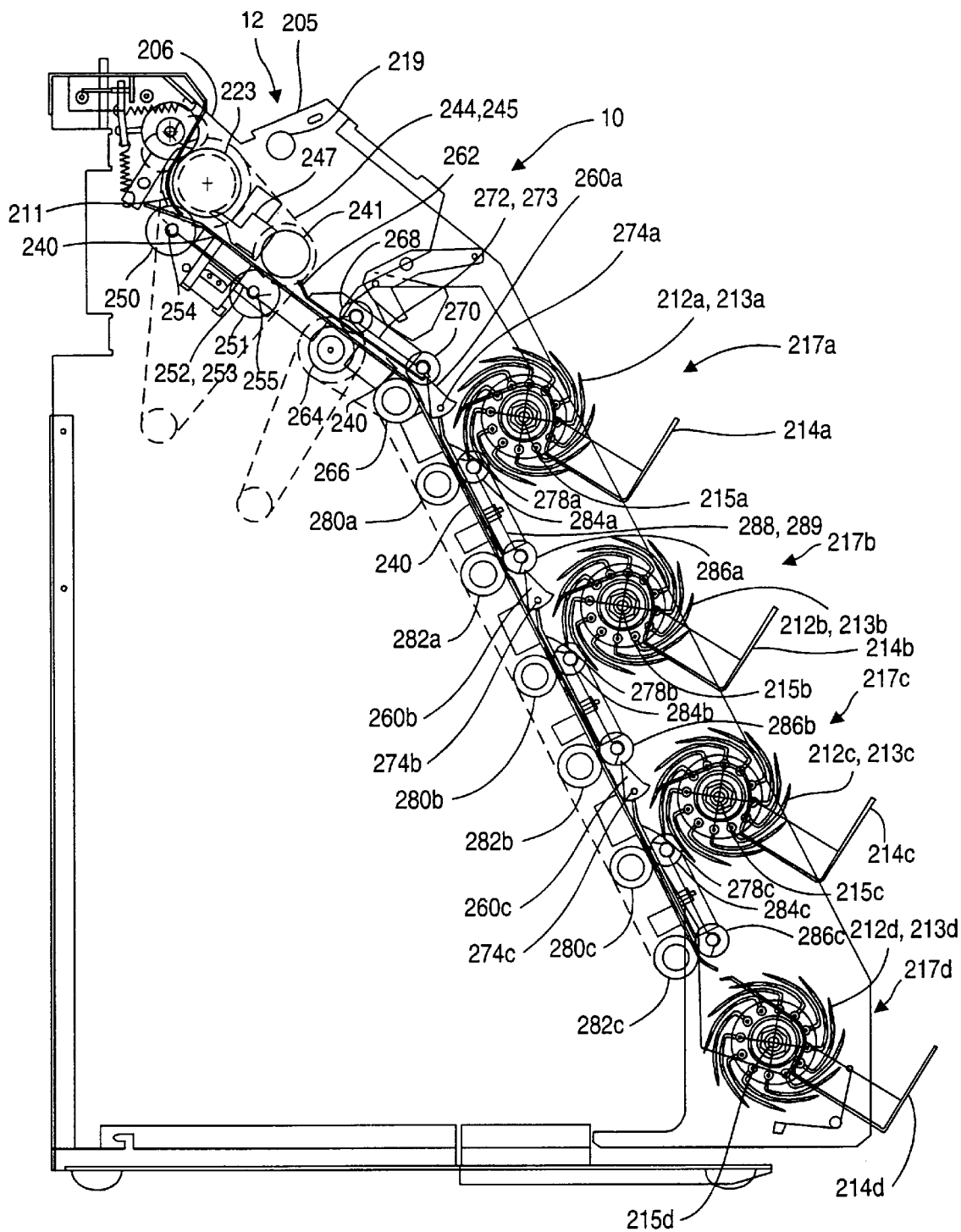
FIG. 16b is a side view of an evaluation device depicting various transport rolls in side elevation having four output receptacles according to one embodiment of the present invention.
Figure 16C:
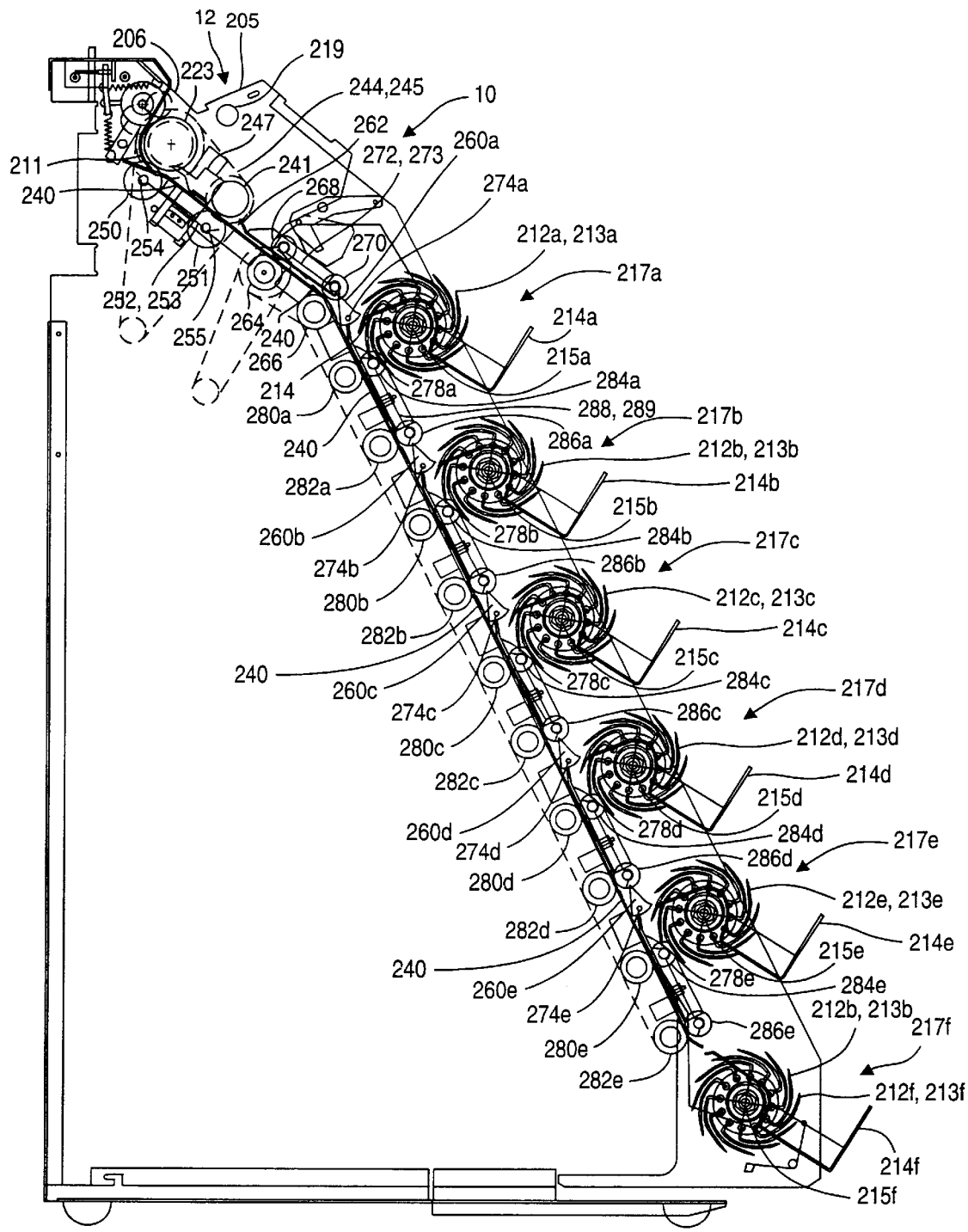
FIG. 16c is a side view of an evaluation device depicting various transport rolls in side elevation having six output receptacles according to one embodiment of the present invention.
Figure 19:
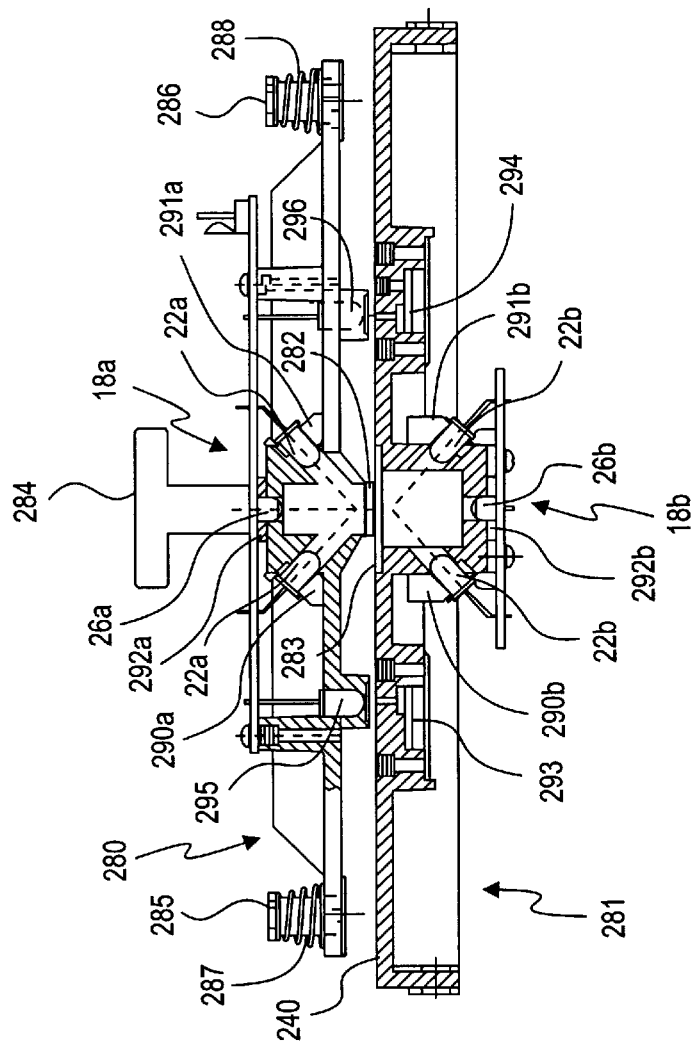
FIG. 19 is a section taken through the centers of both the upper and lower support members, along the long dimension of the lower support member according to one embodiment of the present invention.
Figure 18:
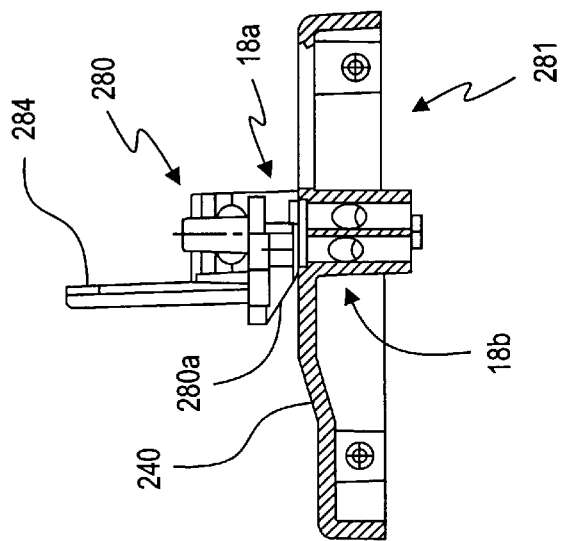
FIG. 18 is an end elevation of the upper support member which includes the upper scanhead, and the sectional view of the lower support member mounted beneath the upper support member according to one embodiment.
Figure 20:
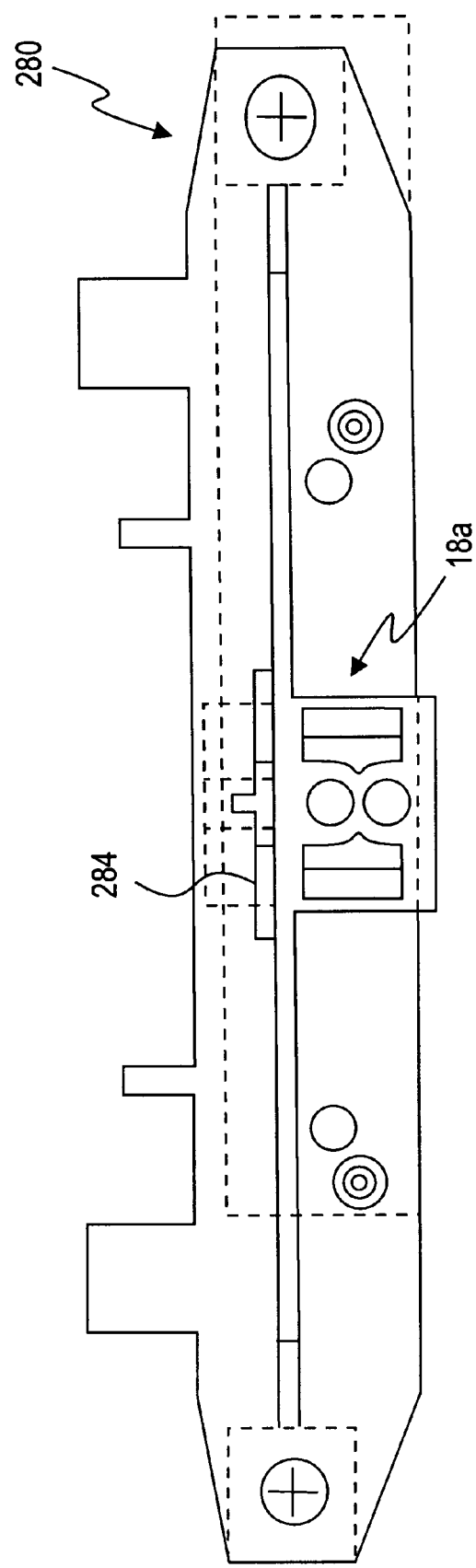
FIG. 20 is a top plan view of an upper support member which includes an upper scanhead according to one embodiment.
Figure 21:
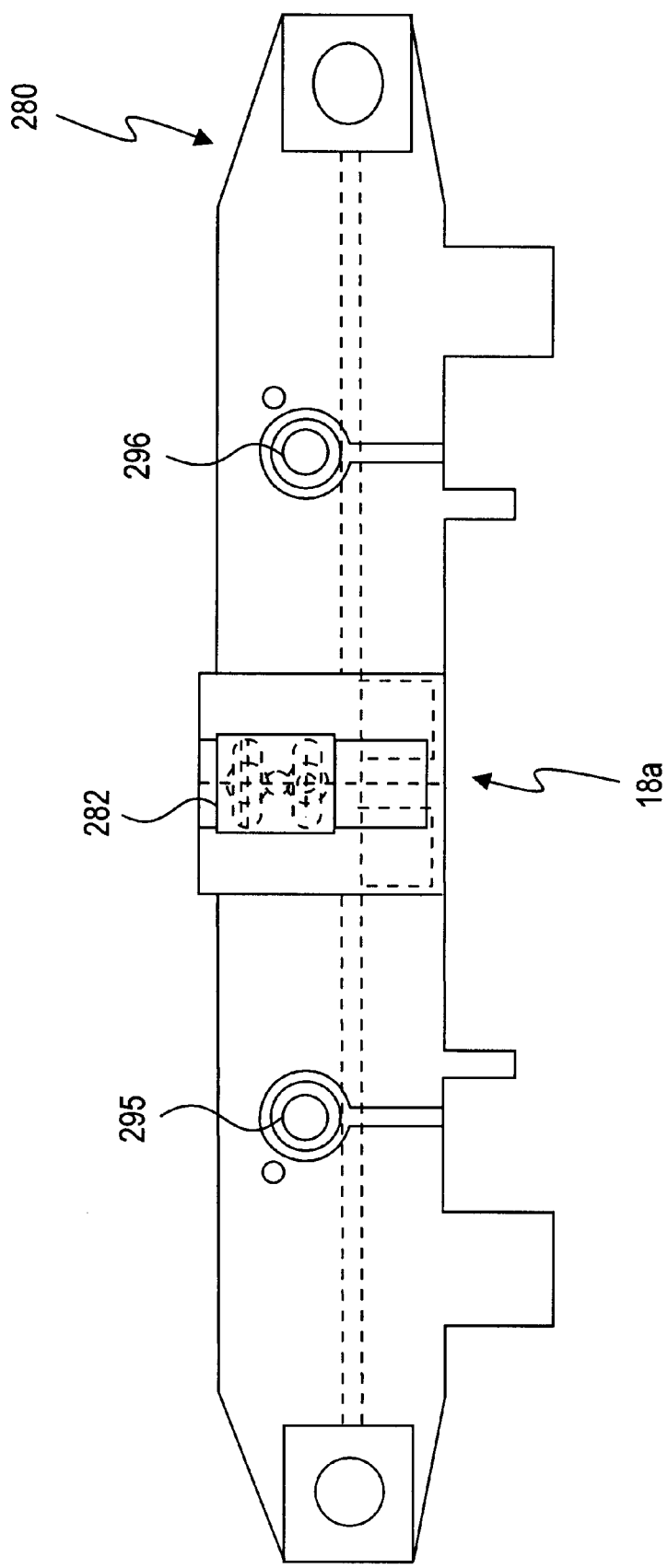
FIG. 21 is a bottom plan view of an upper support member which includes an upper scanhead according to one embodiment.

FIGS. 16a–c depict multi-pocket document evaluation devices 10, such as a currency evaluators, according to embodiments of the present invention. FIG. 16a depicts a three-pocket document evaluation device 10, such as a currency evaluator. FIG. 16b depicts a four-pocket document evaluation device 10, such as a currency evaluator. FIG. 16c depicts a six-pocket document evaluation device 10, such as a currency evaluator.

The multi-pocket document evaluation devices 10 in FIGS. 16a–c have a transport mechanism which includes a transport plate or guide plate 240 for guiding currency bills to one of a plurality of output receptacles 217. The transport plate 240 according to one embodiment is substantially flat and linear without any protruding features. Before reaching the output receptacles 217, a bill can be, for example, evaluated, analyzed, authenticated, discriminated, counted and/or otherwise processed.

The multi-pocket document evaluation devices 10 move the currency bills in seriatim from a bottom of the stack along the curved guideway 211 which receives bills moving downwardly and rearwardly and changes the direction of travel to a forward direction. An exit end of the curved guideway 211 directs the bills onto the transport plate 240 which carries the bills through an evaluation section and to one of the output receptacles 217. A plurality of diverters 260 direct the bills to the output receptacles 217. When the diverter 260 is in a lower position, bills are directed to the corresponding output receptacle 217. When the diverter 260 is in an upper position, bills proceed in the direction of the remaining output receptacles.

The multi-pocket document evaluation devices 10 of FIG. 16a–c according to one embodiment includes passive rolls 250, 251 which are mounted on an underside of the transport plate 240 and are biased into counter-rotating contact with their corresponding driven upper rolls 223 and 241. Other embodiments includes a plurality of follower plates which are substantially free from surface features and are substantially smooth like the transport plate 240. The follower plates 262 and 278 are positioned in spaced relation to transport plate 240 so as to define a currency pathway therebetween. In one embodiment, follower plates 262 and 278 have apertures only where necessary for accommodation of passive rolls 268, 270, 284, and 286.

The follower plate, such as follower plate 262, work in conjunction with the upper portion of the transport plate 240 to guide a bill 20 from the passive roll 251 to a driven roll 264 and then to a driven roll 266. The passive rolls 268, 270 are biased by H-springs into counter-rotating contact with the corresponding driven rolls 264 and 266.

Turning now to FIG. 17a, there is shown a functional block diagram illustrating an embodiment of a document authenticator and discriminator according to the present invention. The discriminator system 302 comprises an input receptacle 304 for receiving a stack of currency bills. A transport mechanism defining a transport path (as represented by arrow M) transports the bills in the input receptacle, one at a time, past one or more sensors of an authenticating and discriminating unit 306. Bills are then transported to one of a plurality of output receptacles 308 (arrow N). The system 302 may correspond, for example, to the discriminators described above having multiple output pockets such as those shown in FIGS. 9, 10, and 16a–16c. The authenticating and discriminating unit scans and determines the denomination of each passing bill. Any variety of discriminating techniques may be used. For example, the discriminating method disclosed in U.S. Pat. No. 5,295,196 (incorporated herein in its entirety) may be employed to optically scan each bill. Depending on the characteristics of the discriminating unit employed, the discriminator may be able to recognize bills only if fed face up or face down, regardless of whether fed face up or face down, only if fed in a forward orientation or reverse orientation, regardless of whether fed in a forward or reverse orientation, or some combination thereof Additionally, the discriminating unit may be able to scan only one side or both sides of a bill. In addition to determining the denomination of each scanned bill, the authenticating and discriminating unit 306 may additionally include various authenticating tests such as an ultraviolet authentication test as disclosed in U.S. patent application Ser. No. 08/317,349 filed on Oct. 4, 1994 for a "Method and Apparatus for Authenticating Documents Including Currency" incorporated herein by reference in its entirety. Likewise, the authenticating and discriminating unit 306 may additionally include other authentication tests such as thread detection, enhanced magnetics tests, and color authentication tests including those described in co-pending U.S. patent application Ser. No. 08/800,055, filed on Feb. 14, 1997 entitled "Method and Apparatus for Document Identification and Authentication" incorporated herein by reference in its entirety.

Signals from the authenticating and discriminating unit 306 are sent to a signal processor such as a central processor unit ("CPU"). The CPU records the results of the authenticating and discriminating tests in a memory. When the authenticating and discriminating unit 306 is able to confirm the genuineness and denomination of a bill, the value of the bill is added to a total value counter in memory that keeps track of the total value of the stack of bills that were inserted in the input receptacle 304 and scanned by the authenticating and discriminating unit 306. Additionally, depending on the mode of operation of the discriminator system 302, counters associated with one or more denominations may be maintained in the memory. For example, a $1 counter may be maintained to record how many $1 bills were scanned by the authenticating and discriminating unit 306. Likewise, a $5 counter may be maintained to record how many $5 bills were scanned, and so on. In an operating mode where individual denomination counters are maintained, the total value of the scanned bills may be determined without maintaining a separate total value counter. The total value of the scanned bills and/or the number of each individual denomination may be displayed on a display such as a monitor or LCD display.

A discriminating unit such as the authenticating and discriminating unit 306 may not be able to identify the denomination of one or more bills in the stack of bills loaded into the input receptacle 304. For example, if a bill is excessively worn or soiled or if the bill is torn a discriminating unit may not be able to identify the bill. Furthermore, some known discrimination methods do not have a high discrimination efficiency and thus are unable to identify bills which vary even somewhat from an "ideal" bill condition or which are even somewhat displaced by the transport mechanism relative to the scanning mechanism used to discriminate bills. Accordingly, such poorer performing discriminating units may yield a relatively large number of bills which are not identified. Alternatively, some discriminating units may be capable of identifying bills only when they are fed in a predetermined manner. For example, some discriminators may require a bill to be faced in a predetermined manner. Accordingly, when a bill is fed face down past a discriminating unit which can only identify bills fed face up, the discriminating unit can not identify the bill. Likewise, other discriminators require a specific edge of a bill to be fed first, for example, the top edge of a bill. Accordingly, bills which are not fed in the forward direction, that is, those that are fed in the reverse direction, are not identified by such a discriminating unit.

According to one embodiment, the discriminator system 302 is designed so that when the authenticating and discriminating unit is unable to identify a bill, the unidentified note is "presented" in one of the output receptacles, that is, the transport mechanism is stopped so that the unidentified bill is located at a predetermined position within one of the output receptacles, such as being the last bill transported to one of the output receptacles. For example, where the unidentified bill is the last bill transported to an output receptacle, it may be positioned within the stacker wheels or positioned at the top of or at the rear of the stack of bills resting on a stacker plate in the output receptacle 308. The output receptacles 308 are preferably positioned within the discriminator system 302 so that the operator may conveniently see the flagged bill and/or remove it for closer inspection. Accordingly, the operator is able to easily see the bill which has not been identified by the authenticating and discriminating unit 306. The operator may then either visually inspect the flagged bill while it is resting on the top of or at the rear of the stack, or alternatively, the operator may chose to remove the bill from the output receptacle in order to examine the flagged bill more closely.

According to another embodiment, when a bill is flagged, the transport mechanism may be stopped before the flagged bill is transported to one of the output receptacles. Such an embodiment is particularly suited for situations in which the operator need not examine the bill being flagged, such as upon the occurrence of a denomination change or separate series error described below. For example, upon the occurrence of a denomination change where all available output receptacles already have one or more bills in them, the machine may stop with the denomination change bill residing within the transport mechanism. The machine may then prompt the operator to remove all the bills from a given output receptacle. When the operator does so, the machine automatically resumes operation (or alternatively, the machine may resume operation after the selection of a continue key) and delivers the denomination change bill into the cleared output receptacles.

The discriminator system 302 may be designed to continue operation automatically when a flagged bill is removed from the output receptacle or, according to one embodiment of the present invention, may be designed to require a selection element to be depressed. Upon examination of a flagged bill by the operator, it may be found that the flagged bill is genuine even though it was not identified by the discriminating unit. However, because the bill was not identified, the total value and/or denomination counters in the memory will not reflect its value. According to one embodiment, such an unidentified bill is removed from the output stack and either re-fed through the discriminator or set aside. In the latter case, any genuine set aside bills are counted by hand.

In order to avoid problems associated with re-feeding bills, counting bills by hand, and adding together separate totals, according to one embodiment of the present invention, a number of selection elements associated with individual denominations are provided. These selection elements may be in the form of keys or buttons of a keypad. Other types of selection elements such as switches or displayed keys in a touch-screen environment may be employed. When an operator determines that a flagged bill is acceptable, the operator may simply depress the selection element associated with the denomination of the flagged bill and the corresponding denomination counter and/or the total value counter are appropriately incremented and the discriminator system 302 resumes operating again. In non-automatic restart discriminators, where an operator has removed a genuine flagged bill from the output receptacle for closer examination, the bill is first replaced into the output receptacle before a corresponding selection element is chosen.

An advantage of the above described procedure is that appropriate counters are incremented and the discriminator is restarted with the touch of a single key, greatly simplifying the operation of the discriminator system 302 while reducing the opportunities for human error. When an operator determines that a flagged bill is not acceptable, the operator may remove the unacceptable flagged bill from the output receptacle without replacement and depress a continuation key on the keypad. When the continuation key is selected, the denomination counters and the total value counter are not affected and the discriminator system 302 will resume operating again. In automatic restart discriminators, the removal of a bill from the output receptacle is treated as an indication that the bill is unacceptable and the discriminator automatically resumes operation without affecting the denomination counters and/or total value counters.

Turning now to FIG. 17b, there is shown a functional block diagram illustrating a two-pocket document authenticator and discriminator according to one embodiment of the present invention. The discriminator system 303 comprises an input receptacle 304' for receiving a stack of currency bills. A transport mechanism defining a transport path (as represented by arrow M') transports the bills in the input receptacle, one at a time, past one or more sensors of an authenticating and discriminating unit 306'. Bills are then transported to one of two output receptacles 308', 308 "(as represented by arrows N', N").

In one embodiment, where the authenticating and discriminating unit 306' determines that a bill is a fake, the flagged bill is routed to a specific one of the output receptacles. The operation of the discriminator may or may not then be suspended. When a bill is not determined to be fake but for some reason the authenticating and discriminating unit 306' is not able to identify the denomination of the bill, the no call bill may be transported to one of the output receptacles 308', 308". In one embodiment, no call bills are transported to a specific one of the output receptacles 308', 308". In another embodiment, no call bills are not delivered to a special separate output receptacle. The operation of the discriminator may or may not then be suspended. For example, in a two output pocket discriminator, all bills may be transported to the same output receptacle regardless of whether they are determined to be suspect, no call, or properly identified. In this example, the operation of the discriminator may be suspended and an appropriate message displayed when a suspect or no call bill is encountered. Alternatively, suspect bills may be delivered to a specific one of the two output receptacles (i.e., a reject receptacle) and no calls and identified bills may be sent to the other output receptacle. In this example, the operation of the discriminator need not be suspended when a suspect bill is encountered but may be suspended when a no call bill is encountered. If the operation is suspended at the time the no call bill is detected and the operator determines that the no call bill is acceptable, the operator returns the bill to the output receptacle from which it was removed (if it was removed) and selects a selection element (not shown) corresponding to the denomination of the flagged bill. Appropriate counter (the disown) are incremented, the discriminator system 303 resumes operation. On the other hand, if the operator determines that the flagged bill is unacceptable, the operator removes the bill without replacement from the output receptacle and selects a continuation element (not shown). The discriminator system 303 resumes operation without incrementing the counters associated with the various denomination and/or the total value counters.

In another embodiment, no call bills are delivered to a specific output receptacle separate from the output receptacle receiving identified bills. The operation of the discriminator need not be suspended until all the bills placed in the input receptacle 304 have been processed. Alternatively, the operation of the discriminator need not be suspended when a no call is encountered but may be suspended when a suspect bill is detected so that the operator may remove any suspect bills from the discriminator. The value of any no call bills may then be added to the appropriate counters after the stack of bills has been processed through a reconciliation process.

In an alternate embodiment, suspect and no call bills may be delivered to a specific one of the two output receptacles (i.e., a reject receptacle) and identified bills may be sent to the other output receptacle. Additionally, according to this embodiment, the operation of the discriminator may be suspended and an appropriate message displayed when a suspect or no call bill is encountered.

The upper and lower scanhead assemblies are shown most clearly in FIGS. 18–21. It can be seen that the housing for each scanhead is formed as an integral part of a unitary molded plastic support member 280 or 281 that also forms the housings for the light sources and photodetectors of the photosensors PS1 and PS2. The lower member 281 also forms the flat guide plate 240 that receives the bills from the drive roll 223 and supports the bills as they are driven past the scanheads 18a and 18b.

The two support members 280 and 281 are mounted facing each other so that the lenses 282 and 283 of the two scanheads 18a, 18b define a narrow gap through which each bill is transported. Similar, but slightly larger, gaps are formed by the opposed lenses of the light sources and photodetectors of the photosensors PS1 and PS2. The upper support member 280 includes a tapered entry guide 280a which guides an incoming bill into the gaps between the various pairs of opposed lenses.

The lower support member 281 is attached rigidly to the machine frame. The upper support member 280, however, is mounted for limited vertical movement when it is lifted manually by a handle 284, to facilitate the clearing of any paper jams that occur beneath the member 280. To allow for such vertical movement, the member 280 is slidably mounted on a pair of posts 285 and 286 on the machine frame, with a pair of springs 287 and 288 biasing the member 280 to its lowermost position.

Each of the two optical scanheads 18a and 18b housed in the support members 280, 281 includes a pair of light sources acting in combination to uniformly illuminate light strips of the desired dimension on opposite sides of a bill as it is transported across the plate 240. Thus, the upper scanhead 18a includes a pair of LEDs 22a, directing light downwardly through an optical mask on top of the lens 282 onto a bill traversing the flat guide plate 240 beneath the scanhead. The LEDs 22a are angularly disposed relative to the vertical axis of the scanhead so that their respective light beams combine to illuminate the desired light strip defined by an aperture in the mask. The scanhead 18a also includes a photodetector 26a mounted directly over the center of the illuminated strip for sensing the light reflected off the strip. The photodetector 26a is linked to the CPU 30 through the ADC 28 for processing the sensed data as described above.

In the particular embodiment of the scanheads 18a and 18b illustrated in the drawings, each scanhead includes two pairs of LEDs and two photodetectors for illuminating, and detecting light reflected from, strips of two different sizes. Thus, each mask also includes two slits which are formed to allow light from the LEDs to pass through and illuminate light strips of the desired dimensions. More specifically, one slit illuminates a relatively wide strip used for obtaining the reflectance samples which correspond to the characteristic pattern for a test bill. In one embodiment, the wide slit has a length of about 0.500" and a width of about 0.050". The second slit forms a relatively narrow illuminated strip used for detecting the thin borderline surrounding the printed indicia on currency bills, as described above in detail. In one embodiment, the narrow slit 283 has a length of about 0.300" and a width of about 0.010".

In order to prevent dust from fouling the operation of the scanheads, each scanhead includes three resilient seals or gaskets 290, 291, and 292. The two side seals 290 and 291 seal the outer ends of the LEDs 22, while the center seal 292 seals the outer end of the photodetector 26. Thus, dust cannot collect on either the light sources or the photodetectors, and cannot accumulate and block the slits through which light is transmitted from the sources to the bill, and from the bill to the photodetectors.

Figure 22:
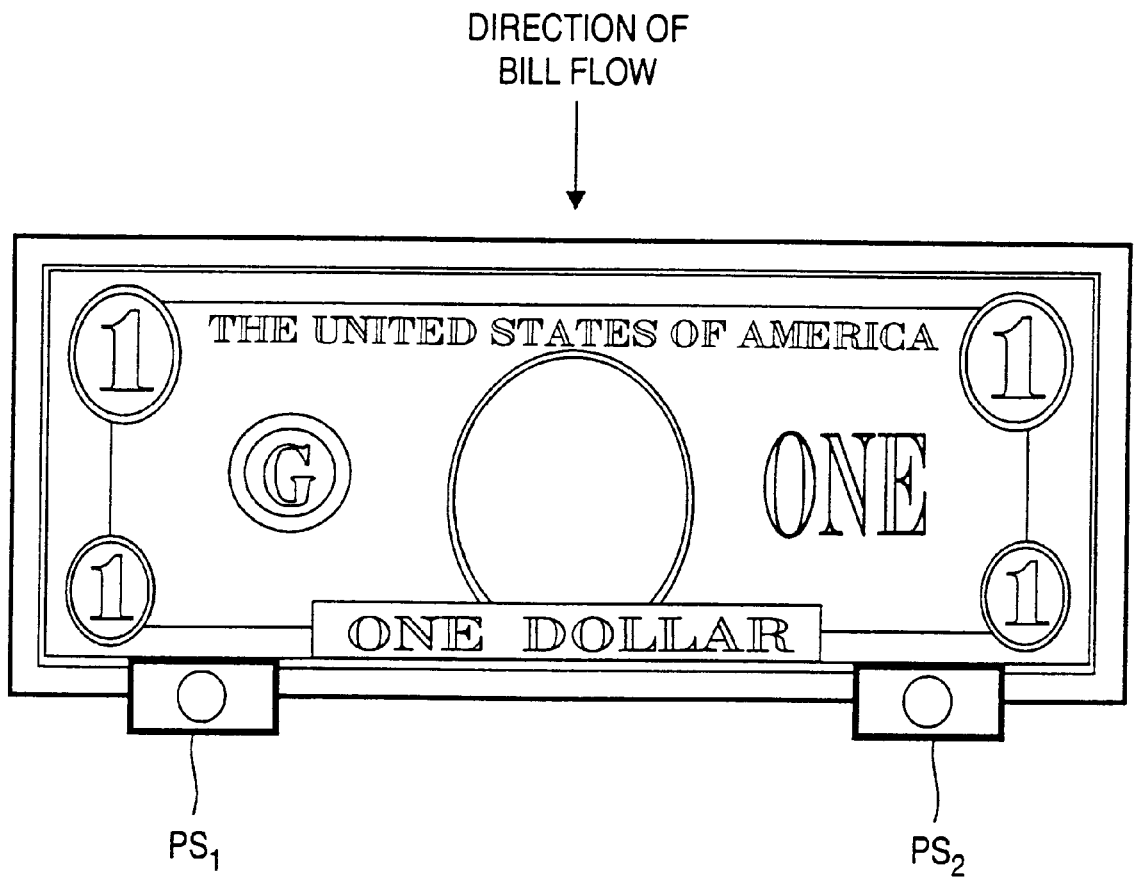
FIG. 22 is a diagrammatic illustration of the location of two auxiliary photo sensors relative to a bill passed thereover by the transport and scanning mechanism according to embodiments of the present invention.

Doubling or overlapping of bills in the illustrative transport system is detected by two photosensors PS1 and PS2 which are located on a common transverse axis that is perpendicular to the direction of bill flow (see e.g., FIG. 22). The photosensors PS1 and PS2 include photodetectors 293 and 294 mounted within the lower support member 281 in immediate opposition to corresponding light sources 295 and 296 mounted in the upper support member 280. The photodetectors 293, 294 detect beams of light directed downwardly onto the bill transport path from the light sources 295, 296 and generate analog outputs which correspond to the sensed light passing through the bill. Each such output is converted into a digital signal by a conventional ADC converter unit (not shown) whose output is fed as a digital input to and processed by the system CPU.

The presence of a bill adjacent the photosensors PS1 and PS2 causes a change in the intensity of the detected light, and the corresponding changes in the analog outputs of the photodetectors 293 and 294 serve as a convenient means for density-based measurements for detecting the presence of "doubles" (two or more overlaid or overlapped bills) during the currency scanning process. For instance, the photosensors may be used to collect a predefined number of density measurements on a test bill, and the average density value for a bill may be compared to predetermined density thresholds (based, for instance, on standardized density readings for master bills) to determine the presence of overlaid bills or doubles.

In order to prevent the accumulation of dirt on the light sources 295 and 296 and/or the photodetectors 293, 294 of the photosensors PS1 and PS2, both the light sources and the photodetectors are enclosed by lenses mounted so close to the bill path that they are continually wiped by the bills. This provides a self-cleaning action which reduces maintenance problems and improves the reliability of the outputs from the photosensors over long periods of operation.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claim

What is claimed is:

1. A currency evaluating device for receiving a stack of currency bills, rapidly discriminating the bills in the stack, and then re-stacking the bills comprising:
   an input receptacle adapted to receive said stack of currency bills to be discriminated;
   a transport mechanism adapted to transport said bills in the direction of the narrow dimension of the bills, one at a time, from said input receptacle to a plurality of output receptacles, at a rate in excess of about 800 bills per minute; and
   a discriminating unit adapted to determine the denomination of each of said bills at a rate in excess of about 800 bills per minute, said discriminating unit including a detector positioned along a transport mechanism path between said input receptacle and one of said plurality of output receptacles adapted to receive and re-stack said bills after being discriminated by said discriminating unit.

2. The currency device of claim 1 further comprising an authenticating unit adapted to determine the genuineness of said bills.

3. The currency device of claim 1 having exactly six output receptacles.

4. The currency device of claim 1 further comprising a counting device adapted to rapidly count said bills in said stack, said counting device comprising one or more counters keeping track of the value of bills discriminated.

5. The currency device of claim 2 wherein said authenticating unit includes a plurality of magnetoresistive sensors.

6. The currency authenticating device of claim 5 wherein the plurality of magnetoresistive sensors are arranged in an array.

7. The currency device of claim 6 wherein the plurality of magnetoresistive sensors are arranged in a linear array.

8. A currency evaluating device for receiving a stack of currency bills, rapidly discriminating the bills in the stack, and then re-stacking the bills comprising:
   an input receptacle for receiving said stack of currency bills to be discriminated;
   a transport mechanism for transporting said bills in the direction of the narrow dimension of the bills, one at a time, from said input receptacle to a plurality of output receptacles, at a rate in excess of about 800 bills per minute;
   a discriminating unit for determining the denomination of each of said bills, said discriminating unit including a detector positioned along a transport mechanism path between said input receptacle and one of said a plurality of output receptacles for receiving and re-stacking said bills after being discriminated by said discriminating unit; and
   an authenticating unit for determining the genuineness of said bills; said authenticating unit having an ultraviolet light source for illuminating said bill to be tested, an ultraviolet light detector for generating an output signal responsive to ultraviolet light reflected by said bill, and a signal processor for receiving said ultraviolet detector output signal and determining the genuineness of said bill based upon said output signal.

9. The currency device of claim 8 wherein said output signal is responsive to the presence or absence of ultraviolet light reflected from one or more areas of said bill.

10. The currency device of claim 8 wherein said detector detects a pattern of ultraviolet light reflected by said bill.

11. The currency device of claim 8 wherein said output signal is responsive to the amount of ultraviolet light reflected from one or more areas of said bill.

12. A currency evaluating device for receiving a stack of currency bills, rapidly discriminating the bills in the stack, and then re-stacking the bills comprising:
   an input receptacle for receiving said stack of currency bills to be discriminated;
   a transport mechanism for transporting said bills in the direction of the narrow dimension of the bills, one at a time, from said input receptacle to a plurality of output receptacles, at a rate in excess of about 800 bills per minute;
   a discriminating unit for determining the denomination of each of said bills, said discriminating unit including a detector positioned along a transport mechanism path between said input receptacle and one of said a plurality of output receptacles for receiving and re-stacking said bills after being discriminated by said discriminating unit; and
   an authenticating unit for determining the genuineness of said bills; said authenticating unit having an ultraviolet light source for illuminating said bill to be tested, an ultraviolet light detector for generating an output signal responsive to ultraviolet light reflected by said bill, a visible light detector for generating an output signal responsive to visible light emitted by said bill upon illumination of said bill by said ultraviolet light source and a signal processor for receiving said ultraviolet light detector output signal and said visible light detector output signal and determining the genuineness of said bill based upon said ultraviolet light detector output signal and said visible light detector output signal.

13. The currency device of claim 12 wherein said ultraviolet light detector output signal is responsive to the amount of ultraviolet light reflected from one or more areas of said bill and said visible light detector output signal is responsive to the amount of visible light emitted from one or more areas of said bill.

14. A currency evaluating device for receiving a stack of currency bills, rapidly discriminating the bills in the stack, and then re-stacking the bills comprising:
   an input receptacle for receiving said stack of currency bills to be discriminated;
   a transport mechanism for transporting said bills in the direction of the narrow dimension of the bills, one at a time, from said input receptacle to a plurality of output receptacles, at a rate in excess of about 800 bills per minute;

a discriminating unit for determining the denomination of each of said bills, said discriminating unit including a detector positioned along a transport mechanism path between said input receptacle and one of said a plurality of output receptacles for receiving and re-stacking said bills after being discriminated by said discriminating unit; and an authenticating unit for determining the genuineness of said bills; said authenticating unit having a detection circuitry for detecting first characteristic information and second characteristic information from a scanned bill;

wherein said discriminating unit generates a first characteristic scanned pattern associated with said detected first characteristic information, a memory for storing
  (1) at least one first characteristic master pattern associated with first characteristic information for each of a plurality of recognizable denominations of genuine bills,
  (2) at least one set of genuine second characteristic information for each of said plurality of recognizable denominations of genuine bills, and a signal processor for
  (1) performing a first comparison whereby at least a portion of said scanned pattern is compared with at least a portion of at least one of said master patterns,
  (2) determining and indicating the denomination of said scanned bill when said scanned bill is one of said plurality of recognizable denominations or indicating an error based on said first comparison,
  (3) retrieving at least a portion of at least one of said sets of genuine second characteristic information corresponding only to the denomination indicated by said first comparison regardless of which of said plurality of recognizable denominations said scanned bill is determined to be based on said first comparison,
  (4) performing a second comparison whereby at least a portion of said detected second characteristic information is compared with said retrieved genuine second characteristic information, and
  (5) indicating either the genuineness of said scanned bill or an error based on said second comparison.

15. A currency discrimination device of claim 14 wherein said detection circuitry employs at least one detector selected from the group consisting of: optical, magnetic, electrical conductivity, capacitive, and mechanical sensors.

16. A currency counting and evaluation device for receiving a stack of currency bills, rapidly counting and evaluating all the bills in the stack, and then re-stacking the bills, said device comprising:

a input receptacle for receiving a stack of currency bills;

a transport mechanism for transporting said bills, in the direction of the narrow dimension of the bills, from said input receptacle to one of a plurality of output receptacles for receiving and re-stacking said bills after being counted and evaluated at a rate in excess of about 800 bills per minute;

a stationary optical scanning head located between said input receptacle and said plurality of output receptacles for scanning a preselected segment of a central portion of each bill transported by said transport mechanism, said scanning head including at least one light source for illuminating a strip of said preselected segment of a bill, and at least one detector for receiving light from the illuminated strip on the bill and producing an output signal representing variations in the intensity of the received light;

means for sampling said output signal at preselected intervals as a bill is moved across said scanning head in the direction of the narrow dimension of the bill, each of said output signal samples being proportional to the intensity of the light received from a different strip of said preselected segment of a bill;

a memory for storing characteristic signal samples produced by scanning said preselected segments of bills of different denominations with said scanning head and sampling said output signal at said preselected intervals, each of said stored signal samples being proportional to the intensity of the light received from a different strip of said preselected segment of a bill; and signal processor for receiving said signal samples and (1) determining the denomination of each scanned bill by comparing said stored signal samples with said output signal samples produced by the scanning of each bill with said scanning head, (2) counting the number of scanned bills of each denomination, and (3) accumulating the cumulative value of the scanned bills of each denomination.

17. The currency counting and evaluation device of claim 16 further comprising an authenticating unit for determining the genuineness of the bill.

18. The currency counting and evaluation device of claim 16 wherein said preselected segment of each bill is located in the central region of the bill.

19. The currency counting and evaluation device of claim 16 wherein said transport mechanism forms a linear path for said bills on the upstream side of said plurality of output receptacles, and said scanning head is located along said linear path.

20. The currency counting and evaluation device of claim 16 which includes signal processing means responsive to the output signals from said detector for determining the denomination of each scanned bill before that bill has been advanced to said plurality of output receptacles, and means responsive to said signal processor for altering the movement of a scanned bill in response to the denomination determination for that bill, before that bill is advanced to said plurality of output receptacles.

21. The currency counting and evaluation device of claim 16 wherein said transport mechanism transports bills, at a rate of at least about 1000 bills per minute.

22. The currency counting and evaluation device of claim 16 having exactly six output receptacles.

23. A currency evaluating device for receiving a stack of currency bills, rapidly discriminating the bills in the stack, and then re-stacking the bills comprising:

an input receptacle adapted to receive said stack of currency bills to be discriminated;

a transport mechanism adapted to transport said bills in the direction of the narrow dimension of the bills, one at a time, from said input receptacle to a plurality of output receptacles, at a rate in excess of about 800 bills per minute; and a discriminating unit adapted to determine the denomination of each of said bills at a rate in excess of about 800 bills per minute, said discriminating unit including a detector positioned along a transport mechanism path between said input receptacle and one of said plurality of output receptacles adapted to receive and re-stack said bills after being discriminated by said discriminating unit, wherein said currency evaluating device has a height not exceeding about 17 ½ inches, a width not exceeding about 13 ½ inch and a depth not exceeding about 15 inches.

24. A currency evaluating device adapted to receive a stack of currency bills, rapidly discriminating the bills in the stack, and then re-stacking the bills comprising:

an input receptacle adapted to receive the stack of currency bills to be discriminated;

a transport mechanism adapted to transport the bills in the direction of the narrow dimension of the bills, one at a time, from the input receptacle to a plurality of output receptacles, at a rate in excess of about 800 bills per minute; and a discriminating unit adapted to determine the denomination of each of the bills at a rate in excess of about 800 bills per minute, the discriminating unit including a detector positioned along a transport mechanism path between the input receptacle and one of the plurality of output receptacles adapted to receive and re-stack the bills after being discriminated by the discriminating unit, wherein the currency evaluating device has a volume not exceeding 2.05 ft$^3$.

25. The currency device of claim 24 wherein the transport mechanism transports bills at a rate in excess of about 1000 bills per minute and the discriminating unit determines the denomination of each of the bills at a rate in excess of about 1000 bills per minute.

26. The currency device of claim 1 wherein the transport mechanism is adapted to transport at a rate in excess of about 1000 bills per minute and the discriminating unit is adapted to determine the denomination of each of the bills at a rate in excess of about 1000 bills per minute.

27. The currency device of claim 23 wherein the transport mechanism is adapted to transport at a rate in excess of about 1000 bills per minute and the discriminating unit is adapted to determine the denomination of each of the bills at a rate in excess of about 1000 bills per minute.

28. A currency evaluating device adapted to receive a stack of currency bills, rapidly discriminating the bills in the stack, and then re-stacking the bills comprising:

an input receptacle adapted to receive the stack of currency bills to be discriminated;

a transport mechanism adapted to transport the bills in the direction of the narrow dimension of the bills, one at a time, from the input receptacle to a plurality of output receptacles, at a rate in excess of about 800 bills per minute;

a discriminating unit adapted to determine the denomination of each of the bills at a rate in excess of about 800 bills per minute, the discriminating unit including a detector positioned along a transport mechanism path between the input receptacle and one of the plurality of output receptacles adapted to receive and re-stack the bills after being discriminated by the discriminating unit; and an authenticating unit adapted to determine the genuineness of the bills, the authenticating unit having an ultraviolet light source adapted to illuminate the bill to be tested, an ultraviolet light detector adapted to generate an output signal responsive to ultraviolet light reflected by the bill, and a processor programmed to receive the ultraviolet detector output signal and to determine the genuineness of the bill based upon the output signal.

29. The currency device of claim 28 wherein the authenticating unit further comprises a visible light detector adapted to generate an output signal responsive to visible light emitted by the bill upon illumination of the bill by the ultraviolet light source and wherein the processor is further programmed to receive the visible light detector output signal and to determine the genuineness of the bill based upon the ultraviolet light detector output signal and the visible light detector output signal.

30. A currency counting and evaluation device adapted to receive a stack of currency bills, rapidly counting and evaluating all the bills in the stack, and then re-stacking the bills, the device comprising:

an input receptacle adapted to receive a stack of currency bills;

a transport mechanism adapted to transport the bills at a rate in excess of about 800 bills per minute, in the direction of the narrow dimension of the bills, from the input receptacle to one of a plurality of output receptacles adapted to receive and re-stack the bills after being counted and evaluated;

a stationary optical scanning head located between the input receptacle and the plurality of output receptacles adapted to scan a preselected segment of a central portion of each bill transported by the transport mechanism at a rate in excess of about 800 bills per minute, the scanning head including at least one light source adapted to illuminate a strip of the preselected segment of a bill, and at least one detector adapted to receive light from the illuminated strip on the bill and produce an output signal representing variations in the intensity of the received light;

means for sampling the output signal at preselected intervals as a bill is moved across the scanning head in the direction of the narrow dimension of the bill, each of the output signal samples being proportional to the intensity of the light received from a different strip of the preselected segment of a bill;

a memory programmed to store characteristic signal samples produced by scanning the preselected segments of bills of different denominations with the scanning head and sampling the output signal at the preselected intervals, each of the stored signal samples being proportional to the intensity of the light received from a different strip of the preselected segment of a bill; and a processor programmed to receive the signal samples and (1) determine the denomination of each scanned bill by comparing the stored signal samples with the output signal samples produced by the scanning of each bill with the scanning head, (2) count the number of scanned bills of each denomination, and (3) accumulate the cumulative value of the scanned bills of each denomination.

31. The currency counting and evaluation device of claim 30 further comprising an authenticating unit adapted to determine the genuineness of the bill.

32. The currency counting and evaluation device of claim 30 wherein the preselected segment of each bill is located in the central region of the bill.

33. The currency counting and evaluation device of claim 30 wherein the processor is responsive to the output signals from the detector and is adapted to determine the denomination of each scanned bill before that bill has been advanced to the plurality of output receptacles, and further comprising means responsive to the processor for altering the movement of a scanned bill in response to the denomination determination for that bill, before that bill is advanced to the plurality of output receptacles.

34. The currency counting and evaluation device of claim 30 wherein the transport mechanism transports bills, at a rate of at least about 1000 bills per minute.

35. A method of evaluating currency bills of different denominations using a currency evaluation device comprising:

receiving a stack of bills to be evaluated in an input receptacle of the evaluation device;

transporting, under control of the evaluation device at a rate in excess of about 800 bills per minute, the bills along a transport mechanism in the direction of the narrow dimension of the bills, one at a time, from the input receptacle to a plurality of output receptacles; and determining the denomination of the bills under control of the evaluation device using a denomination discriminating unit at a rate in excess of about 800 bills per minute, the discriminating unit including a detector positioned along a transport mechanism path between the input receptacle and one of the plurality of output receptacles adapted to receive and re-stack the bills after being discriminated by the discriminating unit.

36. The method of claim 35 further including authenticating the denomination of the bills under control of the evaluation device using an authenticating unit adapted to determine the genuineness of the bills.

37. The method of claim 36 wherein the authenticating unit includes a plurality of magnetoresistive sensors.

38. The method of claim 37 wherein the plurality of magnetoresistive sensors are arranged in an array.

39. The method of claim 38 wherein the plurality of magnetoresistive sensors are arranged in a linear array.

40. The method of claim 35 wherein the plurality of output receptacles is exactly six output receptacles.

41. The method of claim 35 further including counting the bills under control of the evaluation device, the counting device comprising one or more counters keeping track of the value of bills discriminated.

42. The method of claim 35 wherein the evaluating device has a height not exceeding about 17 ½ inches, a width not exceeding about 13 ½ inch and a depth not exceeding about 15 inches.

43. The method of claim 35 wherein the currency evaluating device has a volume not exceeding 2.05 ft$^3$.

44. The method of claim 35 wherein transporting and determining the denomination of bills is performed at a rate of at least 1000 bills per minute.

45. A method of evaluating currency bills of different denominations using a currency evaluation device comprising:

receiving a stack of bills to be evaluated in an input receptacle of the evaluation device;

transporting, under control of the evaluation device, the bills along a transport mechanism in the direction of the narrow dimension of the bills, one at a time, from the input receptacle to a plurality of output receptacles, at a rate in excess of about 800 bills per minute;

determining the denomination of the bills under control of the evaluation device using a denomination discriminating unit at a rate in excess of about 800 bills per minute, the discriminating unit including a detector positioned along a transport mechanism path between the input receptacle and one of the plurality of output receptacles adapted to receive and re-stack the bills after being discriminated by the discriminating unit; and authenticating the bills under control of the evaluation device using an authenticating unit adapted to determine the genuineness of the bills, the authenticating unit having an ultraviolet light source adapted to illuminate the bill to be tested, an ultraviolet light detector adapted to generate an output signal responsive to ultraviolet light reflected by the bill, and a processor programmed to receive the ultraviolet detector output signal and to determine the genuineness of the bill based upon the output signal.

46. The method of claim 45 wherein the authenticating unit further comprises a visible light detector adapted to generate an output signal responsive to visible light emitted by the bill upon illumination of the bill by the ultraviolet light source and wherein the processor is further programmed to receive the visible light detector output signal and to determine the genuineness of the bill based upon the ultraviolet light detector output signal and the visible light detector output signal.

47. A method of evaluating currency bills of different denominations using a currency evaluation device comprising:

receiving a stack of bills to be evaluated in an input receptacle of the evaluation device;

transporting, under control of the evaluation device, the bills along a transport mechanism in the direction of the narrow dimension of the bills, one at a time, from the input receptacle to a plurality of output receptacles, at a rate in excess of about 800 bills per minute;

scanning a preselected segment of a central portion of each bill transported by the transport mechanism at a rate in excess of about 800 bills per minute by a stationary optical scanning head located between the input receptacle and the plurality of output receptacles, the scanning head including at least one light source adapted to illuminate a strip of the preselected segment of a bill, and at least one detector adapted to receive light from the illuminated strip on the bill and produce an output signal representing variations in the intensity of the received light;

sampling the output signal at preselected intervals as a bill is moved across the scanning head in the direction of the narrow dimension of the bill, each of the output signal samples being proportional to the intensity of the light received from a different strip of the preselected segment of a bill; and feeding the output signal samples to a processor, the processor (1) determining the denomination of each scanned bill by comparing stored signal samples with the output signal samples produced by the scanning of each bill with the scanning head, (2) counting the number of scanned bills of each denomination, and (3) accumulating the cumulative value of the scanned bills of each denomination.

48. The method of claim 47 further comprising authenticating the bills under control of the evaluation device using an authenticating unit adapted to determine the genuineness of the bill.

49. The method of claim 47 wherein the preselected segment of each bill is located in the central region of the bill.

50. The method of claim 47 wherein the processor is responsive to the output signals from the detector adapted to determine the denomination of each scanned bill before that bill has been advanced to the plurality of output receptacles, and further comprising altering the movement of a scanned bill in response to the denomination determination for that bill from the processor, before that bill is advanced to the plurality of output receptacles.

51. The method of claim 47 wherein the stored signal samples are produced by scanning the preselected segments of different denominations with the scanning head and samples and sampling the output signal at the preselected intervals.

52. The method of claim 47 wherein transporting and scanning is performed at a rate of at least about 1000 bills per minute.

* * * * *

(12) EX PARTE REEXAMINATION CERTIFICATE (7216th)
United States Patent
Jones et al.

(10) Number: US 5,966,456 C1
(45) Certificate Issued: *Dec. 8, 2009

(54) METHOD AND APPARATUS FOR DISCRIMINATING AND COUNTING DOCUMENTS

(75) Inventors: William J. Jones, Kenilworth, IL (US); Douglas U. Mennle, Barrington, IL (US)

(73) Assignee: Cummins-Allison Corp., Mt. Prospect, IL (US)

Reexamination Request:
No. 90/010,057, Jan. 15, 2008
No. 90/010,212, Jun. 27, 2008

Reexamination Certificate for:
Patent No.: 5,966,456
Issued: Oct. 12, 1999
Appl. No.: 08/833,095
Filed: Apr. 4, 1997

(*) Notice: This patent is subject to a terminal disclaimer.

Related U.S. Application Data

(63) Continuation-in-part of application No. 08/573,392, filed on Dec. 15, 1995, now Pat. No. 5,790,697, which is a continuation-in-part of application No. 08/399,854, filed on Mar. 7, 1995, now Pat. No. 5,875,259, and a continuation-in-part of application No. 08/394,752, filed on Feb. 27, 1995, now Pat. No. 5,724,438, and a continuation-in-part of application No. 08/362,848, filed on Dec. 22, 1994, now Pat. No. 5,870,487, and a continuation-in-part of application No. 08/340,031, filed on Nov. 14, 1994, now Pat. No. 5,815,592, and a continuation-in-part of application No. 08/317,349, filed on Oct. 4, 1994, now Pat. No. 5,640,463, and a continuation-in-part of application No. 08/287,882, filed on Aug. 9, 1994, now Pat. No. 5,652,802, and a continuation-in-part of application No. 08/243,807, filed on May 16, 1994, now Pat. No. 5,633,949, and a continuation-in-part of application No. 08/226,660, filed on Apr. 12, 1994, now Pat. No. 6,539,104, said application No. 08/399,854, is a continuation-in-part of application No. 08/394,752, and a continuation-in-part of application No. 08/340,031, and a continuation-in-part of application No. 08/287,882, said application No. 08/394,752, is a continuation-in-part of application No. 08/340,031, and a continuation-in-part of application No. 08/127,334, filed on Sep. 27, 1993, now Pat. No. 5,467,405, said application No. 08/362,848, is a continuation-in-part of application No. 08/340,031, which is a continuation-in-part of application No. 08/243,807, and a continuation-in-part of application No. 08/207,592, filed on Mar. 8, 1994, now Pat. No. 5,467,406, said application No. 08/287,882, is a continuation-in-part of application No. 08/207,592, and a continuation-in-part of application No. 08/219,093, filed on Mar. 29, 1994, now abandoned, and a continuation-in-part of application No. 08/127,334, said application No. 08/243,807, is a continuation-in-part of application No. 08/219,093, filed on Mar. 29, 1994, now abandoned, and a continuation-in-part of application No. 08/127,334, said application No. 08/226,660, is a continuation-in-part of application No. 08/127,334, said application No. 08/219,093, is a continuation-in-part of application No. 08/127,334, said application No. 08/207,592, is a continuation-in-part of application No. 08/127,334, which is a continuation of application No. 07/885,648, filed on May 19, 1992, now Pat. No. 5,295,196, which is a continuation-in-part of application No. 07/475,111, filed on Feb. 5, 1990, now abandoned.

(60) Provisional application No. 60/018,563, filed on May 29, 1996, provisional application No. 60/034,954, filed on Jan. 16, 1997, and provisional application No. 60/038,340, filed on Feb. 27, 1997.

(51) Int. Cl.
*G06K 9/00* (2006.01)
*G06K 9/20* (2006.01)

(52) U.S. Cl. .................. 382/135; 382/318; 382/320; 382/321

(58) Field of Classification Search .................. None
See application file for complete search history.

(56) References Cited

U.S. PATENT DOCUMENTS 4,114,804 A 9/1978 Jones et al. ............... 235/476

(Continued)

FOREIGN PATENT DOCUMENTS

WO   WO 91/11778   8/1991

(Continued)

OTHER PUBLICATIONS

Exhibit C: De La Rue Detector Manuals for 3700 Used Banknote Sorting Machine dated Sep. 1990 (210 pages).

(Continued)

*Primary Examiner*—Colin M Larose

(57) ABSTRACT

A currency evaluating device for receiving a stack of currency bills, rapidly discriminating the bills in the stack and then re-stacking the bills which comprises an input receptacle, a transport mechanism for transporting in the direction of the narrow dimension of the bills from the input receptacle to one of a plurality of output receptacles, at a rate in excess of about 800 bills per minute, and a discriminating unit for determining the denomination of each bill. The device may also include an authenticating unit for determining the genuineness of the bills. The authenticating unit may detect by use of a plurality of magnetoresistive sensors or may detect by ultraviolet light. Alternatively, a currency counting and evaluation device comprises an input receptacle, a transport mechanism for transporting the bills in the direction of the narrow dimension to one of a plurality of output receptacles at a rate in excess of about 800 bills per minute, a stationary optical scanning head, means for sampling, a memory for storing characteristic signal samples and a signal processor.

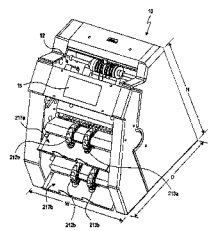

U.S. PATENT DOCUMENTS

| Patent No. | | Date | Inventor | Class |
|---|---|---|---|---|
| 4,288,781 | A | 9/1981 | Sellner et al. | 340/146.3 |
| 4,296,326 | A | 10/1981 | Haslop et al. | 283/70 |
| 4,542,829 | A | 9/1985 | Emery et al. | 209/534 |
| 4,694,963 | A | 9/1987 | Takesako | 209/534 |
| 4,707,843 | A | 11/1987 | McDonald et al. | 377/8 |
| 5,163,672 | A | 11/1992 | Mennie | 271/187 |
| 5,207,788 | A | 5/1993 | Jennings, Jr. | 271/122 |
| 5,295,196 | A | 3/1994 | Raterman et al. | 382/135 |
| 5,358,088 | A | 10/1994 | Barnes et al. | 194/206 |
| 5,467,405 | A | 11/1995 | Raterman et al. | 382/135 |
| 5,467,406 | A | 11/1995 | Graves et al. | 382/135 |
| D369,984 | S | 5/1996 | Larsen | D10/97 |
| 5,633,949 | A | 5/1997 | Graves et al. | 382/135 |
| 5,640,463 | A | 6/1997 | Csulits | 382/135 |
| 5,652,802 | A | 7/1997 | Graves et al. | 382/135 |
| 5,687,963 | A | 11/1997 | Mennie | 271/119 |
| 5,692,067 | A | 11/1997 | Raterman et al. | 382/135 |
| 5,704,491 | A | 1/1998 | Graves | 209/534 |
| 6,721,442 | B1 | 2/1998 | Hong | 382/135 |
| 5,724,438 | A | 3/1998 | Graves | 382/135 |
| 5,751,840 | A | 5/1998 | Raterman et al. | 382/135 |
| 5,790,693 | A | 8/1998 | Graves et al. | 382/135 |
| 5,790,697 | A | 8/1998 | Munro et al. | 382/135 |
| 5,806,650 | A | 9/1998 | Mennie et al. | 194/206 |
| 5,815,592 | A | 9/1998 | Mennie et al. | 382/135 |
| 5,822,448 | A | 10/1998 | Graves et al. | 382/135 |
| 5,832,104 | A | 11/1998 | Graves et al. | 382/135 |
| 5,867,589 | A | 2/1999 | Graves et al. | 382/135 |
| 5,870,487 | A | 2/1999 | Graves et al. | 382/135 |
| 5,875,259 | A | 2/1999 | Mennie et al. | 382/135 |
| 5,905,810 | A | 5/1999 | Jones et al. | 382/135 |
| 5,909,502 | A | 6/1999 | Mazur | 382/135 |
| 5,909,503 | A | 6/1999 | Graves et al. | 382/135 |
| 5,912,982 | A | 6/1999 | Munro et al. | 382/135 |
| 5,938,044 | A | 8/1999 | Weggesser | 209/534 |
| 5,943,655 | A | 8/1999 | Jacobsen | 705/30 |
| 5,960,103 | A | 9/1999 | Graves et al. | 382/135 |
| 5,966,456 | A | 10/1999 | Jones et al. | 382/135 |
| 5,982,918 | A | 11/1999 | Mennie et al. | 382/135 |
| 5,992,601 | A | 11/1999 | Mennie et al. | 194/207 |
| 6,012,565 | A | 1/2000 | Mazur | 194/207 |
| 6,021,883 | A | 2/2000 | Casanova et al. | 194/217 |
| 6,026,175 | A | 2/2000 | Munro et al. | 382/135 |
| 6,028,951 | A | 2/2000 | Raterman et al. | 382/135 |
| 6,068,194 | A | 5/2000 | Mazur | 235/492 |
| 6,072,896 | A | 6/2000 | Graves et al. | 382/135 |
| 6,073,744 | A | 6/2000 | Raterman et al. | 194/207 |
| 6,074,334 | A | 6/2000 | Mennie et al. | 493/438 |
| 6,128,402 | A | 10/2000 | Jones et al. | 382/135 |
| 6,220,419 | B1 | 4/2001 | Mennie | 194/207 |
| 6,237,739 | B1 | 5/2001 | Mazur et al. | 194/207 |
| 6,241,069 | B1 | 6/2001 | Mazur et al. | 194/207 |
| 6,256,407 | B1 | 7/2001 | Mennie et al. | 382/135 |
| 6,278,795 | B1 | 8/2001 | Anderson et al. | 382/135 |
| 6,311,819 | B1 | 11/2001 | Stromme et al. | 194/207 |
| 6,318,537 | B1 | 11/2001 | Jones et al. | 194/346 |
| 6,351,551 | B1 | 2/2002 | Munro et al. | 382/135 |
| 6,363,164 | B1 | 3/2002 | Jones et al. | 382/135 |
| 6,371,303 | B1 | 4/2002 | Klein et al. | 209/534 |
| 6,378,683 | B2 | 4/2002 | Mennie | 194/207 |
| 6,381,354 | B1 | 4/2002 | Mennie et al. | 382/135 |
| 6,398,000 | B1 | 6/2002 | Jenrick et al. | 194/200 |
| 6,459,806 | B1 | 10/2002 | Raterman et al. | 382/135 |
| 6,460,705 | B1 | 10/2002 | Hallowell | 209/534 |
| 6,493,461 | B1 | 12/2002 | Mennie et al. | 382/135 |
| 6,539,104 | B1 | 3/2003 | Raterman et al. | 382/135 |
| 6,560,355 | B2 | 5/2003 | Graves et al. | 382/135 |
| 6,588,569 | B1 | 7/2003 | Jenrick et al. | 194/206 |
| 6,601,687 | B1 | 8/2003 | Jenrick et al. | 194/206 |
| 6,603,872 | B2 | 8/2003 | Jones et al. | 382/135 |
| 6,621,919 | B2 | 9/2003 | Mennie et al. | 382/135 |
| 6,628,816 | B2 | 9/2003 | Mennie et al. | 382/135 |
| 6,636,624 | B2 | 10/2003 | Raterman et al. | 382/135 |
| 6,647,136 | B2 | 11/2003 | Jones et al. | 382/137 |
| 6,650,767 | B2 | 11/2003 | Jones et al. | 382/135 |
| 6,654,486 | B2 | 11/2003 | Jones et al. | 382/135 |
| 6,661,910 | B2 | 12/2003 | Jones et al. | 382/135 |
| 6,665,431 | B2 | 12/2003 | Jones et al. | 382/135 |
| 6,678,401 | B2 | 1/2004 | Jones et al. | 382/135 |
| 6,678,402 | B2 | 1/2004 | Jones et al. | 382/135 |
| 6,705,470 | B2 | 3/2004 | Klein et al. | 209/534 |
| 6,724,926 | B2 | 4/2004 | Jones et al. | 382/135 |
| 6,724,927 | B2 | 4/2004 | Jones et al. | 382/135 |
| 6,731,785 | B1 | 5/2004 | Mennie et al. | 382/135 |
| 6,731,786 | B2 | 5/2004 | Jones et al. | 382/135 |
| 6,748,101 | B1 | 6/2004 | Jones et al. | 382/135 |
| 6,778,693 | B2 | 8/2004 | Munro et al. | 382/135 |
| 6,798,899 | B2 | 9/2004 | Mennie et al. | 382/135 |
| 6,810,137 | B2 | 10/2004 | Jones et al. | 382/135 |
| 6,843,418 | B2 | 1/2005 | Jones et al. | 235/462.01 |
| 6,860,375 | B2 | 3/2005 | Hallowell et al. | 194/328 |
| 6,866,134 | B2 | 3/2005 | Stromme et al. | 194/207 |
| 6,868,954 | B2 | 3/2005 | Stromme et al. | 194/207 |
| 6,880,692 | B1 | 4/2005 | Mazur et al. | 194/207 |
| 6,913,130 | B1 | 7/2005 | Mazur et al. | 194/207 |
| 6,913,260 | B2 | 7/2005 | Maier et al. | 271/265.04 |
| 6,915,893 | B2 | 7/2005 | Mennie | 194/207 |
| 6,929,109 | B1 | 8/2005 | Klein et al. | 194/206 |
| 6,955,253 | B1 | 10/2005 | Mazur et al. | 194/207 |
| 6,957,733 | B2 | 10/2005 | Mazur et al. | 194/215 |
| 6,959,800 | B1 | 11/2005 | Mazur et al. | 194/207 |
| 6,962,247 | B2 | 11/2005 | Maier et al. | 194/207 |
| 6,980,684 | B1 | 12/2005 | Munro et al. | 382/135 |
| 6,994,200 | B2 | 2/2006 | Jenrick et al. | 194/206 |
| 6,996,263 | B2 | 2/2006 | Jones et al. | 382/135 |
| 7,000,828 | B2 | 2/2006 | Jones | 235/379 |
| 7,016,767 | B2 | 3/2006 | Jones et al. | 700/224 |
| 7,082,216 | B2 | 7/2006 | Jones et al. | 382/137 |
| 7,092,560 | B2 | 8/2006 | Jones et al. | 382/135 |
| 7,103,206 | B2 | 9/2006 | Graves et al. | 382/135 |
| 7,103,438 | B2 | 9/2006 | Hallowell et al. | 700/116 |
| 7,146,245 | B2 | 12/2006 | Jones et al. | 700/224 |
| 7,149,336 | B2 | 12/2006 | Jones et al. | 382/135 |
| 7,158,662 | B2 | 1/2007 | Chiles | 382/135 |
| 7,171,032 | B2 | 1/2007 | Jones et al. | 382/135 |
| 7,187,795 | B2 | 3/2007 | Jones et al. | 382/135 |
| 7,191,657 | B2 | 3/2007 | Maier et al. | 73/587 |
| 7,197,173 | B2 | 3/2007 | Jones et al. | 382/135 |
| 7,200,255 | B2 | 4/2007 | Jones et al. | 382/135 |
| 7,201,320 | B2 | 4/2007 | Csulits et al. | 235/462.01 |
| 7,232,024 | B2 | 6/2007 | Mazur et al. | 194/207 |
| 7,248,731 | B2 | 7/2007 | Raterman et al. | 382/135 |
| 7,256,874 | B2 | 8/2007 | Csulits et al. | 356/71 |
| 7,269,279 | B2 | 9/2007 | Chiles | 382/135 |
| 7,349,566 | B2 | 3/2008 | Jones et al. | 382/139 |
| 7,362,891 | B2 | 4/2008 | Jones et al. | 382/135 |
| 7,366,338 | B2 | 4/2008 | Jones et al. | 382/135 |
| 7,391,897 | B2 | 6/2008 | Jones et al. | 382/135 |
| 7,427,230 | B2 | 9/2008 | Blake et al. | 453/63 |
| 7,438,172 | B2 | 10/2008 | Chen et al. | 194/347 |
| 7,505,831 | B2 | 3/2009 | Jones et al. | 700/224 |
| 7,536,046 | B2 | 5/2009 | Raterman et al. | 382/135 |
| 7,542,598 | B2 | 6/2009 | Jones et al. | 382/135 |
| 2001/0006557 | A1 | 7/2001 | Mennie et al. | 382/135 |
| 2001/0015311 | A1 | 8/2001 | Mennie | 194/207 |

| Publication No. | Date | Inventor | Class |
|---|---|---|---|
| 2001/0019624 A1 | 9/2001 | Raterman et al. | 382/135 |
| 2001/0035603 A1 | 11/2001 | Graves et al. | 271/265.01 |
| 2002/0001393 A1 | 1/2002 | Jones et al. | 382/100 |
| 2002/0020603 A1 | 2/2002 | Jones et al. | 194/346 |
| 2002/0056605 A1 | 5/2002 | Mazur et al. | 194/207 |
| 2002/0085245 A1 | 7/2002 | Mennie et al. | 358/498 |
| 2002/0085745 A1 | 7/2002 | Jones et al. | 382/135 |
| 2002/0103757 A1 | 8/2002 | Jones et al. | 705/45 |
| 2002/0104785 A1 | 8/2002 | Klein et al. | 209/534 |
| 2002/0107801 A1 | 8/2002 | Jones et al. | 705/45 |
| 2002/0118871 A1 | 8/2002 | Jones et al. | 382/137 |
| 2002/0122580 A1 | 9/2002 | Jones et al. | 382/137 |
| 2002/0126885 A1 | 9/2002 | Mennie et al. | 382/135 |
| 2002/0126886 A1 | 9/2002 | Jones et al. | 382/135 |
| 2002/0131630 A1 | 9/2002 | Jones et al. | 382/137 |
| 2002/0136442 A1 | 9/2002 | Jones et al. | 382/135 |
| 2002/0145035 A1 | 10/2002 | Jones | 235/379 |
| 2002/0154804 A1 | 10/2002 | Jones et al. | 382/135 |
| 2002/0154805 A1 | 10/2002 | Jones et al. | 382/135 |
| 2002/0154806 A1 | 10/2002 | Jones et al. | 382/135 |
| 2002/0154807 A1 | 10/2002 | Jones et al. | 382/135 |
| 2002/0154808 A1 | 10/2002 | Jones et al. | 382/135 |
| 2002/0186876 A1 | 12/2002 | Jones et al. | 382/135 |
| 2003/0009420 A1 | 1/2003 | Jones | 705/39 |
| 2003/0015395 A1 | 1/2003 | Hallowell et al. | 194/206 |
| 2003/0015396 A1 | 1/2003 | Mennie | 194/206 |
| 2003/0059098 A1 | 3/2003 | Jones et al. | 382/135 |
| 2003/0062242 A1 | 4/2003 | Hallowell et al. | 194/302 |
| 2003/0081824 A1 | 5/2003 | Mennie et al. | 382/135 |
| 2003/0108233 A1 | 6/2003 | Raterman et al. | 382/135 |
| 2003/0121752 A1 | 7/2003 | Stromme et al. | 194/207 |
| 2003/0121753 A1 | 7/2003 | Stromme et al. | 194/207 |
| 2003/0132281 A1 | 7/2003 | Jones et al. | 235/379 |
| 2003/0139994 A1 | 7/2003 | Jones | 705/36 |
| 2003/0168308 A1 | 9/2003 | Maier et al. | 194/207 |
| 2003/0174874 A1 | 9/2003 | Raterman et al. | 382/135 |
| 2003/0182217 A1 | 9/2003 | Chiles | 705/35 |
| 2003/0198373 A1 | 10/2003 | Raterman et al. | 382/135 |
| 2004/0003980 A1 | 1/2004 | Hallowell et al. | 194/206 |
| 2004/0016221 A1 | 1/2004 | Jerrick et al. | 194/206 |
| 2004/0016797 A1 | 1/2004 | Jones et al. | 235/379 |
| 2004/0028266 A1 | 2/2004 | Jones et al. | 382/135 |
| 2004/0083149 A1 | 4/2004 | Jones | 705/35 |
| 2004/0145726 A1 | 7/2004 | Csulits et al. | 356/71 |
| 2004/0149538 A1 | 8/2004 | Sakowski | 194/207 |
| 2004/0153408 A1 | 8/2004 | Jones et al. | 705/43 |
| 2004/0154964 A1 | 8/2004 | Jones | 209/534 |
| 2004/0173432 A1 | 9/2004 | Jones | 194/216 |
| 2004/0251110 A1 | 12/2004 | Jenrick et al. | 194/207 |
| 2005/0029168 A1 | 2/2005 | Jones et al. | 209/534 |
| 2005/0035034 A1 | 2/2005 | Long et al. | 209/534 |
| 2005/0040225 A1 | 2/2005 | Csulits et al. | 235/379 |
| 2005/0047642 A1 | 3/2005 | Jones et al. | 382/137 |
| 2005/0060055 A1 | 3/2005 | Hallowell et al. | 700/95 |
| 2005/0060059 A1 | 3/2005 | Klein et al. | 700/213 |
| 2005/0060061 A1 | 3/2005 | Jones | 700/226 |
| 2005/0077142 A1 | 4/2005 | Tam et al. | 194/217 |
| 2005/0086271 A1 | 4/2005 | Jones et al. | 707/200 |
| 2005/0087422 A1 | 4/2005 | Maier et al. | 194/207 |
| 2005/0108165 A1 | 5/2005 | Jones et al. | 705/43 |
| 2005/0117791 A2 | 6/2005 | Raterman et al. | 382/135 |
| 2005/0117792 A2 | 6/2005 | Graves et al. | 382/135 |
| 2005/0150738 A1 | 7/2005 | Hallowell et al. | 194/206 |
| 2005/0163361 A1 | 7/2005 | Jones et al. | 382/135 |
| 2005/0163362 A1 | 7/2005 | Jones et al. | 382/135 |
| 2005/0169511 A1 | 8/2005 | Jones | 382/135 |
| 2005/0173221 A1 | 8/2005 | Maier et al. | 194/207 |
| 2005/0183928 A1 | 8/2005 | Jones et al. | 194/207 |
| 2005/0207634 A1 | 9/2005 | Jones et al. | 382/135 |
| 2005/0213803 A1 | 9/2005 | Mennie et al. | 382/135 |
| 2005/0241909 A1 | 11/2005 | Mazur et al. | 194/207 |
| 2005/0249394 A1 | 11/2005 | Jones et al. | 382/135 |
| 2005/0265591 A1 | 12/2005 | Jones et al. | 382/135 |
| 2005/0276458 A1 | 12/2005 | Jones et al. | 382/135 |
| 2005/0278239 A1 | 12/2005 | Jones et al. | 705/35 |
| 2006/0010071 A1 | 1/2006 | Jones et al. | 705/42 |
| 2006/0054455 A1 | 3/2006 | Kuykendall et al. | 194/217 |
| 2006/0078186 A1 | 4/2006 | Freeman et al. | 382/135 |
| 2006/0182330 A1 | 8/2006 | Chiles | 382/135 |
| 2006/0195567 A1 | 8/2006 | Mody et al. | 709/224 |
| 2006/0210137 A1 | 9/2006 | Raterman et al. | 382/135 |
| 2006/0274929 A1 | 12/2006 | Jones et al. | 382/135 |
| 2007/0071302 A1 | 3/2007 | Jones et al. | 382/135 |
| 2007/0076939 A1 | 4/2007 | Jones et al. | 382/135 |
| 2007/0078560 A1 | 4/2007 | Jones et al. | 700/224 |
| 2007/0095630 A1 | 5/2007 | Mennie et al. | 194/206 |
| 2007/0112674 A1 | 5/2007 | Jones et al. | 705/45 |
| 2007/0122023 A1 | 5/2007 | Jenrick et al. | 382/135 |
| 2007/0172107 A1 | 7/2007 | Jones et al. | 382/137 |
| 2007/0209904 A1 | 9/2007 | Freeman et al. | 194/210 |
| 2007/0221470 A1 | 9/2007 | Mennie et al. | 194/216 |
| 2007/0237381 A1 | 10/2007 | Mennie et al. | 382/135 |
| 2007/0258633 A1 | 11/2007 | Jones et al. | 382/135 |
| 2007/0269097 A1 | 11/2007 | Chiles et al. | 382/135 |
| 2007/0278064 A1 | 12/2007 | Hallowell et al. | 194/206 |
| 2008/0006505 A1 | 1/2008 | Renz et al. | 194/206 |
| 2008/0033829 A1 | 2/2008 | Mennie et al. | 705/16 |
| 2008/0044077 A1 | 2/2008 | Mennie et al. | 382/135 |
| 2008/0060906 A1 | 3/2008 | Fitzgerald et al. | 194/207 |
| 2008/0123932 A1 | 5/2008 | Jones et al. | 382/135 |
| 2008/0133411 A1 | 6/2008 | Jones et al. | 705/42 |
| 2008/0177420 A1 | 7/2008 | Klein et al. | 700/224 |
| 2008/0219543 A1 | 9/2008 | Csultis et al. | 382/135 |
| 2008/0220707 A1 | 9/2008 | Jones et al. | 453/2 |
| 2008/0285838 A1 | 11/2008 | Jones et al. | 382/135 |
| 2009/0001661 A1 | 1/2009 | Klein et al. | 271/258.01 |
| 2009/0022390 A1 | 1/2009 | Yacoubian et al. | 382/135 |
| 2009/0087076 A1 | 4/2009 | Jenrick | 382/135 |
| 2009/0090779 A1 | 4/2009 | Freeman | 235/450 |

FOREIGN PATENT DOCUMENTS

| | | |
|---|---|---|
| WO | WO 92/17394 | 10/1992 |
| WO | WO 93/23824 | 11/1993 |
| WO | WO 95/24691 | 9/1995 |
| WO | WO 96/10800 | 4/1996 |
| WO | WO 96/36933 | 11/1996 |
| WO | WO 98/13785 | 4/1997 |
| WO | WO 97/30422 | 8/1997 |
| WO | WO 97/43734 | 11/1997 |
| WO | WO 97/45810 | 12/1997 |
| WO | WO 98/12662 | 3/1998 |
| WO | WO 98/24052 | 6/1998 |
| WO | WO 98/24067 | 6/1998 |
| WO | WO 98/35323 | 8/1998 |
| WO | WO 98/40839 | 9/1998 |
| WO | WO 98/47100 | 10/1998 |
| WO | WO 98/50892 | 11/1998 |
| WO | WO 98/59323 | 12/1998 |
| WO | WO 99/09511 | 2/1999 |
| WO | WO 99/14668 | 3/1999 |
| WO | WO 99/23601 | 5/1999 |
| WO | WO 99/41695 | 8/1999 |
| WO | WO 99/48040 | 9/1999 |
| WO | WO 99/48042 | 9/1999 |
| WO | WO 00/24572 | 5/2000 |
| WO | WO 01/08108 | 2/2001 |
| WO | WO 01/59685 | 8/2001 |
| WO | WO 0159723 | 8/2001 |
| WO | WO 02/29735 | 4/2002 |
| WO | WO 02/054360 | 7/2002 |
| WO | WO 03/005312 | 1/2003 |
| WO | WO 03/028361 | 4/2003 |

| | | |
|---|---|---|
| WO | WO 03/029913 | 4/2003 |
| WO | WO 03/030113 | 4/2003 |
| WO | WO 03/037532 | 8/2003 |
| WO | WO 03/107282 | 12/2003 |
| WO | WO 2004/010367 | 1/2004 |
| WO | WO 2004/027717 | 4/2004 |
| WO | WO 2004/036508 | 4/2004 |
| WO | WO 2004/038631 | 5/2004 |
| WO | WO 2004/068422 | 8/2004 |
| WO | WO 2005/013209 A2 | 2/2005 |
| WO | WO 2005/017842 A1 | 2/2005 |
| WO | WO 2005/028348 A2 | 3/2005 |
| WO | WO 2005/029240 A2 | 3/2005 |
| WO | WO 2005/036445 A1 | 4/2005 |
| WO | WO 2005/076229 A1 | 8/2005 |
| WO | WO 2006/039439 A2 | 4/2006 |
| WO | WO 2006/076289 A2 | 7/2006 |
| WO | WO 2006/076634 A2 | 7/2006 |
| WO | WO 2007/044570 A2 | 4/2007 |
| WO | WO 2007/120825 A2 | 10/2007 |
| WO | WO 2007/143128 A2 | 12/2007 |
| WO | WO 2008/030356 A1 | 3/2008 |
| WO | WO 2008/112132 A1 | 9/2008 |

OTHER PUBLICATIONS

Exhibit E: De La Rue 3000 User Guide (108 pages) 1981 (108 pages).
Exhibit F: Service Manual for 3700 Used Banknote Sorting Machine dated Sep. 1990. (244 pages).
Exhibit K: Mosler CF–420 Installation & Service Technical Library copyright 1992 (240 pages).
Exhibit L: Mosler CF–420 Operator's Manula copyright 1989 (168 pages).
Exhibit S: Declaration of Stephen Emery dated Jan. 10, 2008 (21 pages).
Exhibit T: Declaration of Paul D. Lacey dated Jan. 10, 2008 (14 pages).
Exhibit U: Declaration of Paul D. Lacey dated Jun. 24, 2008, with attachment (58 pages).
Exhibit X: "Size Calculation Spreadsheet" Prepared By Stepehn Emery (1 page).
De La Rue Systems Limited;3000 User Guide (1981).
De La Rue 3100 Leaflet (1981).
Mosler CF–420 Operator's Manual (1989).

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–52 is confirmed.

* * * * *